United States Patent [19]

Matsuda

[11] Patent Number: 4,748,564
[45] Date of Patent: May 31, 1988

[54] ANTI-SKID BRAKE CONTROL SYSTEM WITH BRAKING FORCE QUICK TAKE-UP FEATURE

[75] Inventor: Toshiro Matsuda, Sagamihara, Japan

[73] Assignee: Nissan Motor Company, Limited, Yokohama, Japan

[21] Appl. No.: 733,890

[22] Filed: May 14, 1985

[30] Foreign Application Priority Data

May 15, 1984 [JP] Japan .................................. 59-95605
May 15, 1984 [JP] Japan .................................. 59-95606

[51] Int. Cl.$^4$ ............................................. B60T 8/32
[52] U.S. Cl. .................................... 364/426; 303/103; 303/110
[58] Field of Search .................... 364/426; 303/93, 95, 303/103, 105, 110; 361/238

[56] References Cited

U.S. PATENT DOCUMENTS

| | | | |
|---|---|---|---|
| 3,663,070 | 5/1972 | Scharlack | 303/110 |
| 3,713,705 | 1/1973 | Michellone et al. | 303/110 |
| 4,135,769 | 1/1979 | Williams et al. | 303/110 |
| 4,209,203 | 6/1980 | Brearley | 303/103 |
| 4,320,459 | 3/1982 | Lindemann et al. | 364/426 |
| 4,430,714 | 2/1984 | Matsuda et al. | 364/426 |
| 4,435,768 | 3/1984 | Arikawa | 364/426 |
| 4,530,059 | 7/1985 | Brearley et al. | 364/426 |

Primary Examiner—Gary Chin
Attorney, Agent, or Firm—Foley & Lardner, Schwartz, Jeffery, Schwaab, Mack, Blumenthal & Evans

[57] ABSTRACT

An anti-skid brake control system omits certain control steps which are normally executed periodically in order to achieve rapid fluid pressure build-up in the wheel cylinders. The system also allows holding of the braking pressure at a high constant level at the initial stage of braking pressure to ensure optimal braking characteristics on slippery road surfaces. Upon initiation of a brake pressure APPLICATION mode, a HOLD mode is enabled for a given period following which the HOLD mode is disabled.

40 Claims, 29 Drawing Sheets

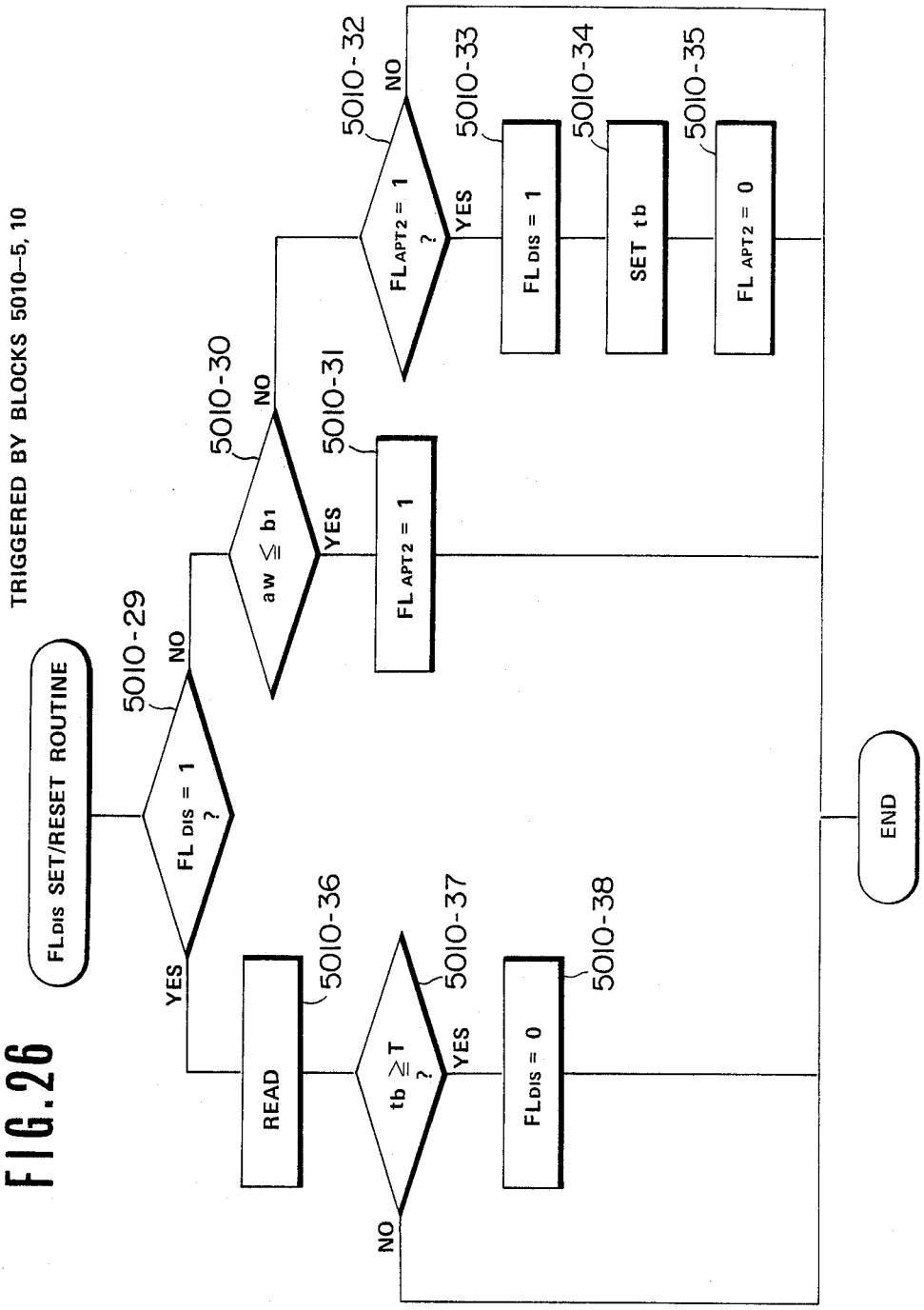

ANTI-SKID BRAKE CONTROL SYSTEM WITH BRAKING FORCE QUICK TAKE-UP FEATURE

BACKGROUND OF THE INVENTION

The present invention relates generally to an anti-skid control system for an automotive vehicle with optimal braking characteristics. More particularly, the invention relates to an anti-skid brake control system which can increase braking pressure in discrete steps as well as perform quick take-up of the braking pressure i.e., rapid application of a high braking force, by omitting normal cyclic steps of holding braking pressure at a constant value and/or of decreasing the braking pressure. Proper balance between moderate increase of the braking force by stepwise braking pressure build-up and rapid increase by quick take-up ensures optimal braking characteristics under all road surface conditions.

In the prior art, it has been considered that optimum braking characteristics are obtained when braking pressure or force can be so adjusted that the peripheral speed of the wheels during braking is held to a given ratio, e.g. about 80% to 85%, of the vehicle speed. This practice is believed to be particularly effective when road conditions and other factors are taken into consideration. If the wheel speed/vehicle speed ratio is maintained higher than the above-mentioned optimal ratio, e.g., 80% to 85%, braking distance may be prolong due to a lack of braking pressure. On the other hand, if the braking pressure is so adjusted as to maintain the wheel speed/vehicle speed ratio less than the aforementioned optimal ratio, the vehicle wheels may lock and skid, resulting in an unnecessarily long braking distance due to reduced traction. In practice, it is very difficult to precisely adjust the braking pressure so that the wheel speed is held to the given optimal ratio to the vehicle speed.

In the practical anti-skid brake control operation, braking pressure in one or more wheel cylinders is adjusted by cyclically increasing and decreasing the braking pressure in the wheel cylinder. The anti-skid control system generally decreases braking pressure when the wheel deceleration value becomes less than a given deceleration threshold, which is so chosen as to prevent the wheel from skidding, and increases braking pressure when the wheel acceleration value is greater than a given acceleration threshold. In this conventional anti-skid brake control procedure, wheel speed does not remain at an optimal relationship to the vehicle speed for a satisfactorily long period of time.

U.S. Pat. No. 4,384,330, granted to the assignee of the present invention, discloses a brake control system for controlling application and release of brake pressure in order to prevent the vehicle from skidding. The system includes a sensing circuit for determining wheel rotation speed, a deceleration detecting circuit for determining the deceleration rate of the wheel and generating a signal when the determined deceleration rate becomes equal to or greater than a predetermined value, a target wheel speed circuit for determining a target wheel speed based on the wheel rotation speed and operative in response to detection of a peak in the coefficient of friction between the vehicle wheel and the road surface, and a control circuit for controlling application and release of brake fluid pressure to wheel cylinders for controlling the wheel deceleration rate. The wheel rotation speed sensing circuit detects the angular velocity of the wheel to produce alternating current sensor signal having a frequency corresponding to the wheel rotation speed. The wheel rotation speed sensor signal value is differentiated to derive the deceleration rate.

In another approach, U.S. Pat. No. 3,637,264, issued on Jan. 25, 1972 to Leiber et al discloses an Antilocking Control for Pressure Actuated Brakes. The pressure of the brake-actuating fluid in an antilocking brake control system is varied by pulsing the control valve or valves for durations which are varied to be greater or lesser than the period of that limiting frequency above which the brake system cannot respond. In the former case, a rapid increase in fluid pressure or a rapid decrease in fluid pressure occurs, whereas in the latter case, a less rapid average or net increase or decrease occurs in the fluid pressure to which the brake system responds. These conditions are controlled in dependence on the rotational behavior of the vehicle wheel or wheels and more especially in dependence or predetermined changes in angular velocity of the wheel. Moreover, either variation in pulse duration at a fixed frequency or variation in frequency at a fixed pulse duration may be effected during high-frequency pulsing so as further to alter the net increase or decrease in fluid pressure. This further alternation is effected as a function of time from the beginning of the high-frequency pulsing.

In addition, Published Japanese Patent Application (Tokkai) No. Showa 51-89096, published on Aug. 4, 1976 discloses a system similar to the above. The fluid pressure in the wheel cylinder is increased in a stepwise manner. Duration of increase of the fluid pressure is adjusted in accordance with the rate of increase of the fluid pressure in one or more preceding steps.

In order to improve the foregoing prior art, there has been proposed an improved anti-skid brake control system in the co-pending U.S. patent application Ser. No. 634,489, filed in July 26, 1984, also pending before European Patent Office under Application No. 84108356.1, filed on July 16, 1984. In the above-identified prior proposal, moderate increase of the braking pressure has been improved by skipping cyclically executed steps of holding the braking pressure at a constant value when the road surface condition provide relatively high road/tire friction so as to allow wheel speed to recover at a rate higher than a predetermined value.

Another approach has been proposed in the copending U.S. patent application Ser. No. 673,200, filed on Nov. 19, 1984, corresponding to European Patent Application No. 84113434.9, filed on Nov. 7, 1984. In the disclosed system, braking pressure holding and/or decreasing is disabled to allow continuous increase of the braking pressure toward a lock pressure, when relatively high road/tire traction conditions are detected.

The present invention is intended to further improve the aforementioned proposals of the common applicant and so optimize braking characteristics not only under relatively high road/tire traction conditions but also at relatively low traction.

SUMMARY OF THE INVENTION

Therefore, it is an object of the present invention to provide an anti-skid brake control system with improved braking performance not only under the high friction road conditions but also under low-friction road conditions.

Another and more specific object of the invention to provide an anti-skid brake control system which detects of road surface conditions on the basis of the wheel speed variation at the initial stage of braking operation and adapts subsequent skid control operations to the detected road surface conditions.

A further object of the invention is to provide an anti-skid brake control which performs braking pressure holding and/or reducing operations only at the initial stage of braking and avoids the mentioned operations in subsequent skid control cycles when the road surface is detected to have a relatively high coefficient of friction and which performs pressure holding or reducing operation before increasing the braking pressure in each skid cycle when the road surface is detected to have a relatively low coefficient of friction.

In order to accomplish the aforementioned and other objects, an anti-skid brake control system, in accordance with the present invention, disables normally cyclically executed steps of holding the braking pressure constant at an increased level in order to achieve quick pressure take-up. On the other hand, the system allows holding of the braking pressure at an increased constant level at the initial stage of braking pressure increase to ensure optimal braking characteristics on slippery surfaces. Therefore, in the present invention, upon initiation of an APPLICATION mode, a HOLD mode is enabled for a given period and then disabled after the given period expires.

According to one aspect of the invention, an anti-skid brake control system for an automotive brake system comprises a hydraulic brake system including a wheel cylinder for applying braking pressure to a vehicle wheel, and a pressure control valve associated with the wheel cylinder for adjusting fluid pressure in the wheel cylinder, the pressure control valve being operative to increase fluid pressure in the wheel cylinder in its first position, to decrease fluid pressure in the wheel cylinder in its second position, and to hold fluid pressure constant in its third position, wheel speed sensor detecting rotation speed of the wheel and producing a wheel speed indicative signal having a value indicative of the detected wheel speed, and a controller deriving a wheel acceleration on the basis of variation of the wheel speed indicative signal values, selecting operation mode on the basis of detected wheel speed and derived wheel acceleration among a first mode for increasing the fluid pressure, a second mode for decreasing said fluid pressure and a third mode for holding the fluid pressure constant, and producing a control signal to control the pressure control valve to one of said first, second and third positions corresponding to the selected operation mode, the controller being detective of initiation of said first mode operation for enabling the second mode operation for a given first period and subsequently disabling the second mode operation for a given second period.

According to another aspect of the invention, an anti-skid brake control system for an automotive brake system comprises a hydraulic brake system including a wheel cylinder for applying braking pressure to a vehicle wheel, and a pressure control valve associated with the wheel cylinder for adjusting fluid pressure in said wheel cylinder, the pressure control valve being operative to increase fluid pressure in the wheel cylinder in its first position, to subsequently hold increased fluid pressure constant at its second position, to decrease fluid pressure in the wheel cylinder in its third position, and to subsequently hold decreased fluid pressure constant in its fourth position, a wheel speed sensor detecting rotation speed of the wheel and producing a wheel speed indicative signal having a value representative of detected wheel speed, first means for deriving brake control parameters including wheel acceleration, second means for determining operation mode on the basis of the wheel speed indicative signal value and brake control parameters derived by the first means among a first mode to increase fluid pressure, a second mode to hold the fluid pressure constant at increased level, a third mode to decrease the fluid pressure and a fourth mode to hold the fluid pressure constant at a decreased level, and third means for detecting initiation of each cycle of skid control operation for enabling the second means for selecting the second mode for a given first period and for subsequently disabling the second means to select said second mode for a given second period.

According to a further aspect of the invention a method for anti-skid control in an automotive brake system comprises the steps of:

detecting wheel speed to produce a wheel speed indicative signal value of which is variable proportional to detected wheel speed;

deriving brake control parameters including wheel acceleration on the basis of the wheel speed indicative signal values;

performing a first mode operation for operating a pressure control valve disposed within a hydraulic brake circuit including a wheel cylinder to its first position to increase braking pressure;

performing a second mode operation for operating the control valve to its second position to hold braking pressure at increased constant level, when wheel acceleration decreases across a first given value;

performing a third mode operation for operating the control valve to its third position to decrease the braking pressure, when wheel speed decreases across a second given value;

performing a fourth mode operation for operating the control valve to its fourth position to hold braking pressure at decreased constant level, when wheel acceleration increases across a third given value; and detecting initiation of the forst mode operation and enabling the second mode operation for a given first period and subsequently disabling the second mode operation for a given second period.

According to a still further aspect of the invention, a method for anti-skid control in an automotive brake system comprises the steps of:

detecting wheel speed to produce a wheel speed indicative signal value of which is variable proportional to detected wheel speed;

processing the wheel speed indicative signal to derive brake control parameters including wheel acceleration and slip rate relative to an estimated vehicle speed, which estimated vehicle speed is drived on the basis of wheel speed;

performing a first mode operation for increasing braking pressure;

performing a second mode operation for operating the control valve to its second position to hold braking pressure at increased constant level, when wheel acceleration decreases across a first given value;

performing a third mode operation for operating the control valve to its third position to decrease braking pressure when the slip rate increases across a second given value;

performing a fourth mode operation for operating the control valve to its fourth position to hold braking pressure at decreased constant level, when wheel acceleration increases across a third given value;

detecting the first cycle of skid control operation for operating the pressure control valve at said first position for increasing braking pressure in linear fashion during first cycle of skid control operation and for alternately operating the pressure control valve in said first and seocnd positions at given timing for increasing braking pressure in stepwise fashion during skid control operation in the skid cycles subsequent to the first cycle; and detecting initiation of the first mode operation in each skid cycle for enabling tbe second mode operation for a given first period and subsequently disabling the second mode operation for a given second period.

BRIEF DESCRIPTION OF THE DRAWINGS

The present invention will be understood more fully from the detailed description given below and from the accompanying drawings of the preferred embodiments of the present invention, which, however, should not be taken to limit the invention to the specific embodiments, but are for explanation and understanding only.

FIG. 26 is a flowchart of a disabling flag setting and resetting routine associated with the EV and AV deriving routine of FIG. 25;

DESCRIPTION OF THE PREFERRED EMBODIMENT

Figure 1:
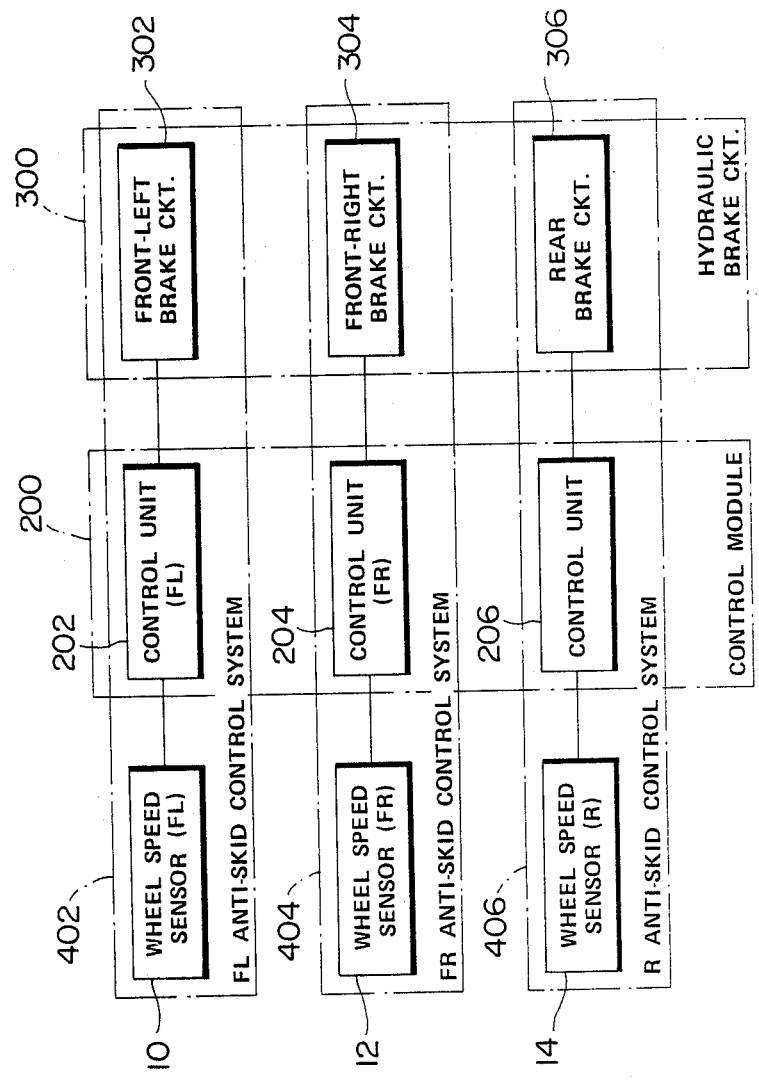
FIG. 1 is a schematic block diagram of the overall design of the preferred embodiment of an anti-skid brake control system according to the present invention.

Referring to the drawings, particularly to FIGS. 1 to 11, an anti-skid brake control system, according to the present invention, includes three independent anti-skid control circuits 402, 404 and 406 respectively controlling front-left (FL) wheel, front-right (FR) wheel and rear (R) wheels. The anti-skid control circuits 402, 404 and 406 respectively include digital controller units 202, 204 and 206 which are housed in a common controller housing to form a control module 200.

The controller unit 202 provided in the front-left anti-skid control circuit 402 is connected to a wheel speed sensor 10 to the produce an alternating-current sensor signal having a frequency proportional to rotation speed of a front-left wheel (not shown). On the other hand, the controller unit 202 is also connected to an electromagnetic actuator 16 in a front-left brake circuit 302. The brake circuit 302 includes a front-left wheel cylinder 30a for operating a brake shoe assembly 30 for applying braking force to a brake disc rotor 28, and an electromagnetic pressure control valve 16a operated by the actuator 16 for controlling fluid pressure to be applied to the wheel cylinder 30a and thereby controlling the braking force.

Similarly, the controller unit 204 of the front-right anti-skid control circuit 404 is connected to a wheel speed sensor 204 to receive the alternating-current sensor signal with a frequency representative of the rotation speed of the front-right wheel. The controller unit 204 is also connected to an actuator 18 in a front-right brake circuit 304. The actuator 18 drives an electromagnetic pressure control valve 18a for controlling hydraulic pressure to be applied to a front-right wheel cylinder 34a. With the controlled hydraulic pressure, the wheel cylinder 34a operates a front-right brake shoe assembly 34 for applying braking force to a brake disc rotor 32 rotating with the front-right wheel.

In addition, the controller unit 206 is connected to a wheel speed sensor 14 to receive therefrom an alternative current sensor signal having a frequency indicative of the average rotation speed of rear wheels. In order to detect average rotation speed of the rear wheels, the wheel speed sensor 14 may be adapted to detect rotation speed of propeller shaft or the equivalent rotating at the approximately average speed of the rear wheels. The controller unit 206 is also connected to an electromagnetic actuator 20 of an electromagnetic pressure control valve 20a. The electromagnetic valve 20a is associated with rear wheel cylinders 38a for controlling fluid pressure to be applied to the rear wheel cylinders and whereby controlling braking pressure to be applied to rear brake disc rotors 36 through rear brake shoe assemblies 38a.

It should be appreciated that through the controller units 202, 204 and 206 are adapted to control respectively the front-left, front-right and rear brake circuits 302, 304 and 306, since the embodiment shown is directed to an anti-skid brake control system for a vehicle having a driving arrangement of a front-engine, rear wheekl drive vehicle, the invention can be modified to apply any driving arrangement of the vehicle, such as front-engine, front wheel drive or four wheel drive arrangements. In addition, though the disclosed brake system comprises disc brakes, the anti-skid brake control system according to the invention can also be applied to drum-type brake system.

The controller units 202, 204 and 206 are respectively associated with actuator drive circuits to control operations of corresponding actuators 16, 18 and 20. In addition, each of the controller units 202, 204 and 206 is connected to a corresponding wheel speed sensor 10, 12 and 14 via shaping circuit incorporated in the controller 200. Each of the wheel speed sensors 10, 12 and 14 is adapted to produce an alternating-current sensor signal having a frequency related to or proportional to the rotation speed of the corresponding vehicle wheel. Each of the A-C sensor signals is converted by the corresponding shaping circuit into a rectangular pulse signal which will be hereafter referred to as "sensor pulse signal". As can be appreciated, since the frequency of the A-C sensor signals is proportional to the wheel speed, the frequency of the sensor pulse signal should correspond to the wheel rotation speed and the pulse intervals thereof will be inversely proportional to the wheel rotation speed.

The controller units 202, 204 and 206 operate independently and continuously process the sensor pulse signal to derive control signals for controlling the fluid pressure in each of the wheel cylinders 30a, 34a and 38a in such a way that the slip rate R at each of the vehicle wheels is optimized to shorten the distance required to stop the vehicle, which distance will be hereafter referred to as "braking distance".

In general, each controller unit 202, 204 and 206 monitors receipt of the corresponding sensor pulses so that it can derive the pulse interval between the times of receipt of successive sensor pulses. Based on the derived pulse interval, the controller units 202, 204 and 206 calculate instantaneous wheel speed $V_w$ and instantaneous wheel acceleration or deceleration $a_w$. From these measured and derived values, a target wheel speed $V_i$ is derived, which is an assumed value derived from the wheel speed at which a slip is assumed to zero or approximately zero. The target wheel speed $V_i$ varies at a constant decelerating rate derived from variation of the wheel speed. The target wheel speed thus corresponds to a vehicle speed which itself is based on variations of the wheel speed. Based on the difference between the instantaneous wheel speed $V_w$ and the target wheel speed $V_i$, a slip rate R is derived. The controller units 202, 204 and 206 determine the appropriate operational mode for increasing, decreasing or holding the hydraulic brake pressure applied to the wheel cylinders 30a, 34a and 38a. The control mode in which the brake pressure is increased will be hereafter referred to as "application mode". The control mode in which the brake pressure is decreased will be hereafter referred to as "release mode". The mode in which the brake pressure is held essentially constant will be hereafter referred to as "hold mode". The anti-skid control operation consists of a loop of the application mode, hold mode, release mode and hold mode. This loop is repeated throughout the anti-skid brake control operation cyclically. One cycle of the loop of the control variation will be hereafter referred to as "skid cycle".

Figure 2:
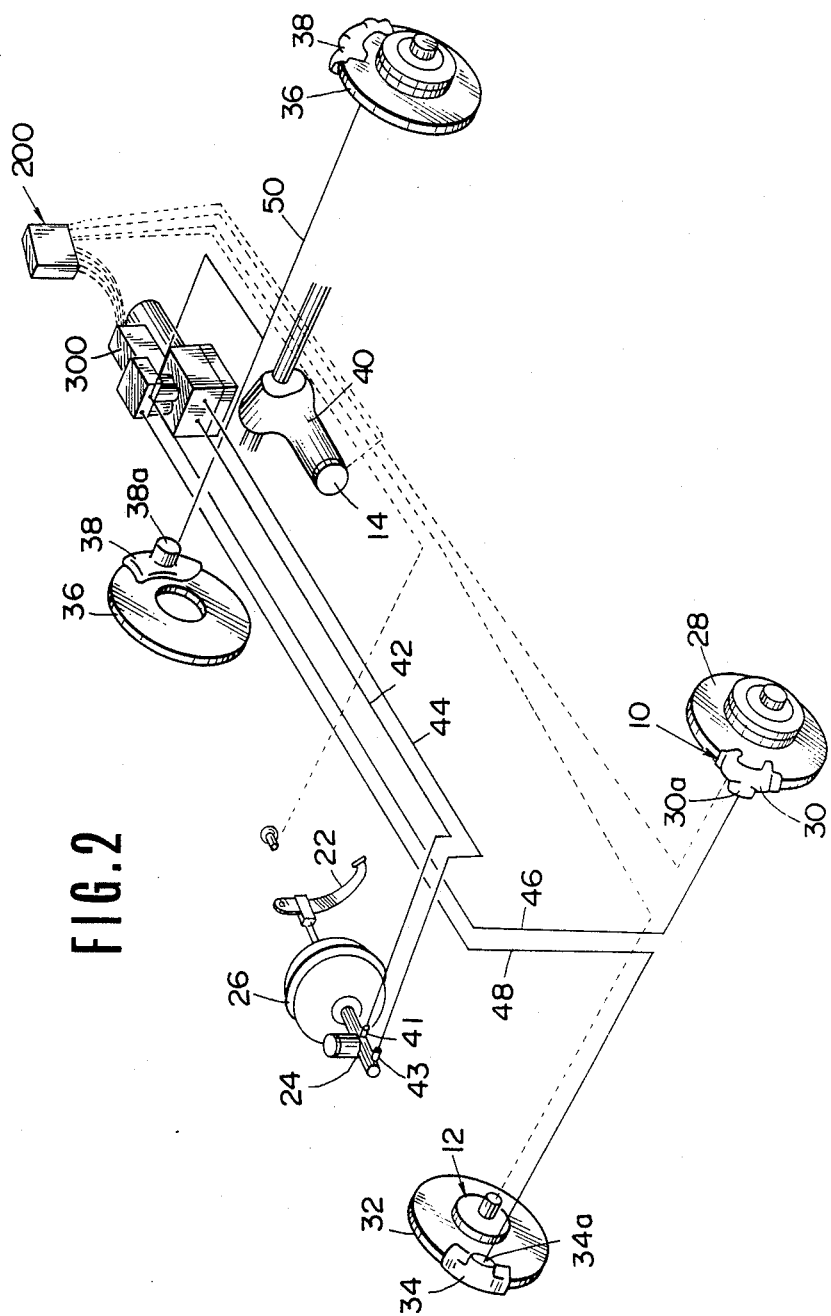
FIG. 2 is a diagram in perspective of the hydraulic circuits of the anti-skid brake system according to the present invention.

FIG. 2 shows portions of the hydraulic brake system of an automotive vehicle to which the preferred embodiment of the anti-skid control system is applied. The wheel speed sensors 10 and 12 are respectively provided adjacent the brake disc rotor 28 and 32 for rotation therewith so as to produce sensor signals having frequencies proportional to the wheel rotation speed and variable in accordance with variation of the wheel speed. On the other hand, the wheel speed sensor 14 is provided adjacent a propeller shaft near the differential gear box or drive pinion shaft 116 for rotation therewith. Since the rotation speeds of the left and right rear wheels are free to vary independently depending upon driving conditions due to the effect of the differential gear box 40, the rear wheel speed detected by the rear wheel speed sensor 14 is the average of the speeds of the left and right wheels. Throughout the specification, "rear wheel speed" will mean the average rotation speed of the left and right rear wheels.

As shown in FIG. 2, the actuator unit 300 is connected to a master wheel cylinder 24 via primary and secondary outlet ports 41 and 43 thereof and via pressure lines 44 and 42. The master wheel cylinder 24 is, in turn, associated with a brake pedal 22 via a power booster 26 which is adapted to boost the braking force applied to the brake pedal 22 before applying same to the master cylinder. The actuator unit 300 is also connected to wheel cylinders 30a, 34a and 38a via brake pressure lines 46, 48 and 50.

Figure 3:
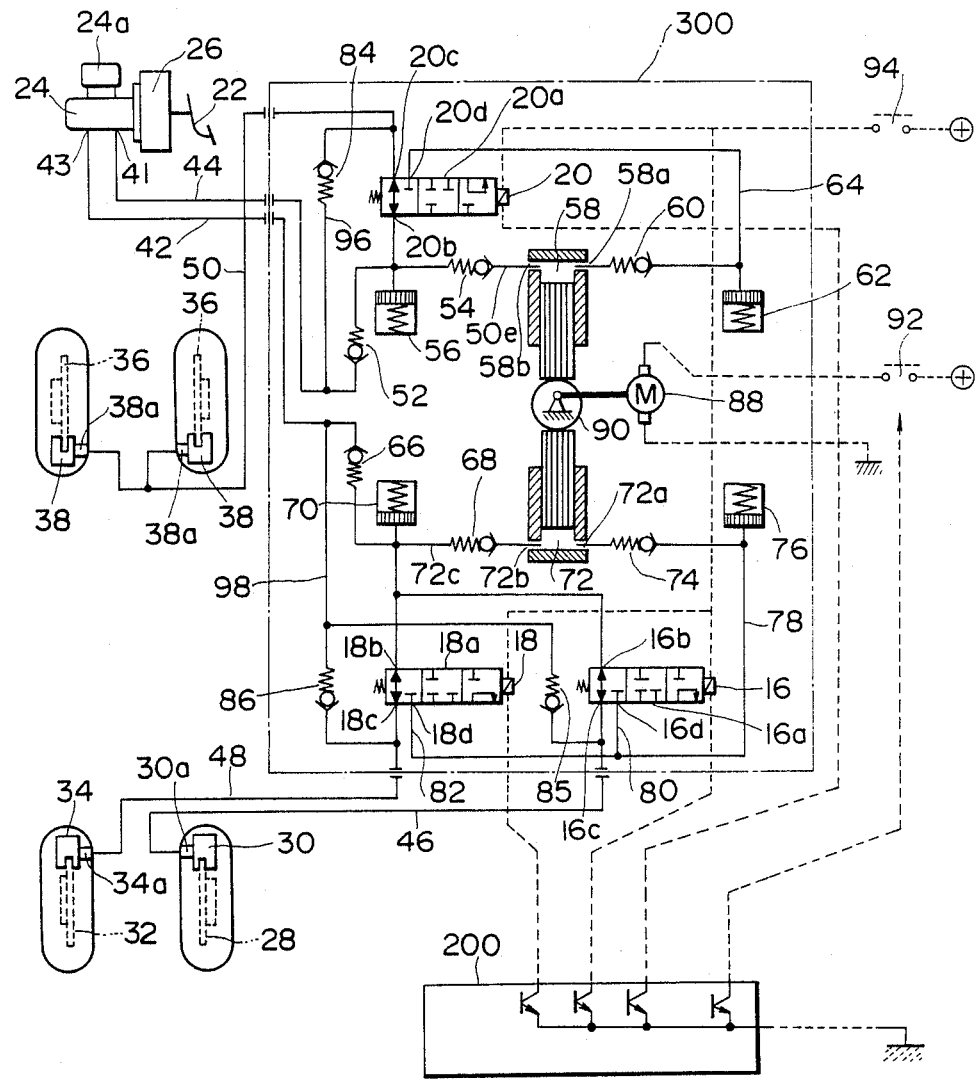
FIG. 3 is a circuit diagram of the hydraulic circuits used in the anti-skid control according to the present invention.

The circuit lay-out of the hydraulic brake system circuit will be described in detail below with reference to FIG. 3 which is only an example of the hydraulic brake system to which the preferred embodiment of the anti-skid control system according to the present invention can be applied, and so it should be appreciated that it is not intended to limit the hydraulic system to the shown embodiment. In FIG. 3, the secondary outlet port 43 is connected to the inlet ports 16b and 18b of electromagnetic flow control valves 16a and 18a, the respective outlet ports 16c and 18c of which are connected to corresponding left and right wheel cylinders 30a and 34a, via the secondary pressure line 46 and 48.

The primary outlet port 41 is connected to the inlet port 20b of the electromagnetic valve 20a, the outlet port 20c of which is connected to the rear wheel cylinders 38a, via a primary pressure line 50.

A bypass passage 21c is provided to bypass the flow control valve 20a and connect the upstream of the inlet valve and downstream of the outlet valve directly. An auxiliary flow control valve 21 with an electromagnetic actuator 21a is disposed in the bypass passage 21c. A valve member 21b is normally biased to block fluid communication through the bypass passage 21c and opens to permit fluid flow through the bypass passage when the actuator 21a is energized.

The electromagnetic values 16a, 18a and 20a also have drain ports 16d, 18d and 20d. The drain ports 16d and 18d are connected to the inlet port 72a of a fluid pump 90 via drain passages 80, 82 and 78. The fluid pump 90 is associated with an electric motor 88 to be driven by the latter which is, in turn, connected to a motor relay 92, the duty cycle of which is controlled by means of a control signal from the control module 200. While the motor relay 92 is energized to be turned ON, the motor 88 is in operation to drive the fluid pump 90. The drain port 20d of the electromagnetic flow control valve 20a is connected to the inlet port 58a of the fluid pump 90 via a drain passage 64.

The outlet ports 72b and 58b are respectively connected to the pressure lines 42 and 44 via a return passages 72c and 58c. The outlet ports 16c, 18c and 20c of respective electromagnetic flow control valves 16a, 18a and 20a are connected to corresponding wheel cylinders 30a, 34a and 38a via braking lines 46, 48 and 50. Bypass passages 96 and 98 are provided to connect the braking pressure lines 46 and 48, and 50 respectively to the pressure lines 42 and 44, bypassing the electromagnetic flow control valves.

Pump pressure check valves 52 and 66 are installed in the pressure lines 42 and 44. Each of the pump pressure checks valves 66 and 52 is adapted to prevent the working fluid pressurized by the fluid pump 90 from transmitting pressure surges to the master cylinder 24. Since the fluid pump 90 is designed for quick release of the braking pressure in the braking pressure lines 46, 48 and 50 and thus releasing the wheel cylinders 30a, 34a and 38a from the braking pressure, it is driven upon release of the brake pedal. This would result in pressure surges in the working fluid from the fluid pump 90 to the master cylinder 24 if the pump pressure check valves 66 and 52 were not provided. The pump pressure check valves 66 and 52 serve as one-way check valves allowing fluid flow from the master cylinder 24 to the inlet ports 16b, 18b and 20b of the electromagnetic valves 16a, 18a and 20a. Pressure accumulators 70 and 56 are installed in the pressure lines 42 and 44, which pressure accumulators serve to accumulate fluid pressure generated at the outlet ports 72b and 58b of the fluid pump 90 while the inlet ports 16b, 18b and 20b are closed. Toward this end, the pressure accumulators 70 and 56 are connected to the outlet ports 72b and 58b of the fluid pump 90 via the return passages 72c and 58c. Outlet valves 68 and 54 are one-way check valves allowing one-way fluid communication from the fluid pump to the pressure accumulators. These outlet valves 68 and 54 are effective for preventing the pressure accumulated in the pressure accumulators 70 and 56 from surging to the fluid pump when the pump is deactivated. In addition, the outlet valves 68 and 54 are also effective to prevent the pressurized fluid flowing through the pressure lines 42 and 44 from flowing into the fluid pump 90 through the return passages 72c and 58c.

Inlet check valves 74 and 60 are inserted in the drain passages 78 and 64 for preventing surge flow of the pressurized fluid in the fluid pump 90 to the electromagnetic flow control valves 16a, 18a and 20a after the braking pressure in the wheel cylinders is released. The fluid flowing through the drain passages 78 and 64 is temporarily retained in fluid reservoirs 76 and 62 connected to the former.

Bypass check valves 85, 86 and 84 are inserted in the bypass passages 98 and 96 for preventing the fluid in the pressure lines 42 and 44 from flowing to the braking pressure lines 46, 48 and 50 without first passing through the electromagnetic flow control valves 16a, 18a and 20a. On the other hand, the bypass check valves 85, 86 and 84 are adapted to permit fluid flow from the braking pressure line 46, 48 and 50 to the pressure lines 42 and 44 when the master cylinder 24 is released and thus the line pressure in the pressure lines 42 and 44 becomes lower than the pressure in the braking pressure lins 46, 48 and 50.

The electromagnetic flow control valves 16a, 18a and 20a are respectively associated with the actuators 16, 18 and 20 to be controlled by means of the control signals from the control module 200. The actuators 16, 18 and 20 are all connected to the control module 200 via an actuator relay 94, which thus controls the energization and deenergization of them all. Operation of the electromagnetic valve 16a in cooperation with the actuator 16 will be illustrated with reference to FIGS. 4, 5, 6 and 7, in particular illustrating one complete cycle through the application mode, hold mode, release mode and again the hold mode.

It should be appreciated that the operation of the electromagnetic valves 18a and 20a are substantially the same as that of the valve 16a. Therefore, disclosure of the valve operations of the electromagnetic valves 18a and 20a is omitted in order to avoid unnecessary repetition and for simplification of the disclosure.

APPLICATION MODE

In this position, the actuator 16 remains deenergized. An anchor of the electromagnetic valve 16a thus remains in its initial position allowing fluid flow between the inlet port 16b and the outlet port 16c so that the pressurized fluid supplied from the master cylinder 24 via the pressure line 42 may flow to the left front wheel cylinder 30a, via the braking pressure line 46. In this valve position, the drain port 16d is closed to block fluid flow from the pressure line 42 to the drain passage 78. As a result, the line pressure in the braking pressure line 46 is increased in proportion to the magnitude of depression of the brake pedal 22 and thereby the fluid pressure in the left front wheel cylinder 30a is increased correspondingly.

In this case, when the braking force applied to the brake pedal is released, the line pressure in the pressure line 42 drops due to return of the master cylinder 24 to its initial position. As a result, the line pressure in the braking pressure line 46 becomes higher than that in the pressure line 42 and so opens the bypass valve 85 to permit fluid flow through the bypass passage 98 to return the working fluid to the fluid reservoir 24a of the master cylinder 24.

In the preferring construction, the pump pressure check valve 66, normally serving as a one-way check valve for preventing fluid flow from the electromagnetic valve 16a to the master cylinder 24, becomes wide-open in response to drop of the line pressure in the pressure line below a given pressure. This allows the fluid in the braking pressure line 46 to flow backwards through the electromagnetic valve 16a and the pump pressure check valve 66 to the master cylinder 24 via the pressure line 42. This function of the pump pressure check valve 66 facilitates full release of the braking pressure in the wheel cylinder 30a.

For instance, the bypass valve 85 is rated at a given set pressure, e.g. 2 kg/cm$^2$ and closes when the pressure difference between the pressure line 42 and the braking pressure line 46 drops below the set pressure. As a result, fluid pressure approximating the bypass valve set pressure tends to remain in the braking pressure line 46, preventing the wheel cylinder 30a from returning to the fully released position. In order to avoid this, in the shown embodiment, the one-way check valve function of the pump pressure check valve 66 is disabled when the line pressure in the pressure line 42 drops below a predetermined pressure, e.g. 10 kg/cm$^2$. When the line pressure in the pressure line 42 drops below the predetermined pressure, a bias force normally applied to the pump pressure check valve 66 is released, freeing the valve to allow fluid flow from the braking pressure line 46 to the master cylinder 24 via the pressure line 42.

HOLD MODE

Figure 5:
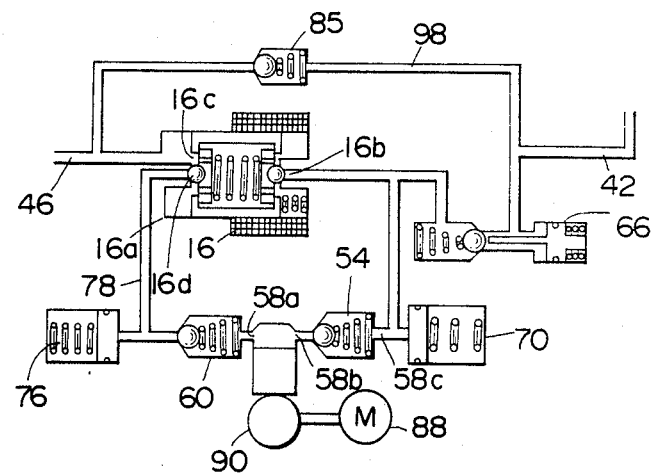
FIG. 5 is a view similar to FIG. 4 but of the valve in a holding mode in which the fluid pressure in the wheel cylinder is held at a substantially constant increased value.
Figure 7:
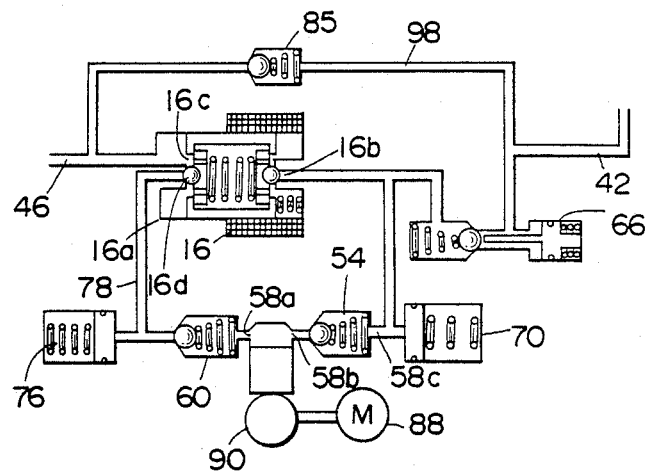
FIG. 7 is a view similar to FIG. 4 but of the valve in a holding mode in which the fluid pressure in the wheel cylinder is held at a substantially decreased constant value.

In this control mode of FIGS. 5 and 7, a limited first valve, e.g. 2A of electric curent serving as the control signal is applied to the actuator 16 to position the anchor closer to the actuator 16 than in the previous case. As a result, the inlet port 16b and the drain port 16d are closed to block fluid communication between the pressure line 42 and the braking pressure line 46 and between the braking pressure line and the drain passage 78. Therefore, the fluid pressure in the braking pressure line 46 in held at the level constant at the moment the actuator is operated by the control signal.

In this case, the fluid pressure applied through the master cylinder flows through the pressure check valve 66 to the pressure accumulator 70.

RELEASE MODE

In this control mode, a maximum value, e.g. 5A of electric current serving as the control signal is applied to the actuator 16 to shift the anchor all the way toward the actuator 16. As a result, the drain port 16d is opened to establish fluid communication between the drain port 16d and the outlet port 16c. At this time, the fluid pump 90 serves to facilitate fluid flow from the braking pressure line 46 to the drain passage 78. The fluid flowing through the drain passage is partly accumulated in the fluid reservoir 76 and the remainder flows to the pressure accumulator 70 via the check valves 60 and 54 and the fluid pump 90.

It will be appreciated that, even in this release mode, the fluid pressure in the pressure line 42 remains at a level higher or equal to that in the braking pressure line 46, so that fluid flow from the braking pressure line 46 to the pressure line 42 via the bypass passage 98 and via the bypass check valve 85 will never occur.

In order to resume the braking pressure in the wheel cylinder (FL) 30a after once the braking pressure is reduced by positioning the electromagnetic valve 16a in the release position, the actuator 16 is again denergized. The electromagnetic valve 16a is thus returns to its initial position to allow the fluid flow between the inlet port 16b and the outlet port 16c so that the pressurized fluid may flow to the left front wheel cylinder 30a via the braking pressure line 46. As set forth the drain port 16d is closed to block fluid flow from the pressure line 42 to the drain passage 78.

As a result, the pressure accumulator 70 is connected to the left front wheel cylinder 30a via the electromagnetic valve 16a and the braking pressure line 46. The pressurized fluid in the pressure accumulator 70 is thus supplied to the wheel cylinder 30a so as to resume the fluid pressure in the wheel cylinder 30a.

At this time, as the pressure accumulator 70 is connected to the fluid reservoir 76 via the check valves 60 and 54 which allow fluid flow from the fluid reservoir to the pressure accumulator, the extra amount of pressurized fluid may be supplied from the fluid reservoir.

The design of the wheel speed sensors 10, 12 and 14 employed in the preferred embodiment of the anti-skid control system will be described in detail with reference to FIGS. 8 to 10.

Figure 8:
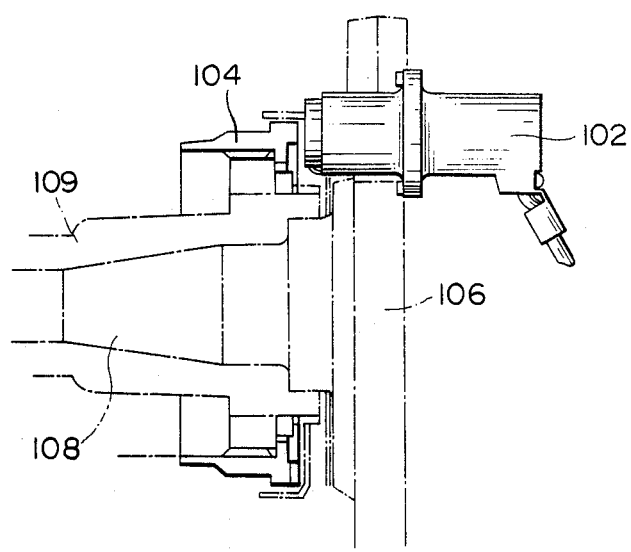
FIG. 8 is a side elevation of a wheel speed sensor which detects the speed of a front wheel.

FIG. 8 shows the structure of the wheel speed sensor 10 for detecting the rate of rotation of the left front wheel. The wheel speed sensor 10 generally comprises a sensor rotor 104 adapted to rotate with the vehicle wheel, and a sensor assembly 102 fixedly secured to the shim portion 106 of the knuckle spindle 108. The sensor rotor 104 is fixedly secured to a wheel hub 109 for rotation with the vehicle wheel.

Figure 10:
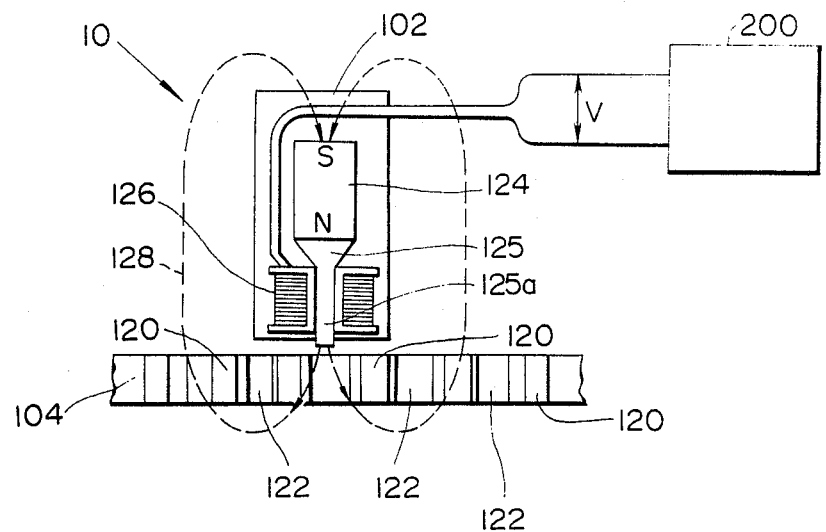
FIG. 10 is an explanatory illustration of the wheel speed sensor of FIGS. 8 and 9.
Figure 11:
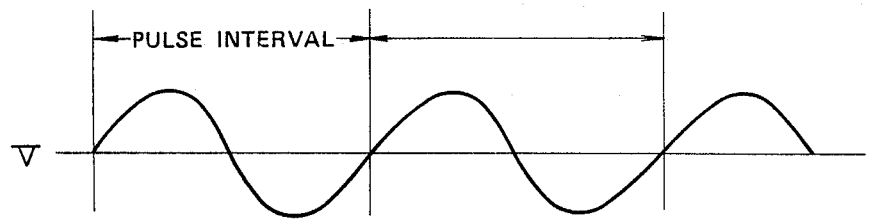
FIG. 11 shows the waveform of an alternating current sensor signal produced by the wheel speed sensor.

As shown in FIG. 10, the sensor rotor 104 is formed with a plurality of sensor teeth 120 at regular angular intervals. The width of the teeth 120 and the grooves 122 therebetween are equal in the shown embodiment and define a unit angle of wheel rotation. The sensor assembly 102 comprises a magnetic core 124 aligned with its north pole (N) near the sensor rotor 104 and its south pole (S) distal from the sensor rotor. A metal element 125 with a smaller diameter section 125a is attached to the end of the magnetic core 124 nearer the sensor rotor. The free end of the metal element 125 faces the sensor teeth 120. An electromagnetic coil 126 encircles the smaller diameter section 125a of the metal element. The electromagnetic coil 126 is adapted to detect variations in the magnetic field generated by the magnetic core 124 to produce an alternating-current sensor signal as shown in FIG. 10. That is, the metal element and the magnetic core 124 form a kind of proximity switch which adjusts the magnitude of the magnetic field depending upon the distance between the free end of the metal element 125 and the sensor rotor surface. Thus, the intensity of the magnetic field fluctuates in relation to the passage of the sensor teeth 120 and accordingly in relation to the angular velocity of the wheel.

It should be appreciated that the wheel speed sensor 12 for the right front wheel has the substantially the same structure as the set forth above. Therefore, explanation of the structure of the right wheel speed sensor 12 will be omitted in order to avoid unnecessary repetition in the disclosure and in order to simplify the description.

Figure 9:
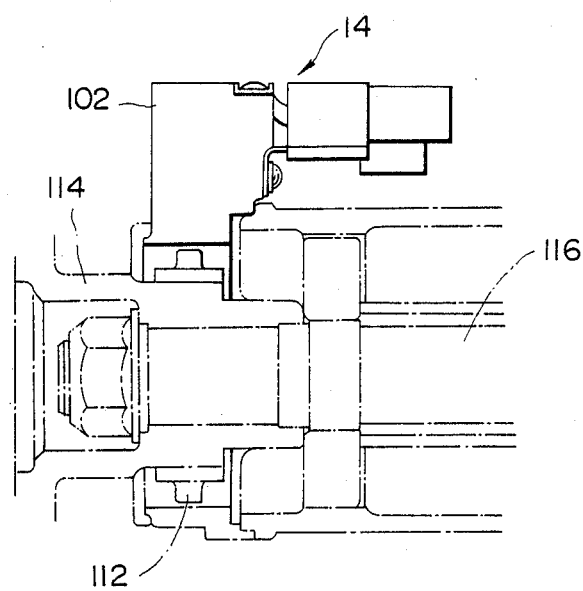
FIG. 9 is a side elevation of a wheel speed sensor applied to a rear wheel.

FIG. 9 shows the structure of the rear wheel speed sensor 14. As with the aforementioned left front wheel speed sensor 10, the rear wheel speed sensor 14 comprises a sensor rotor 112 and a sensor assembly 102. The sensor rotor 112 is associated with a companion flange 114 which is, in turn, rigidly secured to a drive shaft 116 for rotation therewith. Thus, the sensor rotor 112 rotates with the drive shaft 116. The sensor assembly 102 is fixed to a final drive housing or a differential gear box (not shown).

Each of the sensor assemblies applied to the left and right front wheel speed sensors and the rear wheel sensor is adapted to output an alternating-current sensor signal having a frequency proportional to or corresponding to the rotational speed of the corresponding vehicle wheel. The electromagnetic coil 126 of each of the sensor assemblies 102 is connected to the control module 200 to supply the ssensor signals thereto.

As set forth above, the control module 200 comprises the controller unit (FL) 202, the controller unit (FR) 204 and the controller unit (R) 206, each of which comprises a microcomputer. Therefore, the wheel speed sensors 10, 12 and 14 are connected to corresponding controller units 202, 204 and 206 and send their sensor signals thereto. Since the structure and operation of each of the controller units is substantially the same as that of the others, the structure and operation of only the controller unit 202 for performing the anti-skid brake control for the front left wheel cylinder will be explained in detail.

Figure 12:
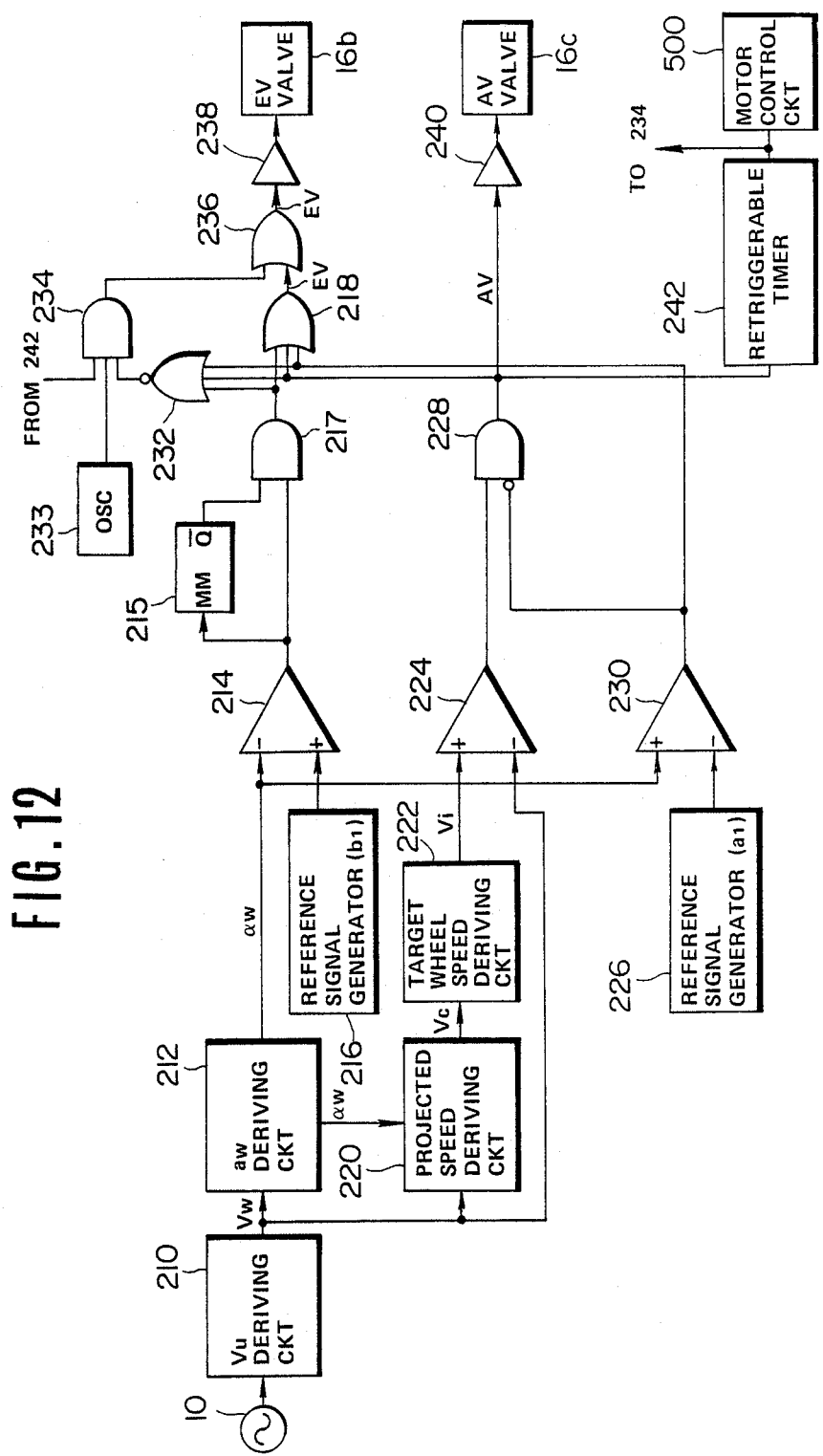
FIG. 12 is a block diagram of the first embodiment of a controller unit in the anti-skid brake control system according to the present invention.

FIG. 12 shows the first embodiment of controller unit 202 of the present invention. The controller units 204 and 206 are designed in substantially the same way as the controller unit described herebelow. Therefore, in order to simplify the disclosure, the detailed explanation of the controller units 204 and 206 will be omitted.

In FIG. 12, a wheel speed deriving circuit 210 is connected to the wheel speed sensor 10 to receive wheel speed indicative signals. The wheel speed deriving circuit 210 is adapted to output a wheel speed indicative signal having a value proportional to the pulse frequency of the wheel speed sensor signal from the wheel speed sensor. The wheel speed indicative signal is supplied to an acceleration deriving circuit 212. The wheel acceleration deriving circuit 212 differentiates the wheel speed indicative signal value to derive wheel acceleration value $a_w$ and outputs a wheel acceleration indicative signal. The wheel acceleration indicative signal is input to the negative input terminal of a differential amplifier 214. The positive input terminal of the differential amplifier 214 is connected to a reference signal generator 216 to receive a reference signal. The reference signal value is representative of a preset deceleration value, e.g. $-1G$. Therefore, as long as the wheel acceleration indicative signal value is greater than the preset deceleration value, the output level of the differential amplifier remains LOW. On the other hand, when the wheel acceleration indicative signal value becomes less than the preset deceleration value, output level of the differential amplifier 214 goes HIGH. The output of the differential amplifier 214 is supplied to one of the input terminals of an AND gate 217. The output of the differential amplifier 214 is also connected to a monostable multivibrator 215 which is triggered by the trailing edge of the HIGH level output of the differential amplifier 214 to output a LOW-level signal for a given period of time T. The inverted output terminal $\overline{Q}$ of the monostable multivibrator 215 is connected to the other input terminal of the AND gate 217. Therefore, the AND gate 217 is disabled from outputting the HIGH-level AND-gate signal for the period of time T during which the monostable multivibrator 215 outputs the LOW level signal. The AND gate 217 is, in turn, connected for output to one of three input terminals of an OR gate 218.

The wheel speed deriving circuit 210 is also connected to a projected speed deriving circuit 220. The projected speed deriving circuit is also connected to the wheel acceleration deriving circuit 212 to receive the wheel acceleration indicative signal. The projected speed deriving circuit 220 is adapted to latch the wheel speed indicative signal value when the wheel acceleration indicative signal value becomes equal to or greater than the preset deceleration value. The projected speed deriving circuit 220 includes memories for storing latched wheel speed indicative signal values of the current skid cycle and the immediately preceding skid cycle. In addition, the projected speed deriving circuit measures the interval between occurrences of latching of the wheel speed indicative signal values and from the measured period of time, the projected speed deriving circuit derives an average angular deceleration value. This deceleration value may used to derive a projected speed value for the next cycle of anti-skid control. For instance, each instantaneous projected speed may be derived by the following equation:

$$V_c = V_{wnew} + dV_w \times t$$

where $V_c$ is the projected speed;

$V_{wnew}$ is the wheel speed at which the wheel acceleration indicative signal value equal to or less than the preset deceleration value is obtained;

$dV_w$ is the derived deceleration value; and t is elapsed time since deviation of the value $V_{wnew}$.

The projected speed $V_c$ represents an estimated vehicle speed based on the measured wheel speed. The vehicle speed can be obtained directly from the wheel speed whenever zero slip can be assumed. Therefore, in the embodiment shown, it is assumed that, when the preset deceleration value, e.g. $-1G$, is obtained, wheel slip relative to the vehicle ground speed will be zero or negligible and so can ignored. The timing at which the wheel acceleration value becomes equal to or less than the preset deceleration value is thus regarded as cripping point for increasing wheel slippage relative to ehicle from zero by further decelerating operation.

In addition, it should be appreciated that, in the first cycle of anti-skid control, a fixed value, e.g. $-0.4G$ will be used as the deceleration value.

Procedures for deriving the projected speed can also be seen in the U.S. Pat. Nos. 4,392,202, issued July 5, 1983; 4,384,330, issued May 17, 1983; and 4,430,714 issued Feb. 7, 1984, respectively to the inventor of this invention and commonly assigned to the assignee of this invention. Disclosure of the above-identified U.S. patents are herewith incorporated by reference for the sake of disclosure.

Returning to FIG. 12, the projected speed deriving circuit 220 is connected to a target wheel speed deriving circuit 222. The target wheel speed deriving circuit 222 is adapted to derive a target wheel speed which is optimally related to the vehicle speed. The target wheel speed means a wheel speed to which the wheel speed is to be adjusted in order to obtain optimal braking characteristics. In general, as is well known, braking characteristics are optimized when wheel slippage relative to the vehicle speed is in the range of 15% to 20%. Therefore, according to the preferred embodiment of the invention, the target wheel speed is chosen to be 85% of the projected vehicle speed. The target wheel speed deriving circuit 222 thus outputs a target wheel speed indicative signal having a value corresponding to 85% of the projected speed.

The target wheel speed deriving circuit 222 is connected to the positive input terminal of a differential amplifier 224. The negative input terminal of the differential amplifier is connected to the wheel speed deriving circuit 210. The differential amplifier 224 compares the wheel speed indicative signal value with the target wheel speed indicative signal value and outputs a HIGH-level comparator signal as long as the wheel speed indicative signal value is less than the target wheel indicative signal value. On the other hand, the output level of the differential amplifier goes LOW when the wheel speed indicative signal value becomes greater than the target wheel speed indicative value. The output terminal of the differential amplifier 224 is connected to an AND gate 228 to supply the comparator output thereto.

The wheel acceleration deriving circuit 212 is also connected to the positive terminal of a differential amplifier 230. The negative input terminal of the differential amplifier 230 is connected to a reference signal generator 226. The reference signal generator 226 outputs a reference signal having a value representative of a preset acceleration value, e.g. 0.6G. The differential amplifier 230 outputs a HIGH-level signal when the wheel acceleration indicative signal value is greater than the reference signal value, and, conversely, a LOW-level signal when the wheel acceleration indicative signal value is less than the reference signal value.

The OR gate 218 connected to the output terminal of the AND gate 217 as set forth above, is also connected to the AND gate 228 to receive an AND gate signal therefrom. Also, the OR gate 218 is connected to the output terminal of the differential amplifier 230. The output terminal of the OR gate 218 is connected to one input terminal of another OR gate 236.

The output terminals of the AND gate 217 and the differential amplifier 230 are also connected to a NOR gate 232. The NOR gate 232 has another input terminal connected to a retriggerable timer 242 connected for input from the AND gate 228 and triggered by the leading edge of HIGH-level gate output of the AND gate 228. The retriggerable timer 242 is associated with a motor control circuit 500 for controlling the motor 88 of the fluid pump 90.

The output terminal of the NOR gate 232 is connected one of three input terminals of an AND gate 234. Another input terminal of the AND gate 234 is connected to an oscillator 233 which supplies pulse signals to the AND gate. The other input terminal of the AND gate 234 is connected to the retriggerable timer 242.

The differential amplifier 214 outputs a HIGH-level comparator signal when the wheel acceleration indicative signal value is less than the preset deceleration value. The preset deceleration value represents a pressure release threshold. Therefore, a HIGH-level output from comparator 214 indicates deceleration of the wheel beyond the pressure release threshold. The differential amplifier 230 outputs a HIGH-level comparator signal when the wheel acceleration indicative signal value is greater than the preset acceleration value. The preset acceleration value is representative of a pressure apply threshold. Therefore, a HIGH-level signal from comparator 230 indicates acceleration of the wheel beyond the pressure apply threshold. On the other hand, the differential amplifier 224 outputs a HIGH-level comparator signal when the wheel speed value is less than the target wheel speed value. Therefore, the output of the OR gate 218 is HIGH when wheel acceleration is less than the preset deceleration value or greater than the preset acceleration value, or when the wheel speed is less than the target wheel speed.

The output of the OR gate 218 is connected to one of the input terminals of an OR gate 236. The other input terminal of the OR gate 236 is connected to the AND gate 234.

Therefore, the output of the OR gate 218 goes HIGH when the output of the differential amplifier 214 goes HIGH while the monostable multivibrator 215 is quiescent, or while the output of the differential amplifier 230 or the AND gate 228 is HIGH. On the other hand, the output of the OR gate 346 goes HIGH in response to a HIGH-level output from the OR gate 218 or to a HIGH-level output from the AND gate 234, the latter of which goes HIGH in response to the pulses from the oscillator 233 in the presence of the HIGH-level signal from the retriggerable timer 242 and from the NOR gate 232. In other words, as long as the inputs from both the retriggerable timer 242 and the NOR gate remain HIGH, the output of the AND gate 234 goes HIGH at a frequency corresponding to the output frequency of the oscillator 233 and for a period of time corresponding to the pulse width of the oscillator's output pulses. This output of the AND gate 234 serves to increase the braking pressure in a stepwide fashion.

The output of the OR gate 236 is applied to the inlet (EV) valve 16b through an amplifier 238. The inlet valve 16b remains open as long as the output of the OR gate 236 remains LOW, thus increasing the fluid pressure in the hydraulic brake circuit, and closes when the input thereto goes HIGH.

The differential amplifier 224 is also connected for output to an AND gate 228. In addition, the differential amplifier 230 is connected to an inverting input terminal of the AND gate 228. The differential amplifier 224 outputs a HIGH-level comparator signal when wheel speed is less than the target wheel speed, the differential amplifier 230 outputs a LOW-level comparator signal when the wheel acceleration value is smaller the preset acceleration value, and the AND gate 228 outputs a HIGH-level gate signal only when both of these conditions are satisfied. Otherwise, the output oevel of the AND gate 228 remains LOW. The AND gate is connected for output to an amplifier 240 which in turn sends an amplifier signal to output valve as an outlet signal AV.

The AND gate 228 is also connected to a retriggerable timer 242. The retriggerable timer 242 is responsive to a HIGH-level output from the AND gate 228 to be triggered for a period of time longer than the maximum duration of one cycle of skid control. The retriggerable timer 242 is connected for output to the base electrode of a switching transistor 502 in a motor control circuit 500 which controls operation of the motor 88 of the fluid pump 90. The transistor 502 is rendered conductive by the HIGH-level trigger signal from the retriggerable timer 242 to energize a relay coil 504 connected to collector electrode thereof. A relay switch 506 is turned ON by energization of the relay coil 504 to close a power supply circuit for the motor 88. Therefore, the motor 88 is driven for the period of time for which the retriggerable timer 242 is triggered.

In the embodiment shown, the pressure control valve 16a including the inlet valve 16b and the outlet valve 16c operates in different operational modes as set out below:

| Operation Mode | EV | AV |
|---|---|---|
| APPLICATION MODE | LOW | LOW |
| HOLD MODE | HIGH | LOW |
| RELEASE MODE | HIGH | HIGH |

Figure 13:
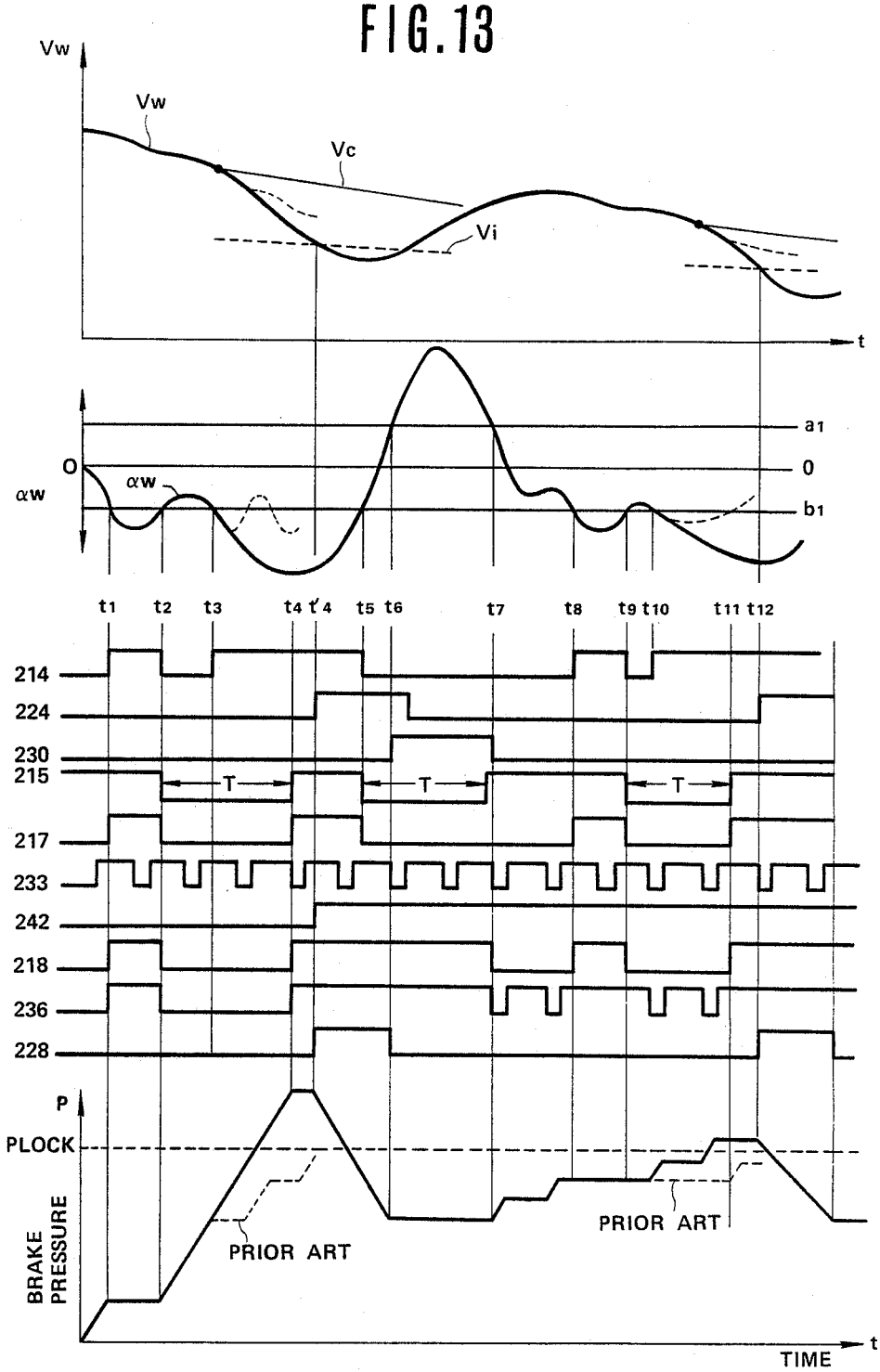
FIGS. 13 and 14 are timing charts for two examples of the operation of the first embodiment of the anti-skid brake control system according to the invention of FIG. 12.
Figure 14:
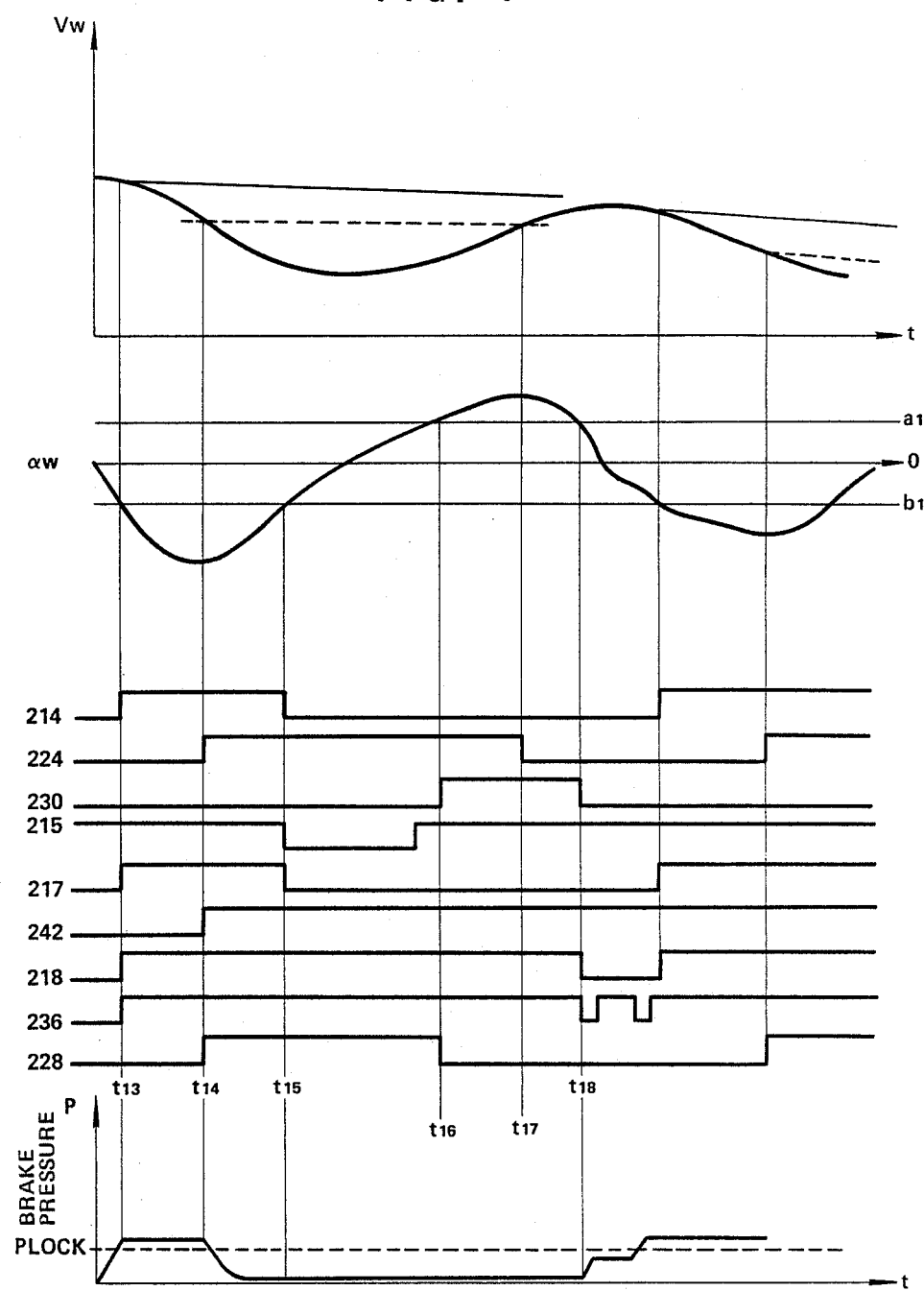

FIGS. 13 and 14 are timing charts for two examples of the operation of the above-mentioned first embodiment of the anti-skid brake control system in accordance with the present invention. FIG. 13 shows antiskid brake control on a road surface with high road/tire friction and FIG. 14 shows brake control operation on a surface with relatively low road/tire friction.

In FIG. 13, after initiating braking operation by applying a manual brake pedal or the like, the wheel speed $V_w$ drops. Wheel acceleration $a_w$ thus drops according to the increase in the braking pressure in the wheel cylinders of the hydraulic brake circuit. When the wheel acceleration $a_w$ drops below the pressure release threshold $(-b_1)$ at a time $t_1$, the output of the differential amplifier 214 goes HIGH. Since the monostable multivibrator 215 remains quiescent, the input to the OR gate 218 from the AND gate 217 goes HIGH. Therefore, a HIGH-level EV signal is applied to the inlet valve 16b to close the valve and block the brake pressure supply. At the same time, since the wheel acceleration is lower than the pressure-apply threshold $(+a_1)$ and since the wheel speed $V_w$ is higher than the target wheel speed $V_i$, the AV signal to be applied to the output valve 16c from the AND gate 228 remains LOW. Therefore, starting at time $t_1$, HOLD mode operation takes place.

If the road/tire friction of the road is at an average level, the wheel speed $V_w$ will drop further while the braking pressure remains constant. However, on a surface with relatively high road/tire friction, the wheel is driven to re-accelerate by the momentum of the vehicle. This results in recovery of the wheel acceleration $a_w$ to a level above the pressure release threshold $(-b_1)$ at a time $t_2$. In response to this, the output of the differential amplifier 214 goes from HIGH to LOW. In response to the LOW-level output of the differential amplifier 214, the EV signal applied to the inlet valve 16b goes LOW to open the valve. As a result, rapid build-up of braking pressure in each wheel cylinder of the hydraulic brake circuit is resumed.

In this case, since the retriggerable timer 242 remains quiescent, the input level at the AND gate 234 is LOW and so the AND gate 234 is held inactive, thus blocking transmission of the pulse signals from the oscillator 233 to the OR gate 236. Therefore, the braking pressure increases linearly instead of stepwise.

At the time $t_2$, the monostable multivibrator 215 is triggered by the trailing edge of the HIGH-level output of the differential amplifier 214. When triggered, the monostable multivibrator 215 outputs a LOW-level signal for the period T.

After the APPLICATION mode resumes at time $t_2$, the braking pressure increases and accordingly, the wheel speed $V_w$ and the wheel acceleration $a_w$ decrease. When the wheel acceleration $a_w$ again drops below the pressure release threshold $(-b_1)$ at a time $t_3$, the output of the differential amplifier 214 again goes HIGH. However, in this case, since the monostable multivibrator 215 is active, the AND condition of the AND gate 217 cannot be satisfied. Therefore, the EV signal is held LOW to allow the braking pressure to increase beyond a wheel lock pressure $P_{LOCK}$.

After the set period expires at a time $t_4$, the monostable multivibrator 215 goes quiescent. Since the wheel acceleration $a_w$ is still lower than the pressure release threshold, the output of the differential amplifier 214 remains HIGH. As a result, the output level of the AND gate 217 goes HIGH at the time $t_4$. Therefore, the EV signal applied to the inlet valve 16b goes HIGH to close the latter. The state at the time $t_4$ is essentially the same as at the time $t_1$. Thus, system enters HOLD mode. Since the braking pressure is held at a level exceeding the lock pressure $P_{LOCK}$, the wheel speed $V_w$ further decreases. At a time $t_{4'}$, shortly after time $t_4$, the wheel speed $V_w$ drops below the target wheel speed $V_i$.

As the wheel speed $V_w$ decreases below the target wheel speed $V_i$, the output of the differential amplifier 224 goes HIGH at the time $t_{4'}$. Since the wheel acceleration $a_w$ is still lower than the pressure-apply threshold, the inverted input to the AND gate 228 from the differential amplifier 230 remains HIGH. As a result, the output of the AND gate 228 goes HIGH. This output of the AND gate 228 serves as the AV signal for the outlet valve (AV) to open the outlet valve. At this time, since the inlet valve 16b is still held closed by the HIGH-level EV signal from the OR gate 236, the system starts to operate in the RELEASE mode to decrease braking pressure. Therefore, the wheel speed $V_w$ starts to increase again.

The wheel acceleration $a_w$ again increases beyond the pressure release threshold $(-b_1)$, at a time $t_5$. Therefore, at the time $t_5$, the output of the differential amplifier 214 goes LOW. The trailing edge of the HIGH-level input from the differential amplifier 214 triggers monostable multivibrator 215 to output a LOW-level signal for the period T.

At the same time, i.e., at the time $t_{4'}$, the retriggerable timer 242 is activated by the HIGH-level output of the AND gate 228. The set period of the retriggerable timer 242 continues for a period of time sufficient to hold the retriggerable timer active throughout the active period of the anti-skid brake control system.

At a time $t_6$, the wheel acceleration $a_w$ exceeds the pressure-apply threshold $(+a_1)$. Therefore, the output of the differential amplifier 230 goes HIGH. This violates the AND condition of the AND gate 228. As a result, the AV signal output by the AND gate 228 goes LOW to close the outlet valve 16c. At this time, since the output level of the OR gate 218 is still HIGH due to the HIGH-level input from the differential amplifier 230, the EV signal remains HIGH to hold the inlet valve 16b closed. Therefore, the system operates in HOLD mode.

As a result, wheel acceleration $a_w$ again drops to below the pressure-apply threshold ($+a$) at a time $t_7$. Since the wheel acceleration $a_w$ is still higher than the pressure release threshold ($-b_1$) and the output of the AND gate 228 is LOW at the time $t_7$, the output level of the OR gate 218 goes LOW. At this time, the NOR condition of the NOR gate 232 is satisfied, and a HIGH-level input is available from the retriggerable timer 242, so the AND gate 234 can transmit input pulses from the oscillator 233 to the OR gate 236. As will be seen from FIG. 13, the pulse train output from the AND gate 234 has on-periods $T_1$ and off-periods $T_2$. The output of the OR gate 236 serving as the EV signal alternates between HIGH and LOW levels for periods corresponding to the on- and off-periods of the pulse train from the AND gate 234. This causes the system to alternate between the APPLICATION mode and the HOLD mode. This results in stepwise increases in the braking pressure.

This stepwise increase in the braking pressure, causes the wheel speed $V_w$ and the wheel acceleration $a_w$ to decrease. At a time $t_8$, the wheel acceleration $a_w$ drops across the pressure release threshold ($-b_1$). As a result, the output level of the differential amplifier 214 again goes HIGH. Until a time $t_9$, the wheel acceleration $a_w$ is held below the pressure release threshold ($-b_1$) so that the output of the differential amplifier 214 remains HIGH. Therefore, throughout the period from the time $t_8$ to the time $t_9$, the output of the OR gate 218 remains HIGH, ensuring a HIGH-level EV signal irrespective of the instantaneous level of the pulse train.

At the time $t_9$, the monostable multivibrator 215 is again triggered by the trailing edge of the HIGH-level output of the differential amplifier. Therefore, at least for the period T over which the monostable multivibrator 215 is active, the output of the OR gate 218 remains LOW. Therefore, even when the wheel acceleration $a_w$ drops below the pressure release threshold ($-b_1$) at the time $t_{10}$, resulting in a HIGH-level output from the differential amplifier 214, the output of the AND gate 217 will remain LOW. Therefore, stepwise braking pressure increase continues until the monostable multivibrator 215 become quiescent. At the time $t_{11}$, the set trigger period of the monostable multivibrator 215 expires. At this time, since the wheel acceleration $a_w$ is still lower than the pressure release threshold ($-b_1$), the output of the AND gate 217 immediately goes HIGH to induce a HIGH-level EV signal. Therefore, system enters HOLD mode. At a time $t_{12}$, the wheel speed $V_w$ decreases to less than the target wheel speed $V_i$. The output of the differential amplifier 224 goes HIGH, inducing a HIGH-level AV signal as described with respect to the time $t_4$. Since, at this time $t_{12}$, the EV signal also remains HIGH, the system operates in RELEASE mode.

In FIG. 14, as in the skid control operation discussed with reference to FIG. 13, the system enters the HOLD mode at a time $t_{13}$. As vehicular braking operation is performed, in this example, on a relatively low-friction or slippery road surface, the wheel lock pressure $P_{LOCK}$ is lower than that of the example of FIG. 13. Holding the braking pressure constant causes the wheel speed $V_w$ to drop below the target wheel speed $V_i$. At a time $t_{14}$, the system enters the RELEASE mode operation. Upon releasing the braking pressure, the wheel acceleration $a_w$ recovers to a level exceeding the pressure-release threshold at a time $t_{15}$. Due to the relatively low friction, the target wheel speed $V_i$ projected for the time $t_{14}$ is relatively high. Therefore, the wheel speed $V_w$ will exceed the target wheel speed $V_i$ long after the wheel acceleration $a_w$ passes the pressure release threshold ($-b_1$). For instance, in the example shown in FIG. 14, the wheel speed $V_w$ exceeds the target wheel speed $V_i$ at a time $t_{17}$. During this wheel speed recovery period ($t_{17}-t_{15}$), the wheel acceleration $a_w$ increases to a level exceeding the pressure-apply threshold ($+a_1$) at a time $t_{16}$. At this time, the anti-skid control system enters the HOLD mode. The HOLD mode continues until the wheel acceleration again drops below the pressure-apply threshold. After the wheel acceleration drops below the pressure-apply threshold ($+a_1$) at a time $t_{18}$, the system switches again to the APPLICATION mode. Although the timing chart of FIG. 14 does not show the outputs of the AND gate 234 and the oscillator 233, since the retriggerable timer 242 is active at the time $t_{18}$, pressure increase in the APPLICATION mode is performed in a stepwise fashion mediated the pulse train from the AND gate 234.

As will be appreciated herefrom, according to the first embodiment of the anti-skid brake control system according to the invention, quick take-up of the braking pressure can be achieved on relatively high-friction road surfaces while also allowing moderate increase of the braking pressure on slippery roads. Therefore, the disclosed system optimizes the braking characteristics according to road surface conditions.

FIGS. 15 to 25 show another embodiment of the anti-skid brake control system according to the present invention. In this embodiment, the present invention is applied to a microprocessor-based digital control system. In order to make the alternating-current wheel sensor signal applicable to the digital control system, the sensor signal is converted into a train of pulses separated by intervals corresponding to or representative of the detected peripheral speed of the wheel. Before explaining the shown embodiment, the theory of anti-skid brake control by means of the digital control system will be briefly described hereinbelow for the sake of better understanding of the invention.

The wheel rotation speed $V_w$ is calculated in response to each sensor pulse. As is well known, the wheel speed is generally inversely proportional to the intervals between the sensor pulses, and accordingly, the wheel speed $V_w$ is derived from the interval between the last sensor pulse input time and the current sensor pulse input time. A target wheel speed is designated $V_i$ and the resultant wheel speed is designated $V_w$. In addition, the slip rate is derived from the rate of change of the wheel speed and an projected speed $V_v$ which is estimated from the wheel speed at the moment the brakes are applied based on the assumption of a continuous, linear deceleration without slippage. In general, the target wheel speed $V_i$ is derived from the wheel speed of the last skid cycle during which the wheel deceleration rate was equal to or less than a given value which will be hereafter referred to as "deceleration threshold $a_{ref}$", and the wheel speed of the current skid cycle, and by estimating the rate of change of the wheel speed between wheel speeds at which the rate of deceleration is equal to or less than the deceleration threshold. In practice, the first target wheel speed $V_i$ is derived based on the projected speed $V_v$ which corresponds to a wheel speed at the initial stage of braking operation and at which wheel deceleration exceeds a predetermined value, e.g. −1.2G, and a predetermined deceleration rate, for example 0.4G. The subsequent target wheel speed $V_i$ is derived based on the projected speeds $V_v$ in last two skid cycles. For instance, the deceleration rate of the target wheel speed $V_i$ is derived from a difference of the projected speeds $V_v$ in the last two skid cycle and a period of time in which wheel speed varies from the first projected speed to the next projected speed. Based on the last projected speed and the deceleration rate, the target wheel speed in the current skid cycle is derived.

The acceleration and deceleration of the wheel is derived based on the input time of successive three sensor pulses. Since the interval of the adjacent sensor signal pulses corresponds to the wheel speed, and the wheel speed is a function of the reciprocal of the interval, by comparing adjacent pulse-to-pulse intervals, a value corresponding to the variation or difference of the wheel speed may be obtained. The resultant interval may be divided by the period of time of the interval in order to obtain the wheel acceleration and deceleration at the unit time. Therefore, the acceleration or deceleration of the wheel is derived from the following equation:

$$a_w = \left(\frac{1}{C-B} - \frac{1}{B-A}\right) / \left(\frac{C-A}{2}\right) \quad (1)$$

where A, B and C are the input times of the sensor pulses in the order given.

On the other hand, the slip rate R is a rate of difference of wheel speed relative to the vehicle speed which is assumed as substantially corresponding to the target wheel speed. Therefore, in the shown embodiment, the target wheel speed $V_i$ is taken as variable or parameter indicative of the assumed or projected vehicle speed. The slip rate R can be obtained by dividing a difference between the target wheel speed $V_i$ and the instantaneous wheel speed $V_w$ by the target wheel speed. Therefore, in addition, the slip rate R is derived by solving the following equation:

$$R = \frac{V_i - V_w}{V_i} \quad (2)$$

Finally, the controller unit 202 determines the control mode, i.e., release mode, hold mode and application mode from the slip rate R and the wheel acceleration or deceleration $a_w$.

In anti-skid brake control, the braking force applied to the wheel cylinder is to be so adjusted that the peripheral speed of the wheel, i.e. the wheel speed, during braking is held to a given ratio, e.g. 85% to 80% of the vehicle speed. Therefore, the slip rate R has to be maintained below a given ratio, i.e., 15% to 10%. In the preferred embodiment, the control system controls the braking force so as to maintain the slip rate at about 15%. Therefore, a reference value $R_{ref}$ to be compared with the slip rate R is determined at a value at 85% of the projected speed $V_v$. As will be appreciated, the reference value is thus indicative of a slip rate threshold, which will be hereafter referred to "slip rate threshold $R_{ref}$" throughout the specification and claims, and varies according to variation of the target wheel speed.

Figure 4:
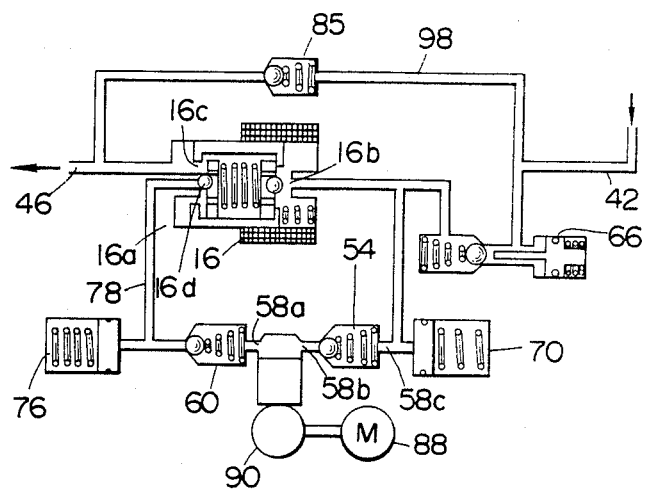
FIG. 4 is a diagram of the operation of an electromagnetic flow control valve employed in the hydraulic circuit in an application mode by which the fluid pressure in a wheel cylinder is increased.
Figure 6:
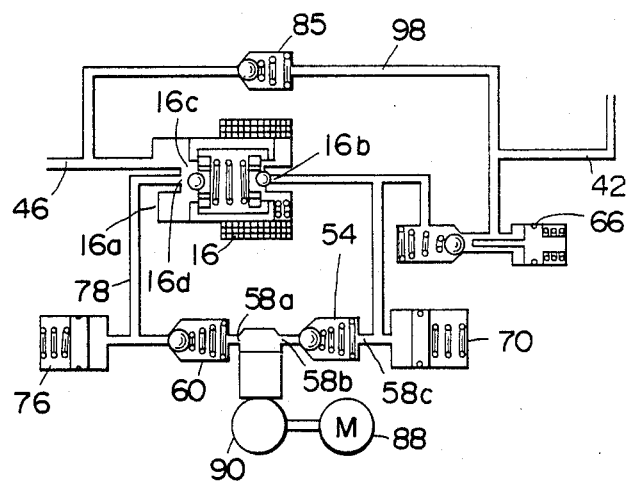
FIG. 6 is a view similar to FIG. 4 but of the valve in a release mode in which the fluid pressure in the wheel cylinder is reduced.

In practical brake control operation performed by the preferred embodiment of the anti-skid control system according to the present invention, the electric current applied to the actuator attains a limited value, e.g., 2 A to place the electromagnetic value 30a in the hold mode as shown in FIG. 5 when the wheel speed remains inbetween the target wheel speed $V_i$ and the slip rate threshold $R_{ref}$. When the slip rate derived from the target wheel spaced $V_i$ and the wheel speed $V_w$ becomes equal to or larger than the slip rate threshold $R_{ref}$, then the supply current to the actuator 16 is increased to a maximum value, e.g. 5 A to place the electromagnetic valve in the release mode as shown in FIG. 6. By maintaining the release mode, the wheel speed $V_w$ is recovered to the target wheel speed. When the wheel speed is thus recovered or resumed so that the slip rate R at that wheel speed becomes equal to or less than the slip rate threshold $R_{ref}$, then the supply current to the actuator 16 is dropped to the limited value, e.g. 2 A to return the electromagnetic value 30a to the hold mode. By holding the reduced fluid pressure in the wheel cylinder, the wheel speed $V_w$ is further resumed to the target wheel speed $V_i$. When the wheel speed $V_w$ is resumed equal to or higher than the target wheel speed $V_i$, the supply current is further dropped to zero for placing the electromagnetic valve in the application mode as shown in FIG. 4. The electromagnetic valve 30a is maintained in the application mode until the wheel speed is decelerated at a wheel speed at which the wheel deceleration becomes equal to or slightly more than the deceleration threshold $R_{ref}$ −1.2G. At the same time, the projected speed $V_v$ is again derived with respect to the wheel speed at which the wheel deceleration $a_w$ becomes equal to or slightly larger than the deceleration threshold $a_{ref}$. From a difference of speed of the last projected speed and the instant projected speed and the period of time from a time obtaining the last projected speed to a time obtaining the instant projected speed, a deceleration rate of the target wheel speed $V_i$ is derived. Therefore, assuming the last projected speed is $V_{v1}$, the instant projected speed is $V_{v2}$, and the period of time is $T_v$, the target wheel speed $V_i$ can be obtained from the following equation:

$$V_i = V_{v2} - (V_{v1} - V_{v2})/T_v \times t_e$$

where $t_e$ is an elapsed time from the time at which the instant projected speed $V_{v2}$ is obtained.

Based on the input timing to $t_1, t_2, t_3, t_4 \ldots$, deceleration rate $a_w$ is derived from the foregoing equation (1). In addition, the projected speed $V_v$ is estimated as a function of the wheel speed $V_w$ and rate of change thereof. Based on the instantaneous wheel speeds $V_{w1}$ at which the wheel deceleration is equal to or less than the deceleration threshold $a_{ref}$ and the predetermined fixed value, e.g. 0.4G for the first skid cycle of control operation, the target wheel speed $V_i$ is calculated. According to equation (2), the slip rate R is calculated, using successive wheel speed values $V_{w1}, V_{w2}, V_{w3} \ldots$ as parameters. The derived slip rate R is compared with the slip rate threshold $R_{ref}$. As the wheel speed $V_w$ drops below the projected speed $V_v$ at the time $t_1$, the controller unit 202 switches the control mode from the application mode to the hold mode. Assuming also that the slip rate R exceeds the slip rate threshold at the time $t_4$, then the controller unit 202 switches the control mode to the release mode to release the fluid pressure at the wheel cylinder.

Upon release of the brake pressure in the wheel cylinder, the wheel speed $V_w$ recovers, i.e. the slip rate R drops until it is smaller than the slip rate threshold at time $t_7$. The controller unit 202 detects when the slip rate R is smaller than the slip rate threshold $R_{ref}$ and switches the control mode from release mode to the hold mode.

By maintaining the brake system in the hold mode in which reduced brake pressure is applied to the wheel cylinder, the wheel speed increases until it reaches the projected speed. When the wheel speed $V_w$ becomes equal to the target wheel speed $V_i$, the controller unit 202 switches the control mode from the hold mode to the application mode.

As can be appreciated from the foregoing description, the control mode will tend to cycle through the control modes in the order application mode, hold mode, release mode and hold mode. This cycle of variation of the control modes will be referred to hereafter as "skid cycle". Practically speaking, there will of course be some hunting and other minor deviations from the standard skid cycle.

The projected speed $V_v$, which is meant to represent ideal vehicle speed behavior can be obtained directly from the wheel speed $V_w$ at that time since zero slip is assumed. At the same time, the deceleration value of the vehicle will be assumed to be a predetermined fixed value or the appropriate one of a family thereof, in order to enable calculation of the target wheel speed for the first skid cycle operation. Specifically, in the shown example, the projected speed $V_v$ will be derived from the wheel speed $V_{w1}$ at that time. Using the predetermined deceleration value, the projected speed will be calculated at each time the wheel deceleration $a_w$ in the application mode reaches the deceleration threshold $a_{ref}$.

The wheel deceleration $a_w$ becomes equal to or slightly greater than the deceleration threshold $a_{ref}$, then the second projected speed $V_{v2}$ is obtained at a value equal to the instantaneous wheel speed $V_w$. According to the above-mentioned equation, the deceleration value da can be obtained $$da=(V_{v1}-V_{v2})/(t_9-t_1)$$

Based on the derived deceleration rate da, the target wheel speed $V_i'$ for the second skid cycle of control operation is derived by:

$$V_i'=V_{v2}-da\times t_e$$

Based on the derived target wheel speed, the slip rate threshold $R_{ref}$ for the second cycle of control operation is also derived. As will be appreciated from FIG. 11, the control mode will be varied during the second cycle of skid control operation, to hold mode at time $t_9$ at which the wheel deceleration reaches the deceleration threshold $a_{ref}$ as set forth above, to release mode at time $t_{10}$ at which the slip rate R reaches the slip rate threshold $R_{ref}$, to hold mode at time $t_{11}$ at which the slip rate R is recovered to the slip rate threshold $R_{ref}$, and to application mode at time $t_{12}$ at which the wheel speed $V_w$ recovered or resumed to the target wheel speed $V_i'$. Further, it should be appreciated that in the subsequent cycles of the skid control operations, the control of the operational mode of the electromagnetic valve as set forth with respect to the second cycle of control operation, will be repeated.

Relating the above control operations to the structure of FIGS. 3 through 7, when application mode is used, no electrical current is applied to the actuator 16 of the electromagnetic valve 16a and to the actuator 17a of the auxiliary flow control valve 17 so that the inlet port 16b of the former valve 16a communicates with its outlet port 16c, allowing fluid flow between the pressure passage 42 and the brake pressure line 46. A limited amount of electrical current (e.g. 2A) is applied as to actuate the electromagnetic valve 16a to its limited stroke position by means of the actuator 16, and the maximum current is applied to the actuator as long as the wheel speed $V_w$ is not less than the projected speed and the slip rate is greater than the slip rate threshold $R_{ref}$. Therefore, the control mode is switched from the application mode to the hold mode and then to the release mode. The slip rate increases back up to the slip rate threshold $R_{ref}$, so that the control mode returns to the hold mode, the actuator driving the electromagnetic valve 16a to its central holding position with the limited amount of electrical current as the control signal. When the wheel speed $V_w$ finally returns to the level of the target wheel speed $V_i$, the actuator 16 supply current is cut off so that the electromagnetic valve 16a returns to its rest position in order to establish fluid communication between the pressure line 42 and the braking pressure line 46 via inlet and outlet ports 16b and 16c.

Figure 15:
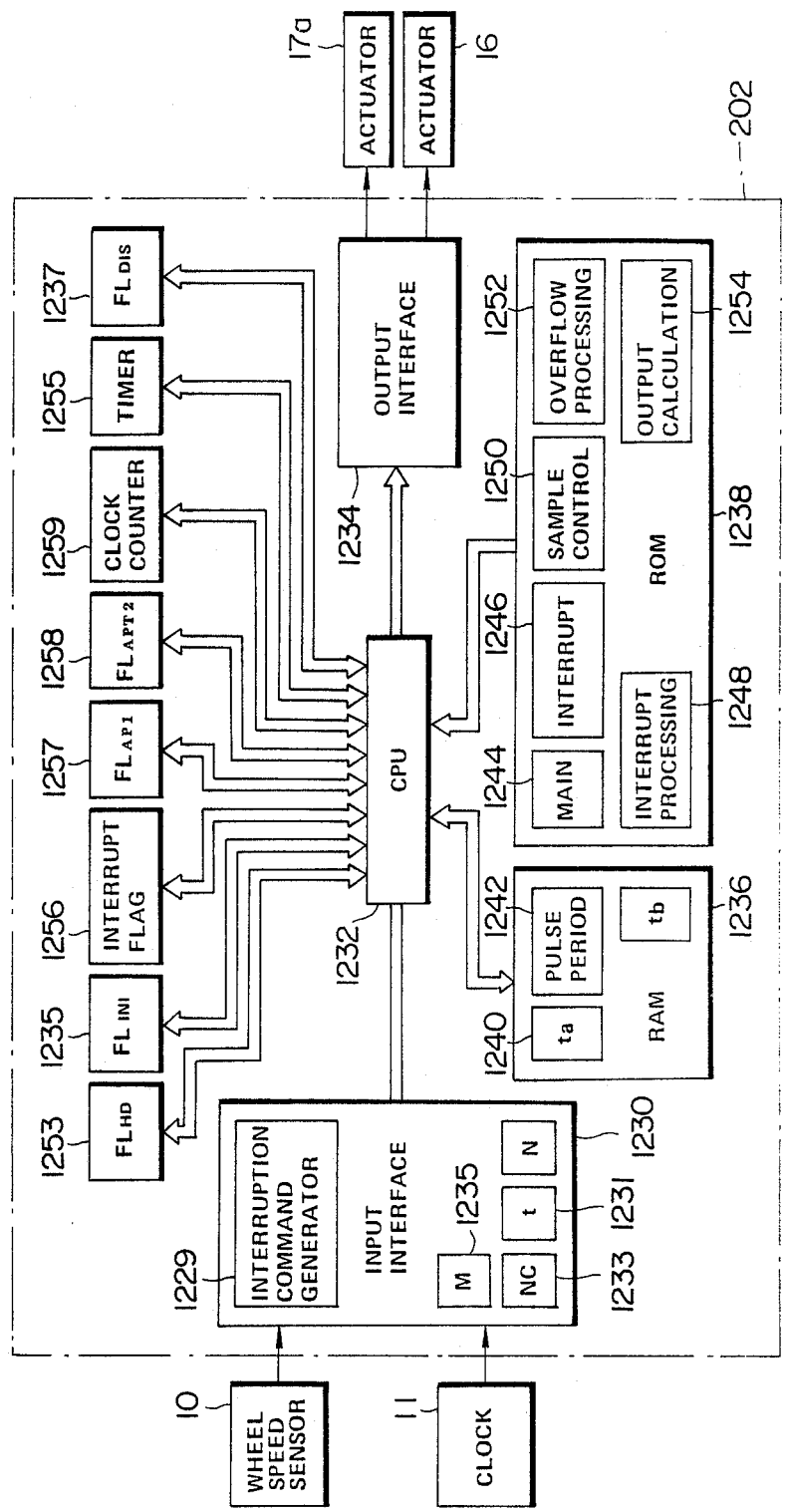
FIG. 15 is a block diagram of the second embodiment of a controller unit in the anti-skid brake control system according to the present invention.

Referring to FIG. 15, the controller unit 202 includes an input interface 1230, CPU 1232, and output interface 1234, RAM 1236 and ROM 1238. The input interface 1230 includes an interrupt command generator 1229 which produces an interrupt command in response to every sensor pulse. In ROM, a plurality of programs including a main program (FIG. 16), an interrupt program (FIG. 17), a sample control program, a timer overflow program and an output calculation program (FIG. 20) are stored in respectively corresponding address blocks 1244, 1246, 1250, 1252 and 1254.

The input interface also has a temporary register for temporarily holding input timing for the sensor pulses. RAM 1236 similarly has a memory block holding input timing for the sensor pulses. The contents of the memory block 1240 of RAM may be shifted whenever calculations of the pulse interval, wheel speed, wheel acceleration or deceleration, target wheel speed, slip rate and so forth are completed. One method of shifting the contents is known from the corresponding disclosure of the U.S. Pat. No. 4,408,290. The disclosure of the U.S. Pat. No. 4,408,290 is hereby incorporated by reference. RAM also has a memory block 1242 for holding pulse intervals of the input sensor pulses. The memory block 1242 is also adapted to shift the contents thereof according to the manner similar to set forth in the U.S. Pat. No. 4,408,290.

An interrupt flag 1256 is provided in the controller unit 202 for signalling interrupt requests to the CPU. The interrupt flag 256 is set in response to the interrupt command from the interrupt command generator 1229. A timer overflow interrupt flag 1258 is adapted to set an overflow flag when the measured interval between any pair of monitored sensor pulses exceeds the capacity of a clock counter.

In order to time the arrival of the sensor pulses, a clock is connected to the controller unit 202 to feed time signals indicative of elapsed real time. The timer signal value is latched whenever a sensor pulse is received and stored in either or both of the temporary register 1231 in the input interface 1230 and the memory block 1240 of RAM 1236.

The controller unit 202 also includes memory blocks 1235 and 1237 in RAM for storing the last two wheel acceleration values. The wheel acceleration value derived in the most recent calculation will be hereafter referred to as "new wheel acceleration $a_{wnew}$" and the wheel acceleration value derived in the immediately preceding calculation will be hereafter referred to as "old wheel acceleration $a_{wold}$". The memory block 1235 is adapted to store the new wheel acceleration $a_{wnew}$ and to be updated whenever a new wheel acceleration is derived. The content of the memory block 1235 is transferred to the memory block 1237 which is adapted to store the old wheel acceleration $a_{wold}$. The controller unit 202 also has a timer 1255 and flag registers 1257 and 1258 respectively adapted to hold flags $FL_{APT1}$ and $FL_{APT2}$. The flag $FL_{APT1}$ is indicative of the operation state of the pressure control system while the APPLICATION MODE is maintained for a period of time $T_1$ depending upon the peak value of wheel acceleration. The flag $FL_{APT2}$ is indicative of operation in the HOLD mode for a given fixed period $T_2$. The timer 1255 is adapted to measure the given period of time $T_1$ and $T_2$ and producing a signal indicative of elapsed time $t_a$.

The output interface 34 of the controller unit 202 is connected to the actuators 16 and 17a for feeding control signals.

The operation of the controller unit 202 and the function of each elements mentioned above will be described with reference to FIGS. 13 to 30.

Figure 20:
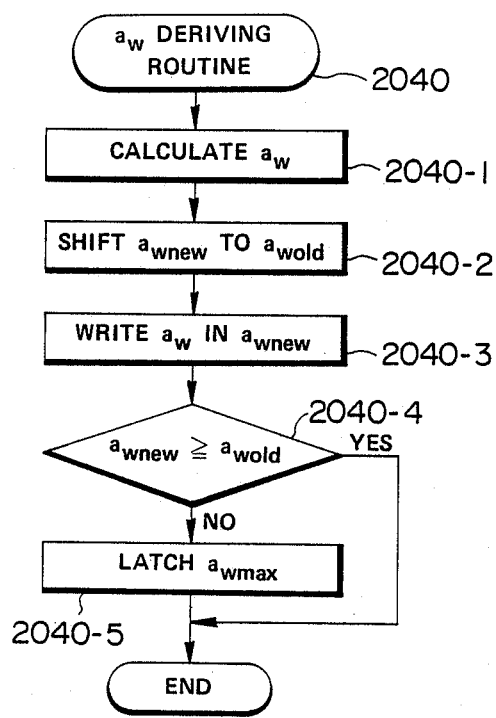
FIG. 20 is a flowchart of a wheel acceleration deriving routine in the main routine of FIG. 18.

FIG. 20 illustrates the main program for the anti-skid control system. Practically speaking, this program will generally be executed as a background job, i.e. it will have a lower priority than most other programs under the control of the same processor. Its first step 1002 is to wait until at least one sample period, covering a single sensor pulse or a group thereof, as described in more detail below, is completed as indicated when a sample flag FL has a non-zero value. In subsequent step 1004, the sample flag FL is checked for a value greater than one, which would indicate the sample period is too short. If this is the case, control passes to a sample control program labelled "1006" in FIG. 16 but shown in more detail in FIG. 17. If FL=1, then the control process is according to plan, and control passes to a main routine explained later with reference to FIG. 18. Finally, after completion of the main routine, a time overflow flag OFL is reset to signify successful completion of another sample processing cycle, and the main program ends.

Figure 17:
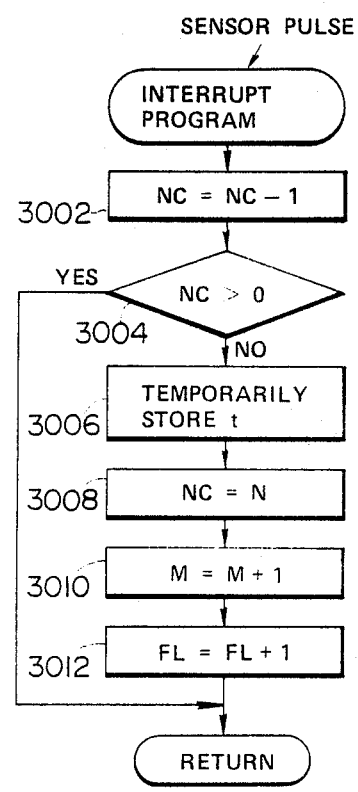
FIG. 17 is a flowchart of an interrupt program executed by the controller unit.

FIG. 17 shows the interrupt program stored in the memory block 1246 of ROM 1238 and executed in response to the interrupt command generated by the interrupt command generator 1229 whenever a sensor pulse is received. It should be noted that a counter value NC of an auxiliary counter 1233 is initially set to 1, a register N representing the frequency divider ratio is set at 1, and a counter value M of an auxiliary counter 1235 is set at −1. After starting execution of the interrupt program, the counter value NC of the auxiliary counter 233 is decremented by 1 at a block 3002. The auxiliary counter value NC is then checked at a block 3004 for a value greater than zero. For the first sensor pulse, since the counter value NC is decremented by 1 (1−1=0) at the block 3002 and thus is zero, the answer of the block 3004 is NO. In this case, the clock counter value t is latched in a temporary register 1231 in the input interface 1230 at a block 3006. The counter value NC of the auxiliary counter 1233 is thereafter assigned the value N in a register 1235, which register value N is representative of frequency dividing ratio determined during execution of the main routine explained later, at a block 3008. The value M of an auxiliary counter 1235 is then incremented by 1. The counter value M of the auxiliary counter 1235 labels each of a sequence of sample periods covering an increasing number of sensor pulses. After this, the sample flag FL is incremented by 1 at a block 3012. After the block 3012, interrupt program ends, returning control to the main program or back to block 3002, whichever comes first.

On the other hand, when the counter value NC is non-zero when checked at the block 3004, this indicates that not all of the pulses for this sample period have been received, and so the interrupt program ends immediately.

This interrupt routine thus serves to monitor the input timing t of each pulse sampling period, i.e. the time t required to receive NC pulses, and signals completion of each sample period (M=0 through M=10, for example) for the information of the main program.

Before describing the operation in the main routine, the general method of grouping the sensor pulses into sample periods will be explained to facilitate understanding of the description of the operation in the main routine.

In order to enable the controller unit 202 to accurately calculate the wheel acceleration $a_w$, it is necessary that the difference between the pulse intervals of the single or grouped sensor pulses exceeding a given period of time, e.g. 4 ms. In order to obtain the pulse interval difference exceeding the given period of time, 4 ms, which given period of time will be hereafter referred to as "pulse interval threshold S", some sensor pulses are ignored so that the recorded input timing t of the sensor pulse groups can satisfy the following formula:

$$dT = (C - B) - (B - A) \geq S(4\ ms.) \qquad (3)$$

where A, B and C are the input times the three successive sensor pulse groups.

Figure 16:
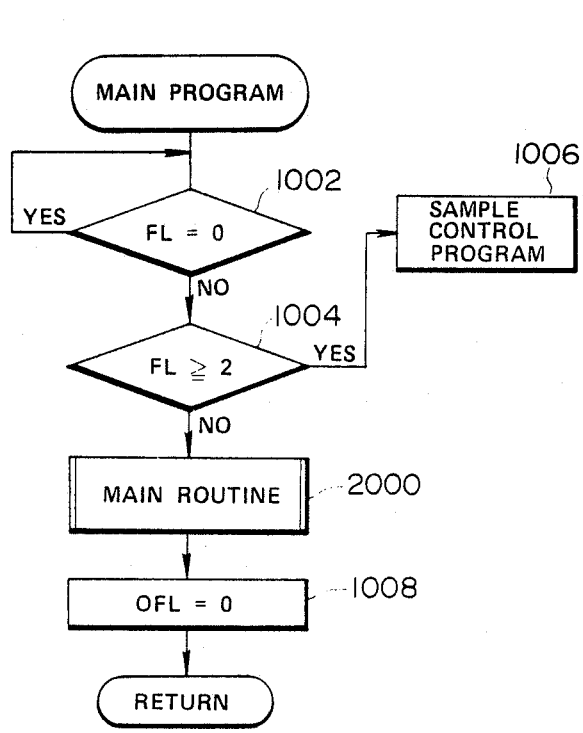
FIG. 16 is a flowchart of a main program executed by the controller of FIG. 15.

The controller unit 202 has different sample modes, i.e., MODE 1, MODE 2, MODE 3 and MODE 4 determining the number of sensor pulses in each sample period group. As shown in FIG. 16, in MODE 1 every sensor pulse input time is recorded and therefore the register value N is 1. In MODE 2, every other sensor pulse is ignored and the register value N is 2. In MODE 3, every fourth sensor pulse is monitored, i.e. its input time is recorded, and the register value N is 4. In MODE 4, every eighth sensor pulse is sampled and the register value N is then 8.

The controller unit 202 thus samples the input timing of three successive sensor pulses to calculate the pulse interval difference dT while operating in MODE 1. If the derived pulse interval difference is equal to or greater than the pulse interval threshold S, then sensor pulses will continue to be sampled in MODE 1. Otherwise, the input timing of every other sensor pulse is sampled in MODE 2 and from the sampled input timing of the next three sensor pulses sampled, the pulse interval difference dT is calculated to again be compared with the pulse interval threshold S. If the derived pulse interval difference is equal to or greater than the pulse interval threshold S, we remain in MODE 2. Otherwise, every four sensor pulses are sampled in MODE 3. The input timings of the next three sampled sensor pulses are processed to derive the pulse interval difference dT. The derived pulse interval difference dT is again compared with the pulse interval threshold S. If the derived pulse interval difference is equal to or greater than the pulse interval threshold S, the MODE remains at 3 and the value N is set to 4. On the other hand, if the derived pulse interval difference dT is less than the pulse interval threshold S, the mode is shifted to MODE 4 to sample the input timing of every eighth sensor pulse. In this MODE 4, the value N is set at 8.

Figure 19:
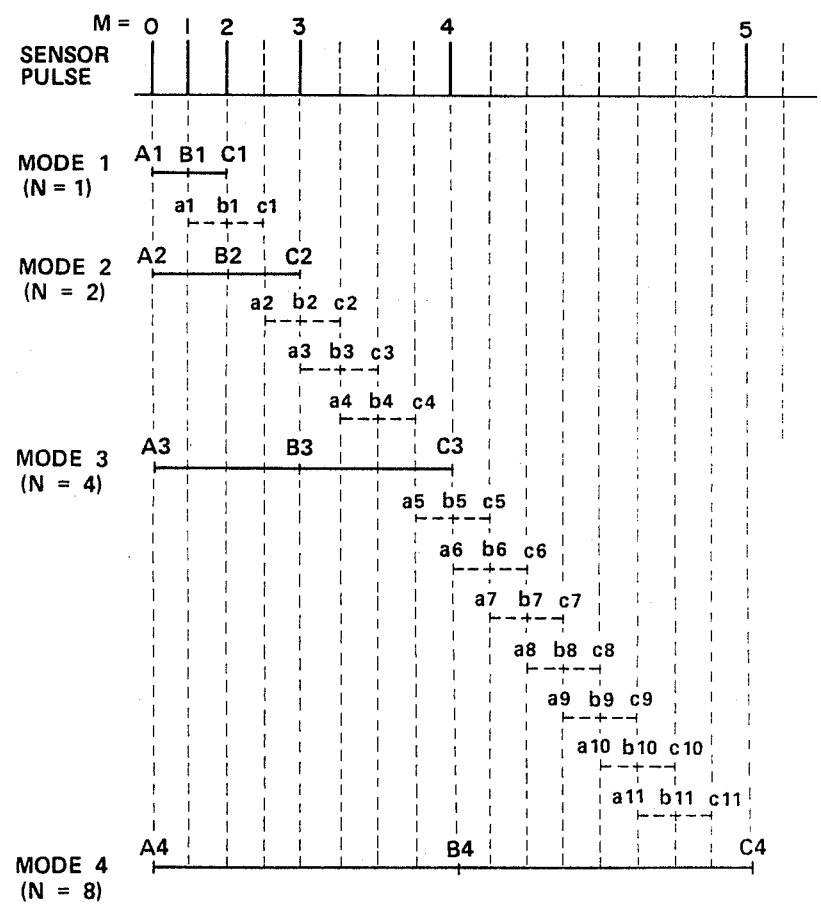
FIG. 19 is an explanatory diagram of the input timing sampling modes and variations thereof.

For instance, in FIG. 19, the sensor pulses $A_1$, $B_1$ and $C_1$ are sampled under MODE 1. In MODE 2, the sensor pulses $a_1$ and $c_1$ are ignored and the sensor pulses $A_1(=A_2)$, $B_2(=b_1)$ and $C_2(=b_2=a_3)$ are sampled. In MODE 3, the three sensor pulses $c_2(=b_3=a_4)$, $c_3(=b_4)$ and $c_4$ following $B_3(=c_2)$ are ignored and the sensor pulses $A_3(=A_1=A_2)$, $B_3(=b_2=a_3)$ and $C_3(=b_5=a_6)$ are sampled. In MODE 4, the seven sensor pulses $c_5(=b_6=a_7)$, $c_6(=b_7=a_8)$, $c_7(=b_8=a_9)$, $c_8(=b_9=a_{10})$, $c_9(=b_{10}=a_{11})$, $c_{10}(=b_{11})$ and $c_{11}$ following $B_4(=c_3)$ are ignored and the sensor pulses $A_4(=A_1=A_2=A_3)$, $B_4(=C_3=b_5=a_6)$ and $C_4$ are sampled.

Figure 18:
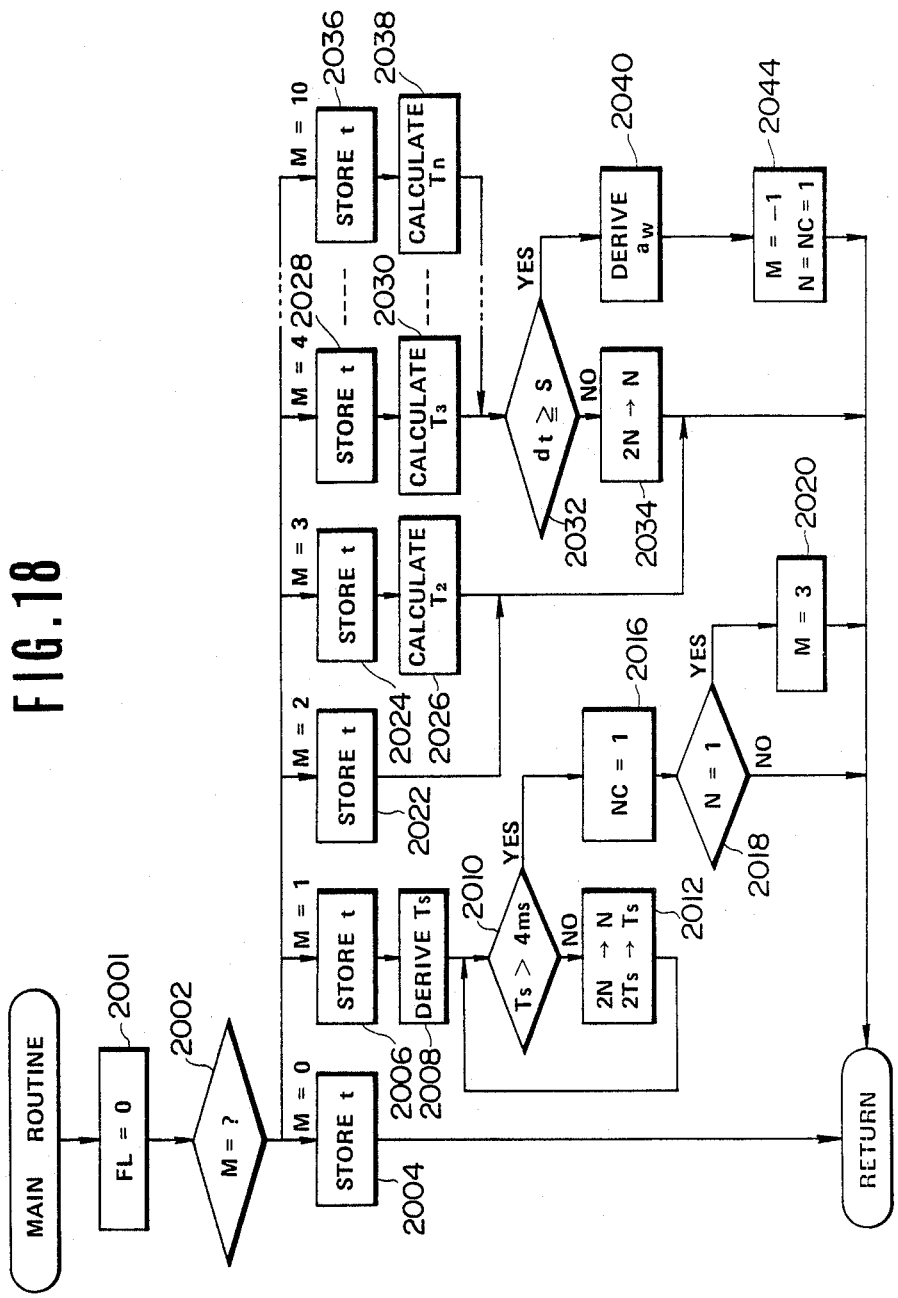
FIG. 18 is a flowchart of a main routine in the main program of FIG. 16.

Referring to FIG. 18, the main routine serves to periodically derived an updated wheel acceleration rate value $a_w$. In general, this is done by sampling larger and larger groups of pulses until the difference between the durations of the groups is large enough to yield an accurate value. In the main routine, the sample flag FL is reset to zero at a block 2001. Then the counter value M of the auxiliary counter 233, indicating the current sample period of the current $a_w$ calculation cycle, is read out at a block 2002 to dictate the subsequent program steps.

Specifically, after the first sample period (M=0), the input timing t temporarily stored in the temporary register 231 corresponding to the sensor pulse number (M=0) is read out and transferred to a memory block 240 of RAM at a block 2004, which memory block 240 will be hereafter referred to as "input timing memory". Then control passes to the block 1008 of the main program. When M=2, the corresponding input timing t is read out from the temporary register 231 and transferred to the input timing memory 240 at a block 2006. Then, at a block 2008, a pulse interval Ts between the sensor pulses of M=1 is derived from the two input timing values in the input timing memory 240. That is, the pulse interval of the sensor pulse (M=1) is derived by:

$$Ts = t_1 - t_0$$

where $t_1$ is input time of the sensor pulse M1; and $t_0$ is input time of the sensor pulse M0.

The derived pulse interval $T_s$ of the sensor pulse M1 is then compared with a reference value, e.g. 4 ms., at a block 2010. If the pulse interval $T_s$ is shorter than the reference value, 4 ms., control passes to a block 2012 wherein the value N and the pulse interval $T_s$ are multipled by 2. The doubled timing value ($2T_s$) is again compared with the reference value by returning to the block 2010. The blocks 2010 and 2012 constitute a loop which is repeated until the pulse interval ($2nT_s$) exceeds the reference value. When the pulse interval ($2nT_s$) exceeds the reference value at the block 2010, a corresponding value of N (2N) is automatically selected. This N value represents the number of pulses to be treated as a single pulse with regard to timing.

After setting the value of N and thus deriving the sensor pulse group size then the auxiliary counter value NC is set to 1, at a block 2016. The register value N is then checked for a value of 1, at a block 2018. If N=1, then the auxiliary counter value M is set to 3 at a block 2020 and otherwise control returns to the main program. When the register value N equals 1, the next sensor pulse, which would normally be ignored, will instead be treated as the sensor pulse having the sample period number M=3.

In the processing path for the sample period number M=3, the corresponding input timing is read from the corresponding address of the temporary register 231 and transferred to the input timing memory 1240, at a block 2024. The pulse interval $T_2$ between the sensor pulses at M=1 and M=3 is then calculated at a block 2026. The derived pulse interval $T_2$ is written in a storage section of a memory block 1242 of RAM 1236 for a current pulse interval data, which storage section will be hereafter referred at as "first pulse interval storage" and which memory block 1242 will be hereafter referred to as "pulse interval memory". After the block 2026, control returns to the main program to await the next sensor pulse, i.e. the sensor pulse for sample period number M=4.

When the sensor pulse for M=4 is received, the value t of the temporary register 1231 is read out and transferred to the input timing memory 240 at block 2028. Based on the input timing of the sensor pulses for M=3 and M=4, the pulse interval $T_3$ is calculated at a block 2030. The pulse interval $T_3$ derived at the block 2030 is then written into the first pulse interval storage of the pulse interval memory. At the same time, the pulse interval data $T_2$ previously stored in the first pulse interval storage is transferred to another storage section of the pulse interval memory adapted to store previous pulse interval data. This other storage section will be hereafter referred to as "second pulse interval storage". Subsequently, at a block 2032 the contents of the first and second storages, i.e. the pulse interval data $T_2$ and $T_3$ are read out. Based on the read out pulse interval data $T_2$ and $T_3$, a pulse interval difference dT is calculated at block 2032 and compared with the pulse interval threshold S to determine whether or not the pulse interval difference dT is large enough for accurate calculation of wheel acceleration or deceleration $a_w$. If so, process goes to the block 2040 to calculate the wheel acceleration or deceleration according to the equation (1). The wheel acceleration or deceleration deriving routine at the block 2040 will be described in detail later with reference to FIG. 23. The register value N is then set to 1 at the block 2044 and thus MODE 1 is selected. In addition sample period number M is reset to −1, and the $a_w$ derivation cycle starts again. On the other hand, if at the block 2032 the pulse interval difference dT is too small to calculate the wheel acceleration or deceleration $a_w$, then the value N is multiplied by 2 at a block 2034. Due the updating of the value N, the sample mode of the sensor pulses is shifted to the next mode.

When the block 2034 is performed and thus the sample mode is shifted to MODE 2 with respect to the sensor pulse of M=4', the sensor pulse $c_2$ input following to the sensor pulse of M=4' is ignored. The sensor pulse $c_3$ following to the ignored sensor pulse $c_2$ is then taken as the sensor pulse to be sampled as M=3''. At this time, the sensor pulse of M=4' is treated as the sensor pulse of M=2'' and the sensor pulse of M=2 is treated as the sensor pulse of M=1''. Therefore, calculation of the interval difference dT and discrimination if the derived interval difference dT is greater than the pulse interval threshold S in the block 2032 will be carried out with respect to the sensor pulse $c_3$ which will be treated as the sensor pulse of M=4". The blocks 2032 and 2034 are repeated until the interval difference greater than the pulse interval threshold S is obtained. The procedure taken in each cycle of repetition of the blocks 2032 and 2034 is substantially same as that set forth above.

As set forth above, by setting the counter value NC of the auxiliary counter 233 to 1 at the block 2016, the input timing of the sensor pulse received immediately after initially deriving the sample mode at the blocks 2010 and 2012 will be sampled as the first input timing to be used for calculation of the wheel acceleration. This may be contrasted with the procedure taken in the known art.

FIG. 20 shows the wheel acceleration deriving routine of the step 2040 of FIG. 18. At first, wheel acceleration $a_w$ is calculated from three input timing values as explained with respect to the step 2040, at a step 2040-1. After this, the stored value, i.e. the new wheel acceleration value $a_{wnew}$, in the memory block 1235 is shifted to the memory block 1237 to be stored as the old wheel acceleration value $a_{wold}$ at a step 2040-2. Then, the wheel acceleration value newly derived at the step 2040-1 is written in the memory block 1235 at a step 2040-3. Thereafter, at a step 2040-4, the new and old wheel acceleration values $a_{wnew}$ and $a_{wold}$ are compared. If the new wheel acceleration value $a_{wnew}$ is equal to or greater than the old wheel acceleration value $a_{wold}$, control returns to the main routine of FIG. 20. On the other hand, if the new wheel acceleration $a_{wnew}$ is less than the old wheel acceleration $a_{wold}$, the value stored in the memory block 1237 as the old wheel acceleration value $a_{wold}$ is latched as the peak value $a_{wmax}$ of the wheel acceleration.

Figure 21:
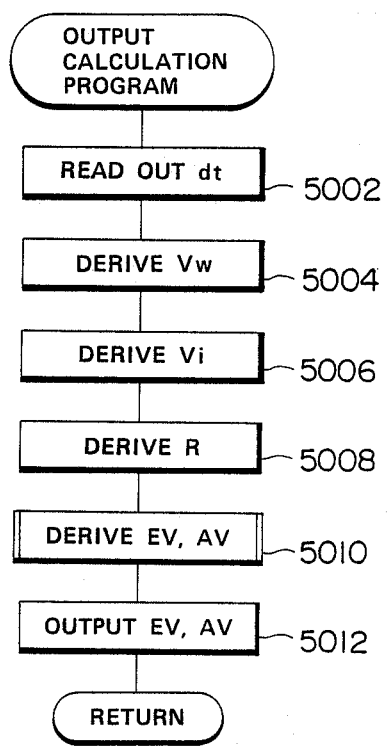
FIG. 21 is a flowchart of an output calculation program for deriving EV and AV signals according to the valve conditions of FIGS. 4 to 7.
Figure 22:
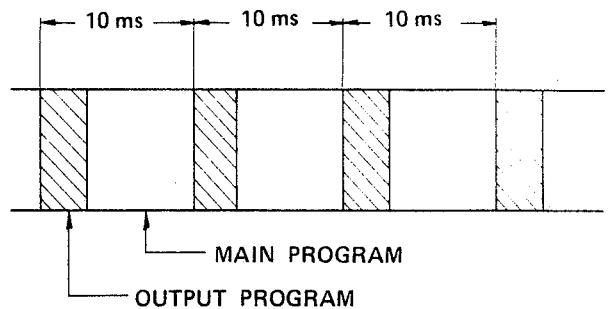
FIGS. 22 and 23 are diagrams of execution timing of the output calculation program in relation to the main program of FIG. 16.
Figure 23:
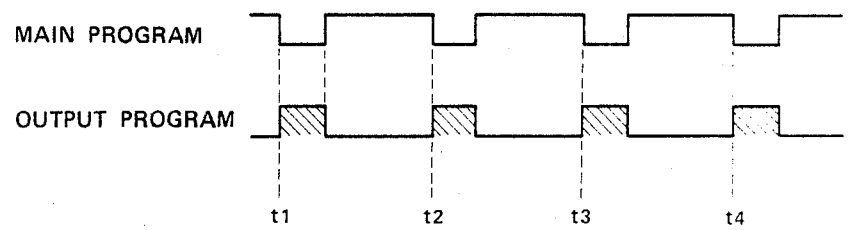
Figure 24:
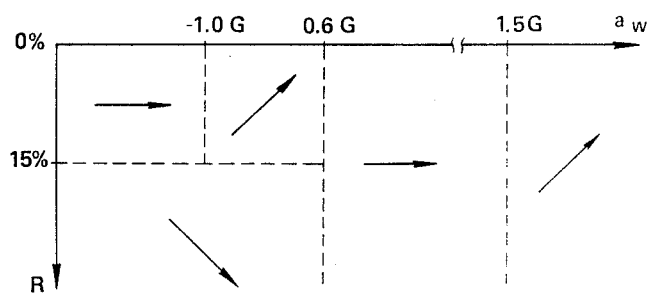
FIG. 24 is a table used to select the operation mode of the actuator 16, which table is accessed in terms of the wheel acceleration and the slip rate.

FIG. 21 shows the output program for deriving the wheel speed $V_w$, wheel acceleration $a_w$ and slip rate R, selecting the operational mode, i.e. application mode, hold mode and release mode and outputting an inlet signal EV and/or an outlet signal AV depending upon the selected operation mode of the actuator 16.

When the application mode is selected the inlet signal EV goes HIGH and the outlet signal EV goes HIGH. When the release mode is selected, the inlet signal EV goes LOW and the outlet signal AV also goes LOW. When the selected mode is the hold mode, the inlet signal EV remains HIGH while the outlet signal AV goes LOW. These combinations of the inlet signal EV and the outlet signal AV correspond to the actuator supply current levels shown in FIG. 12 and thus actuate the electromagnetic value to the corresponding positions illustrated in FIGS. 4, 5, 6 and 7.

The output program is stored in the memory block 1254 and adapted to be read out periodically, e.g. every 10 ms, to be executed as an interrupt program. The output calculation program is executed in the time regions shown in hatching in FIGS. 22 and 23.

During execution of the output calculation program, the pulse interval T is read out from a memory block 1241 of RAM which stores the pulse interval, at a block 5002. As set forth above, since the pulse interval T is inversely proportional to the wheel rotation speed $V_w$, the wheel speed can be derived by calculating the reciprocal (1/T) of the pulse interval T. This calculation of the wheel speed $V_w$ is performed at a block 5004 in the output program. After the block 5004, the target wheel speed $V_i$ is calculated at a block 5006. The manner of deriving the target wheel speed $V_i$ has been illustrated in the U.S. Pat. Nos. 4,392,202 to Toshiro MATSUDA, issued on July 5, 1983, 4,384,330 also to Toshiro MATSUDA, issued May 17, 1983 and 4,430,714 also to Toshiro MATSUDA, issued on Feb. 7, 1984, which are all assigned to the assignee of the present invention. The disclosure of the above-identified three U.S. patents are hereby incorporated by reference for the sake of disclosure. As is obvious herefrom, the target wheel speed $V_i$ is derived as a function of wheel speed deceleration as actually detected. For instance, the wheel speed $V_w$ at which the wheel deceleration $a_w$ exceeds the deceleration threshold $a_{ref}$, e.g., $-1.2$ G is taken as one reference point for deriving the target wheel speed $V_i$. The wheel speed at which the wheel deceleration $a_w$ also exceeds the deceleration threshold $a_{ref}$, is taken as the other reference point.

$$dV_i = (V_{w1} - V_{w2})/P \tag{4}$$

This target wheel speed $V_i$ is used for skid control in the next skid cycle.

It should be appreciated that in the first skid cycle, the target wheel speed $V_i$ cannot be obtained. Therefore, for the first skid cycle, a predetermined fixed value will be used as the target wheel speed $V_i$.

Figure 25A:
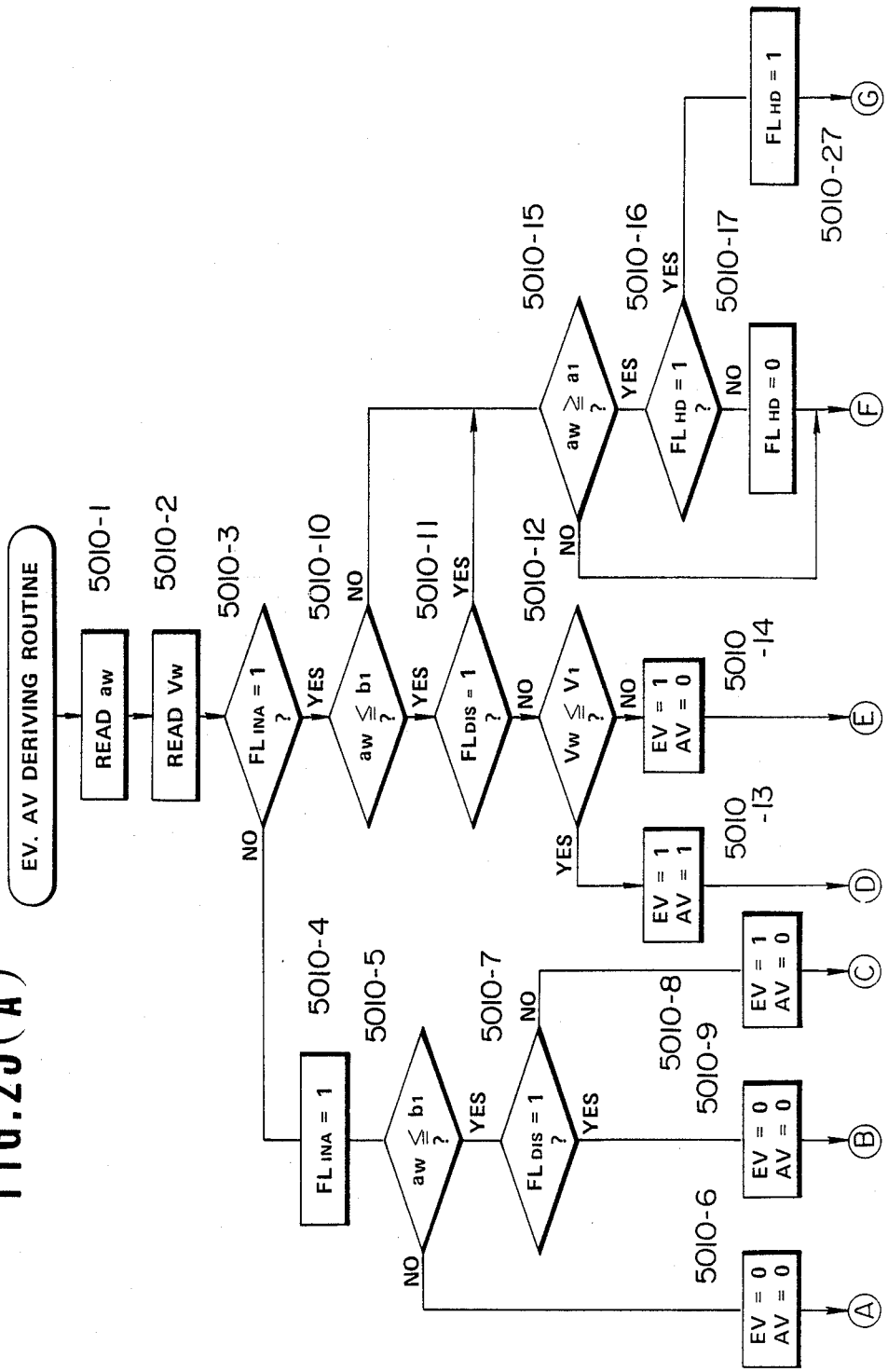
FIGS. 25(A) and 25(B) together form a flowchart of the EV and AV deriving routine in the output calculation program of FIG. 21.
Figure 25B:
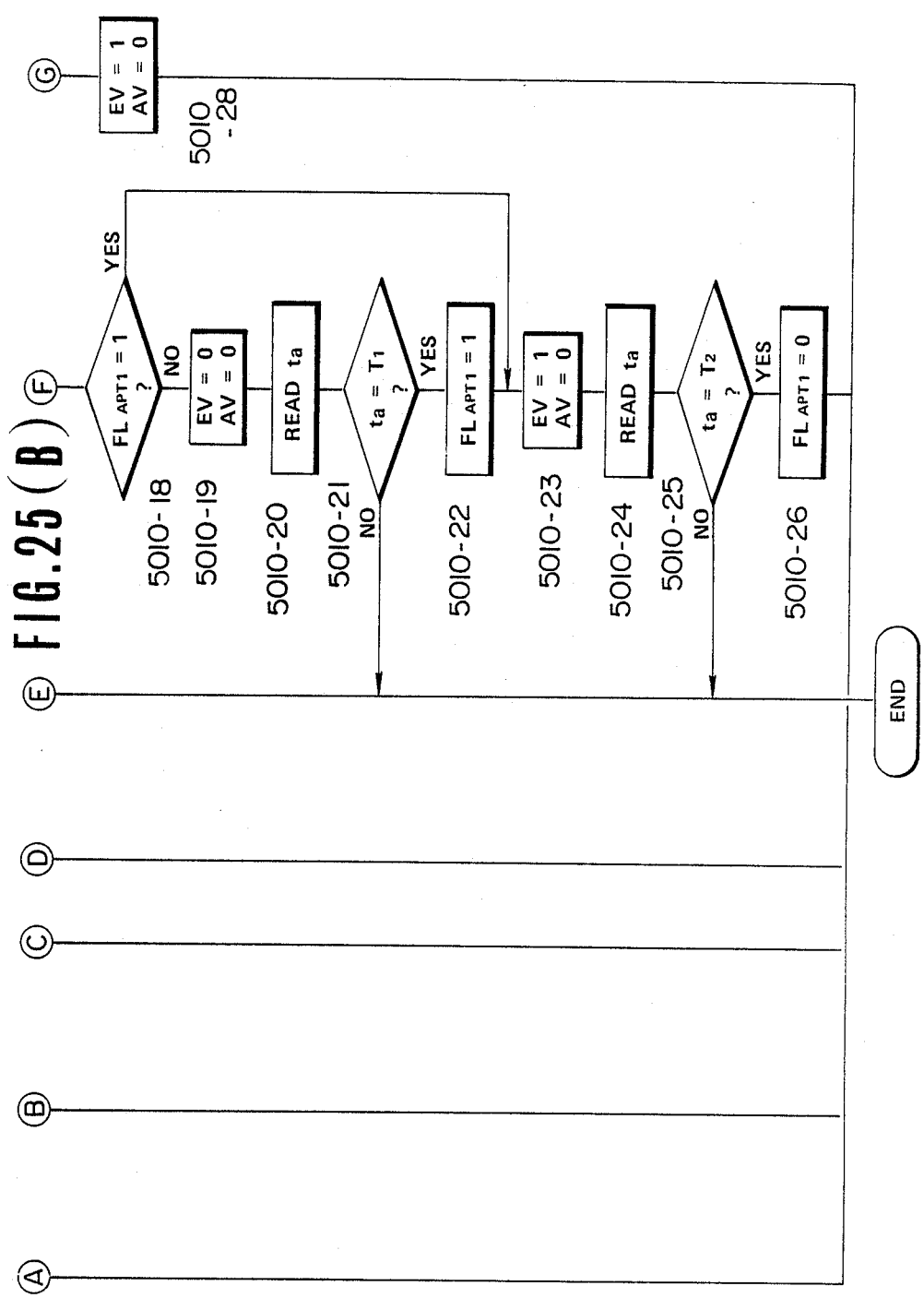

At a block 5008 in FIG. 21, the slip rate R is calculated according to the foregoing formula (2). Subsequently, the operational mode is determined on the basis of the wheel acceleration $a_w$ and the slip rate R, at a block 5010. FIGS. 25(A) to 25(B) are a flowchart of an EV/AV deriving routine to be executed at the step 5010 of FIG. 19. The schedule of operation mode selection of the actuator 16 is illustrated in the form of a table in FIG. 24. The table is accessed according to the wheel acceleration $a_w$ and the slip rate R. As can be seen, when the wheel slip rate R is in the range of 0 to 15%, the hold mode is selected when the wheel acceleration $a_w$ is less than $-1.0$ G and the application mode is selected when the wheel acceleration $a_w$ is in the range of $-1.0$ G to 0.6 G. On the other hand, when the slip rate R remains above 15%, the release mode is selected when the wheel acceleration $a_w$ is equal to or less than 0.6 G. When the wheel acceleration $a_w$ is equal to or greater than 1.5 G, the application mode may be selected regardless of the slip rate.

According to the operational mode selected at the block 5010, the signal levels of the inlet signal EV and the outlet signal AV are determined so that the combination of the signal levels corresponds to the selected operation mode of the actuator 16. The determined combination of the inlet signal EV and the outlet signal AV are output to the actuator 16 to control the electromagnetic valve.

It should be appreciated that, although the execution timing of the output calculation program has been specified to be about 10 ms in the foregoing disclosure, the timing is not necessarily fixed to the mentioned timing and may be selectable from the approximate range of 1 ms to 20 ms. The execution timing of the output program is fundamentally to be determined in accordance with the response characteristics of the actuator.

In the routine for deriving EV and AV signals of FIGS. 25(A) and 25(B), wheel acceleration $a_w$ is read out at a step 5010-1. The wheel speed $V_w$ is also read out at a step 5010-2. After this, an initial stage indicative flag $FL_{INA}$ set and reset in a flag register 1235 of FIG. 15 is checked at a step 5010-3. The flag $FL_{INA}$ is indicative of an initial stage of braking operation and adapted to disables stepwise increase of the braking pressure. The initial stage indicative flag $FL_{INA}$ is adapted to be reset after a given period of time of terminating anti-skid brake control operation. In order to reset the initial stage indicative flag $FL_{INA}$, terminating of operation of the fluid pump 88 driving motor 90 may be used as a reset trigger.

When the initial stage indicative flag $FL_{INA}$ is not set as checked at the step 5010-3, the flag $FL_{INA}$ is set at a step 5010-4. Then, the wheel acceleration $a_w$ as read out at the step 5010-1 is compared with the reference value $-b_1$ which serves as the pressure release threshold as set out with respect to the foregoing first embodiment at a step 5010-5. While the wheel acceleration $a_w$ is remains greater than thereference value $-b_1$, the EV signal is set to 0 and AV signal is also set to 0 to place the system operation in APPLICATION mode, at a step 5010-6.

It should be noted that comparing operation of the wheel acceleration $a_w$ with the reference value $-b_1$ triggers a routine of FIG. 26, which is adapted to set and reset a disabling flag $FL_{DIS}$ which is set in a flag register 1237 of FIG. 15. The disabling flag $FL_{DIS}$ serves to disable switching of operation mode of the anti-skid brake control system from APPLICATION mode to HOLD mode or RELEASE mode and whereby, maintain the operation mode at APPLICATION mode for a given period of time T.

When the wheel acceleration $a_w$ is smaller than the reference value $-b_1$, the disabling flag $FL_{DIS}$ is checked at a step 5010-7. When the disabling flag $FL_{DIS}$ is not set as checked at the step 5010-7, then process goes to a step 5010-8 to set the EV signal to 1 and the AV signal to 0. As a result, anti-skid control system operates in HOLD mode. On the other hand, when the disabling flag $FL_{DIS}$ is set as checked at the step 5010-7, the process goes to a step 5010-9 to set the EV signal 0 and the AV signal 0 to designate APPLICATION mode operation.

Therefore, in the initial stage of the braking operation, braking pressure would be increased at the manner substantially same as that of the foregoing first embodiment and as illustrated in FIGS. 13 and 14.

When setting of the initial stage indicative flag $FL_{INA}$ is detected as checked at the step 5010-3, when the wheel acceleration $a_w$ is compared with the reference value $-b_1$ at a step 5010-10. When the wheel acceleration $a_w$ is equal to or smaller than the reference value $-b_1$, the disabling flag $FL_{DIS}$ is checked at a step 5010-11. If the disabling flag $FL_{DIS}$ is not set as checked at the step 5010-11, then the wheel speed $V_i$ is compared with the target wheel speed $V_i$. When the wheel speed $V_w$ is equal to or lower than the target wheel speed as compared at the step 5010-12, the process goes to a step 5010-13 to set the EV signal 1 and the AV signal 1 to perform skid control operation in the RELEASE mode. On the other hand, when the wheel speed $v_w$ is higher than the target wheel speed $V_i$ as compared at the step 5010-12, the process goes to a step 5010-14 to set the EV signal 1 and the AV signal 0 to perform HOLD mode skid control operation.

On the other hand, when the wheel acceleration $a_w$ is greater than the reference value $-b_1$ as compared at the step 5010-10, or setting of the disabling flag $FL_{DIS}$ is detected as checked at the step 5010-11, process goes to a step 5010-15. In the step 5010-15, the wheel acceleration $a_w$ is compared with another reference value $a_1$ which serves as the pressure apply thershold. When the wheel acceleration $a_w$ is equal to or greater than the reference value $a_1$, a holding mode indicative flag $FL_{HD}$ which is set and reset in a flag register 1253, is checked at a step 5010-16. When the hold mode indicative flag $FL_{HD}$ is set as checked at a step 5010-16, the flag $FL_{HD}$ is reset at a block 5010-17. Subsequently, an application mode indicative flag $FL_{APT1}$ is checked at a step 5010-18, which flag $FL_{APT1}$ is set and reset in a flag register 1257 of FIG. 15. When resetting of the application mode indicative flag $FL_{APT1}$ is detected as checked at the step 5010-18, then, the EV signal is set to 0 and the AV signal is set to 0 at a step 5010-19. then a value of a timer $t_a$ in RAM 1236 is read out at a step 5010-20. The timer value $t_a$ as read at the step 5010-20 is compared with a predetermined reference time $T_1$ which defines a period of time to maintain the APPLICATION mode in stepwise increase of the braking pressure at a step 5010-21. When the timer value $t_a$ is less than the reference time value $T_1$, then process ends. On the other hand, when the timer value $t_a$ reaches the reference time value $T_1$, the application mode indicative flag $FL_{APT1}$ is set at a step 5010-22. At the same time, the timer $t_a$ is reset.

When the application mode indicative flag $FL_{APT1}$ is set as checked at the step 5010-18 or after setting the application mode indicative flag $FL_{APT1}$, the EV signal is set to 1 and AV signal is set to 0 at a step 5010-23. After this, the timer value $t_a$ is again read out at a step 5010-24. The read timer value $t_a$ is compared with another reference time value $T_2$ which defines a period of time to maintain the system at HOLD mode during stepwise increase of the braking pressure, at a step 5010-25. If the timer value $t_a$ is smaller than the reference time value $T_2$, process ends. On the other hand, hen the timer value $t_a$ reaches the reference time value $T_2$, the timer $t_a$ is reset and the application mode indicative flag $FL_{APT1}$ is reset, at a step 5010-26.

On the other hand, returning the step 5010-16, when the hold mode indicative flag $FL_{HD}$ is not set, process jumps to a step 5010-27 in which the hold mode indicative flag $FL_{HD}$ is set. After setting the flag $FL_{HD}$, the EV signal is set to 1 and the AV signal is set to zero for performing HOLD mode operation.

FIG. 26 shows a flowchart of the disabling flag $FL_{DIS}$ set and reset routine which is adapted to be triggered by execution of the blocks 5010-5 and 5010-10.

In the execution, at first, the disabling flag $FL_{DIS}$ is checked at a step 5010-29. If the disabling flag $FL_{DIS}$ is not set, the wheel acceleration $a_w$ as read at the step 5010-1 is compared with the reference value $-b_1$ at a step 5010-30. When the wheel acceleration $a_w$ is equal to or smaller than the reference value $-b_1$, another application mode indicative flag $FL_{APT2}$ which is adapted to be set and reset in a flag register 1258 of FIG. 15, is set at a step 5010-31. On the other hand, when the wheel acceleration $a_w$ is greater than the reference value $-b_1$, the process jumps to a step 5010-32 to check the application mode indicative falg $FL_{APT2}$. If the flag $FL_{APT2}$ is not set as checked at the step 5010-32, process goes end. On the other hand, when the application mode indicative flag $FL_{APT2}$ is set, the disabling flag $FL_{DIS}$ is set at a step 5010-33. Thereafter, a timer 1241 in RAM 1236 to measure an elapsed time upto $t_b$ is set at a step 5010-34. Then, the application mode indicative flag $FL_{APT2}$ is reset at a step 5010-35.

Returning to the step 5010-29, when setting of the disabling flag $FL_{DIS}$ is detected as checked, process goes to a step 5010-36 wherein the timer value $t_b$ is read out from the timer 1241. The timer value $t_b$ is compared with a reference time value T at a step 5010-37. If the timer value $t_b$ is smaller than the reference value T, process goes end. On the other hand, when the timer value $t_b$ reaches the reference value T, then the disabling flag $FL_{DIS}$ is reset at a step 5010-38.

As will be appreciated herefrom, by the second embodiment of the anti-skid brake control system according to the invention, substantially the same skid control operation as performed by the first embodiment can be performed. Consequently, the same advantages can be obtained by the second embodiment.

FIGS. 27 to 37 are variations of the foregoing first embodiments of the anti-skid brake control system according to the present invention. Though each variation is disclosed as the different embodiment of the invention relative to the first embodiment, the elements and/or features of the same construction and same operation would be referred to be the same reference numerals as explained with respect to the first embodiment. Also, detailed description of the elements and features common to the first embodiment is omitted for similification of the disclosure and avoiding redundant recitations.

Figure 27:
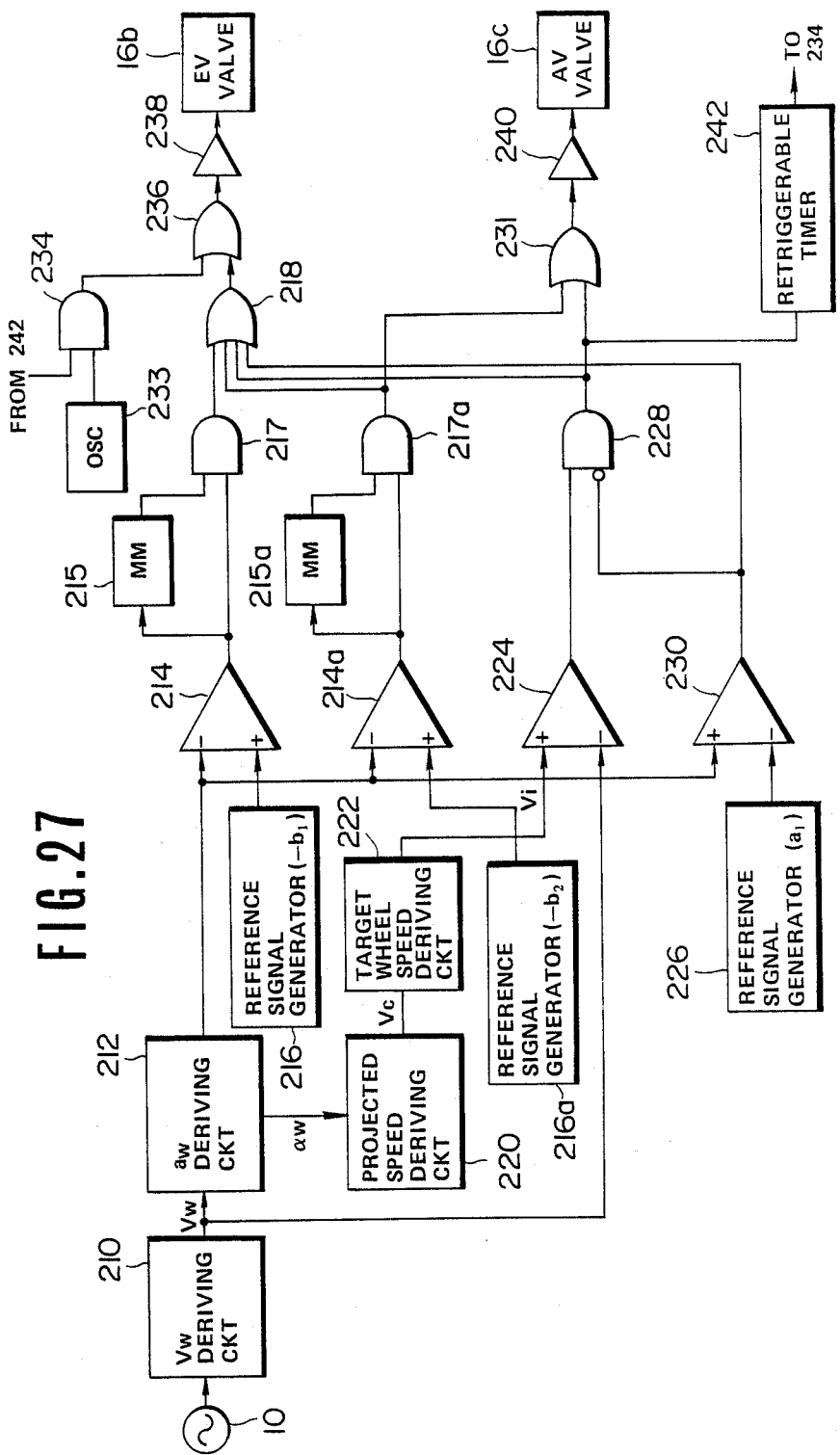
FIG. 27 is a block diagram of the third embodiment of the controller unit in the anti-skid brake control system according to the present invention.
Figure 28:
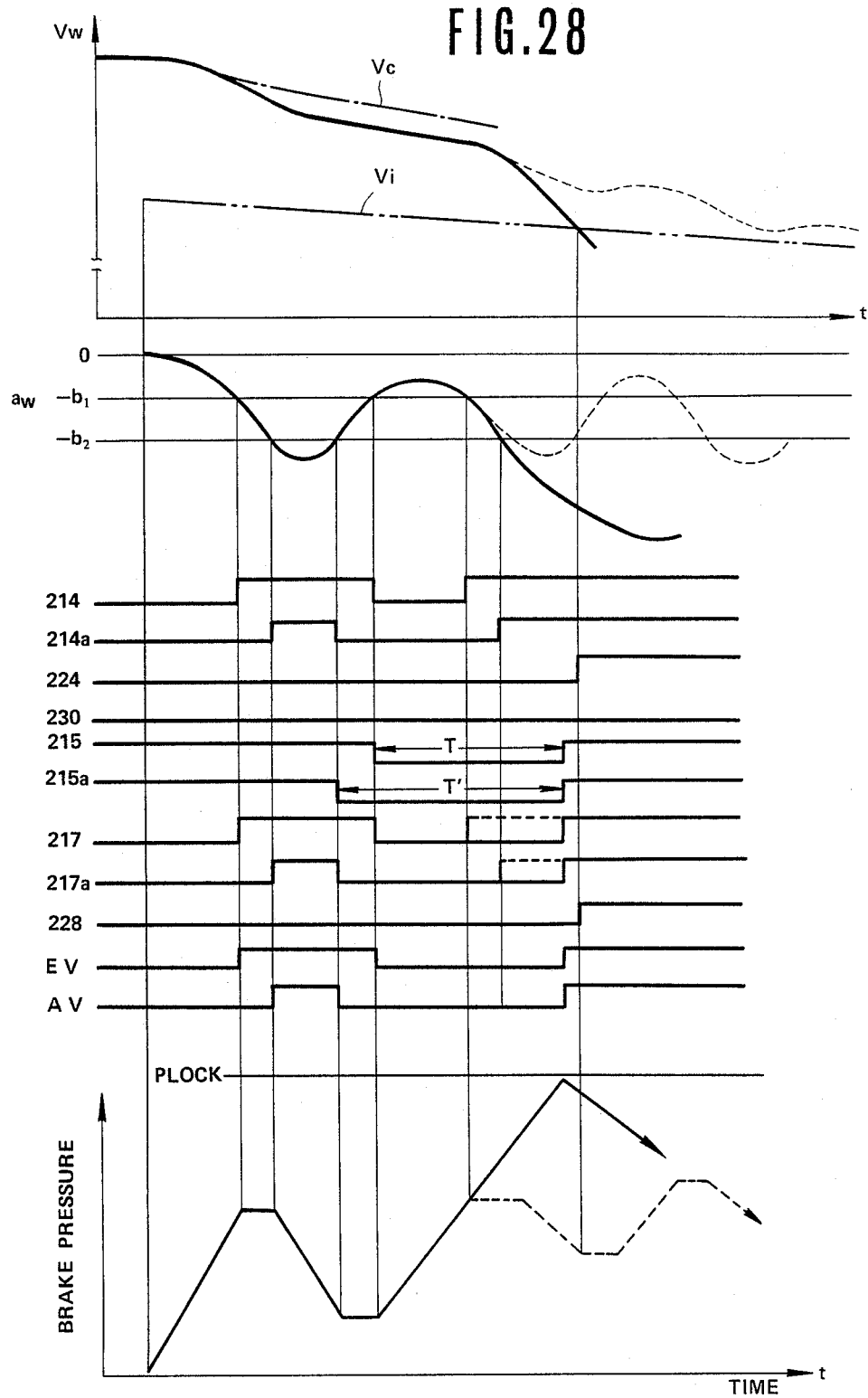
FIG. 28 illustrates the operation timing of the control unit of FIG. 27.

FIGS. 27 to 28 shows the third embodiment of the anti-skid brake control system of the invention. In this embodiment an additional differential amplifier 214a is provided. The differential amplifier 214a is connected to the wheel acceleration deriving circuit 212 to receive therefrom the wheel acceleration indicative signal $a_w$ at its negative input terminal. The positive input terminal of the differential amplifier 241a is connected to a reference signal generator 216a which produces a reference signal having a value $-b_2$ representative of a deceleration threshold of smaller acceleration value than that of the reference value $-b_1$ of the reference signal generator 216.

The differential amplifier 214a is connected to one inut terminal of an AND gate 217a. Also, the differential amplifier 214a is connected to a monostable multivibrator 215a. Similarly to the monostable multivibrator 215, the monostable multivibrator 215a is triggered by the trailing edge of the HIGH level output of the differential amplifier 214a, which output of the differential amplifier 214a goes HIGH when the wheel acceleration $a_w$ drops across the reference value $-b_2$ As will be seen from FIG. 28, the monostable multivibrator 215a has longer trigger period T' than that T of the monostable multivibrator 215. Therefore, the monostable multivibrator 215a outputs LOW level signal to the AND gate 217a for the period T' when it is triggered by the trailing edge of the HIGH level output of the differential amplifier.

The AND gate 217a is connected to the OR gate 218. The AND gate 217a is also connected to an OR gate 231 inserted between the AND gate 228 and the amplifier 240.

As will be seen from the timing chart of FIG. 28, when the wheel acceleration $a_w$ drops across the additional, lower deceleration threshold $-b_2$, the outputs of the OR gates 218 and 231 turns HIGH by the HIGH level output of the AND gate 217a. Therefore, when the wheel acceleration becomes lower than the threshold $-b_2$, the braking pressure is decreased in the RELEASE mode operation. When the wheel acceleration $a_w$ is recovered across the threshold $-b_2$, the monostable multivibrator 217a is triggered to output the LOW level signal to the AND gate 217a. As a result, the output of the AND gate 217a turns LOW to turn the output level of the OR gate 231 LOW. Therefore, the braking pressure is held constant. By holding the braking pressure at decreased level, the wheel acceleration $a_w$ is further recovered to increase across the pressure release threshold $-b_1$. With the trailing edge of the HIGH level output of the differential amplifier 214, the monostable multivibrator 215 is triggered to turn the output level thereof to LOW. As a result, the output of the OR gate 218 turns LOW. Therefore, increasing of the braking pressure is resumed in the APPLICATION mode. Since the APPLICATION mode operation is maintained during the period while the monostable multivibrators 215 and 215a are held triggered, braking pressure can reach the lock pressure $P_{LOCK}$ at an earlier timing in comparison with that in the prior art.

Figure 29:
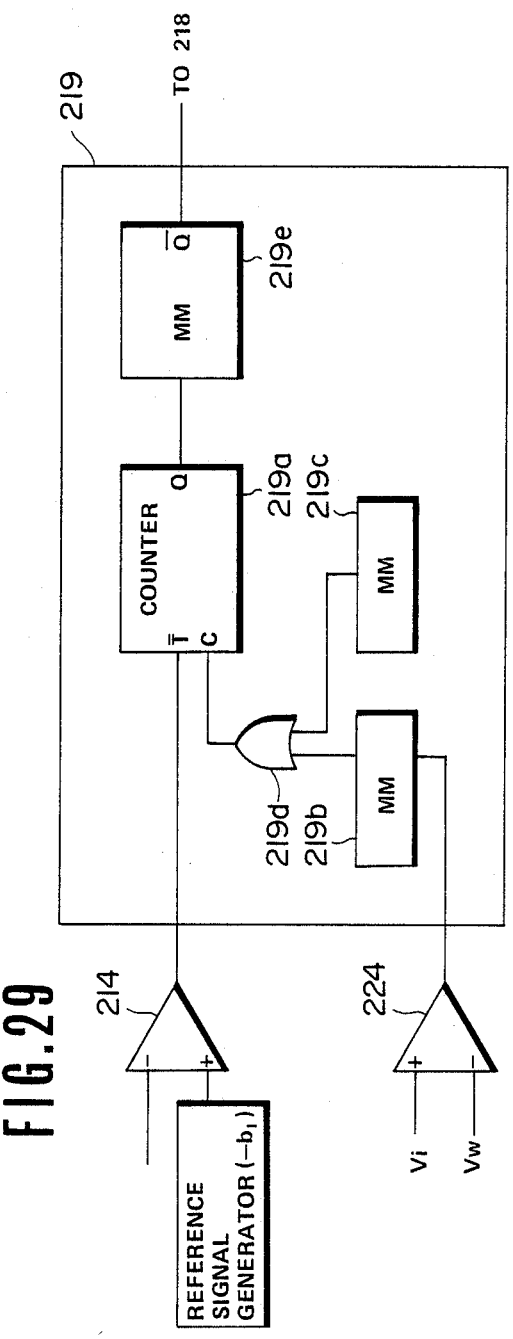
FIG. 29 is a block diagram of a modification to the first and third embodiment of the anti-skid brake control system.
Figure 30:
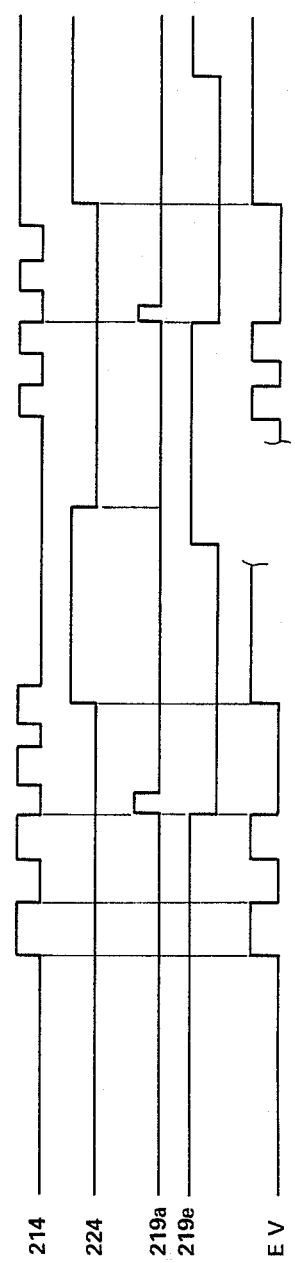
FIG. 30 shows the operation timing of the control unit of FIG. 29.

FIGS. 29 and 30 shows modification of the foregoing first embodiment and the third embodiment. In this modification, the monostable multivibrators 215 and 215 are replaced with a timing circuit 219 of FIG. 9. The timing circuit 219 has a monostable multivibrator 219b connected to the output terminal of the differential amplifier 224. The monostable multivibrator 219b is adapted to be triggered by the trailing edge of HIGH level output of the differential amplifier 224 to output HIGH level signal for a given period of time. The output terminal of the monostable multivibrator 219b is connected to an OR gate 219d. The OR gate 219d is also connected to another monostable multivibrator 219c which is responsive to turning ON of a main switch (not shown) of the system to output HIGH level signl for a given period of time.

The OR gate 219d is connected to a C-input terminal of a counter 219a. The counter 219a is also connected to the output terminal of the differential amplifier 214 at its T-input terminal. The counter 219a is adapted to count up the occurrence of the HIGH level output of the differential amplifier 214 and output HIGH level counter signal when the counter value becomes two. On the other hand, the counter 219a is adapted to be reset by the HIGH level input from the OR gate 219d. The Q-output terminal of the counter 219a is connected to the other monostable multivibrator 219e which is adapted to be triggered by a leading edge of the HIGH level counter signal to output LOW level signal for a predetermined period of time T.

Though it has not been illustrated in FIG. 29, the differential amplifier 214 is connected to an AND gate 217 directly and through the timing circuit 219 as set forth above.

In the shown modification, since the HIGH level output of the differential amplifier 224, which HIGH level output designates the RELEASE mode operation in the anti-skid operation, is taken as clear factor of the the counter value, disabling of RELEASE mode and HOLD mode is taken place only when the HOLD mode operation is performed the twice without performing RELEASE mode operation. Such arrangement would be effective for distinguishing substantially high-friction road from normal and/or substantially low-frection road.

Figure 31:
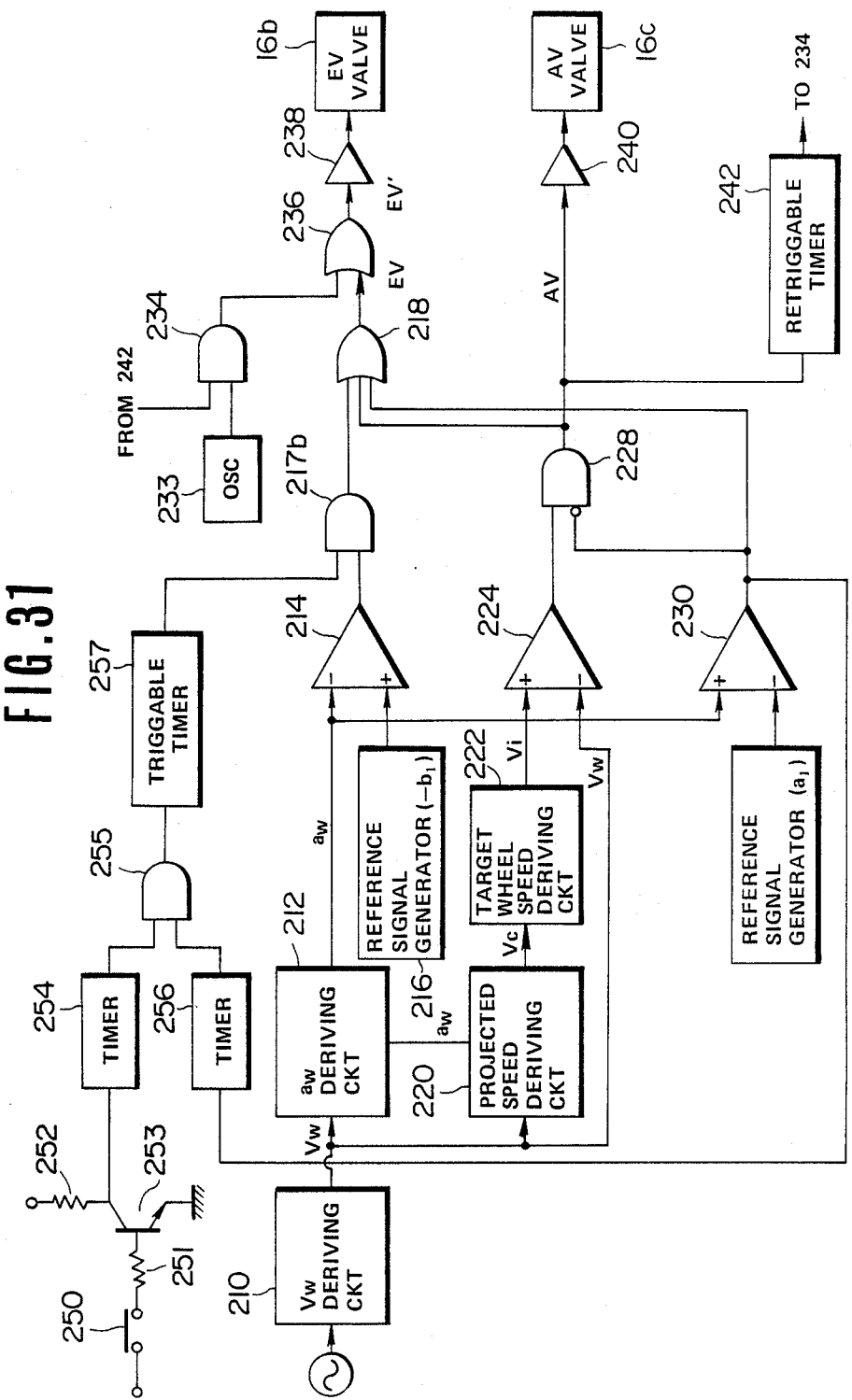
FIG. 31 is a block diagram of the fourth embodiment of a controller unit in the anti-skid brake control system according to the present invention.
Figure 32:
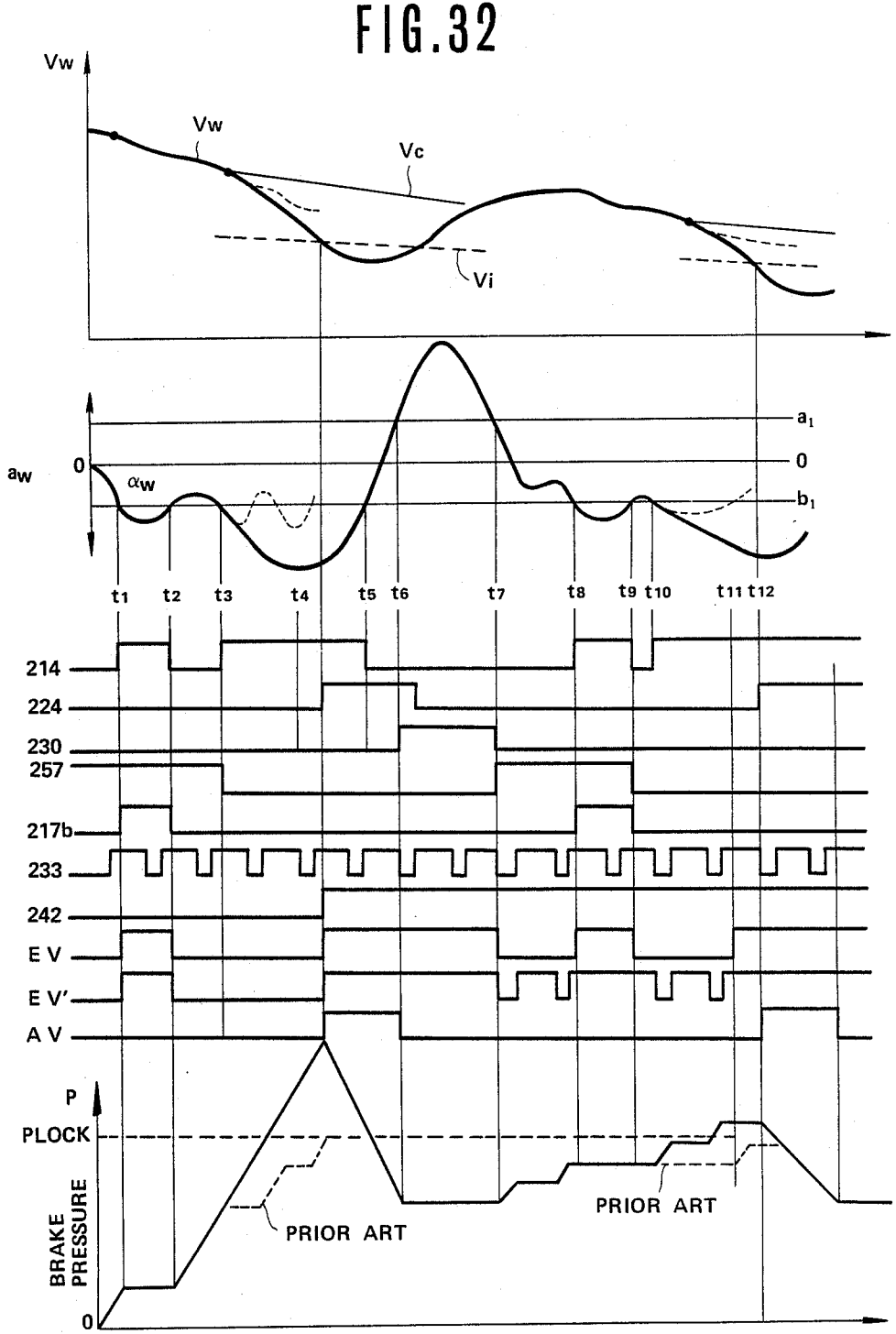
FIGS. 32 and 33 are timing charts for two examples of the operation of the fourth embodiment of the anti-skid brake control system according to the invention of FIG. 31.
Figure 33:
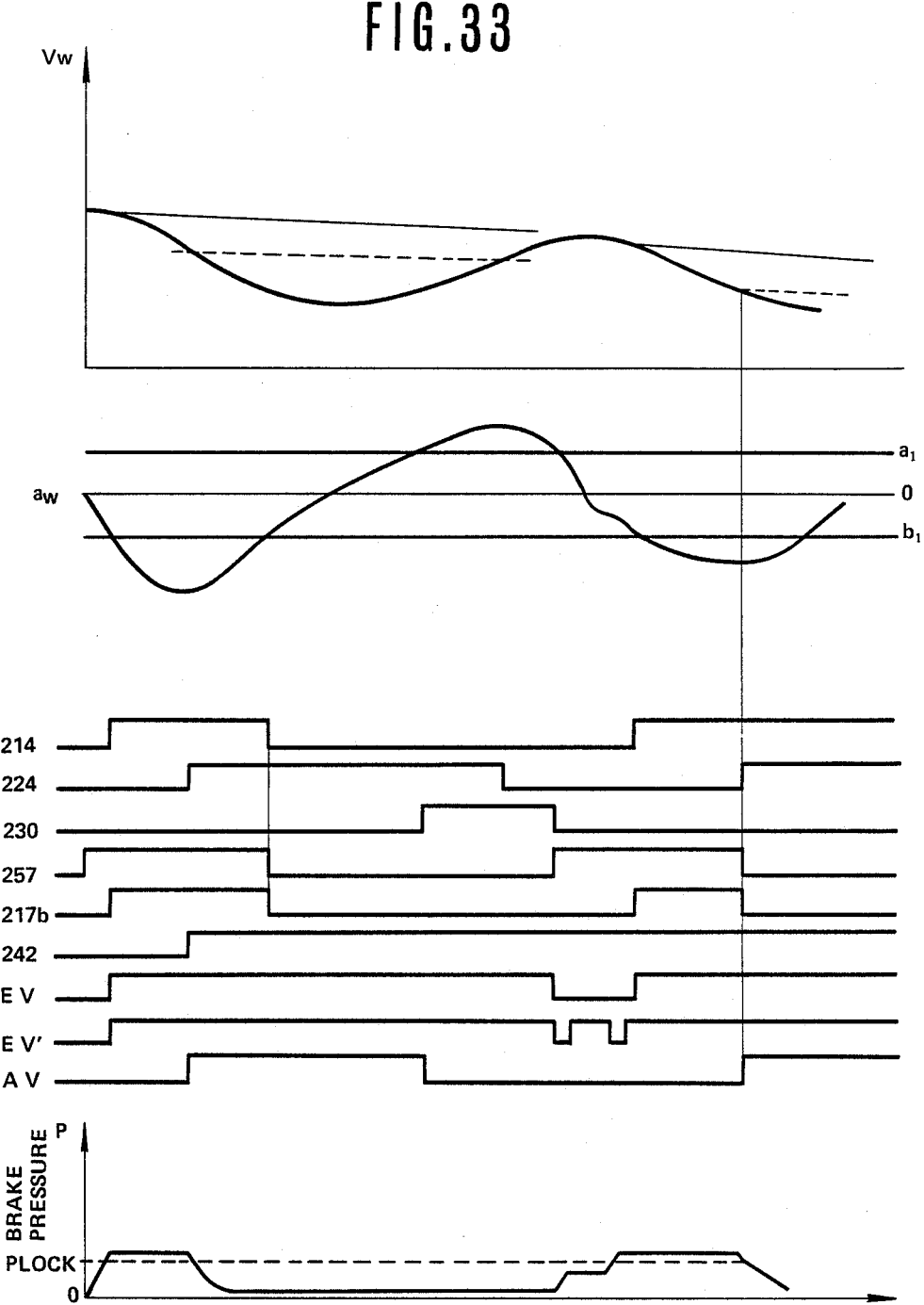

FIGS. 31 to 33 show the fourth embodiment of the anti-skid brake control system according to the invention. In this embodiment, the differential amplifier 214 is connected to an AND gate 217b. The AND gate 217b is also connected to a triggerable timer 257. The triggerable timer 257 is responsive to initiating operation in the APPLICATION mode operation to turn the output level thereof from LOW level to HIGH level and maintains the output at LOW level for a given period of time.

For enabling the triggerable timer 257 to detect initiation of the APPLICATION mode operation, timers 254 and 256 are provided. The timer 254 is connected to a brake switch 250 which is provided adjacent a brake pedal and has per se well known construction, through a resistor 251, a transistor 253 having a collector electrode connected to the timer 254 and, in turn, connected to a power source via a resistor 252. On the other hand, the timer 256 is connected to the output terminal of the differential amplifier 230. The timers 254 and 256 are adapted to output LOW level timer signals in response to the trailing edge of HIGH level inputs from the brake switch 250 and the differential amplifier.

The timers 254 and 256 are connected to the triggerable timer 257 through an AND gate 255. Therefore, in practice, the triggerable timer 257 is triggered by the trailing edge of the HIGH level output from the AND gate 255. The triggerable timer 257 normally outputs LOW level signal and turns the output to HIGH while it is triggered.

In the embodiment shown, the AND gate 234 is connected to the oscillator 233 and the retriggerable timer 242. Therefore, the pulse signals outputs from the oscillator 233 is output to the OR gate 236 while the output of the retriggerable timer 242 remains HIGH level.

With the arrangement set forth above, the fourth embodiment of the anti-skid brake control system operates in a manner as shown in FIGS. 32 and 33, in which FIG. 32 shows skid control operation on substantially high-friction road and FIG. 33 shows skid control operation on substantially low-friction, slippy road.

When brake pedal is depressed to initiate braking operation, the brake switch 250 turns ON to apply HIGH level to the base electrode of the transistor 253. As a result, the transistor 253 turns ON to turn the input level of the timer 254 from HIGH level to LOW level. By this, the output level of the AND gate 255 turns LOW to trigger the triggerable timer 257. Therefore, the triggerable timer 257 feeds HIGH level output to the AND gate 217b. When the wheel acceleration $a_w$ drops across the pressure release threshold $-b_1$, the output level of the differential amplifier 214 becomes HIGH during the period of time the triggerable timer 257 being held triggered. AND condition of the AND gate 217b is established to allow HOLD mode operation.

As the shown example show braking operation on the substantially high-friction road, the wheel acceleration $a_w$ can be recovered across the pressure release threshold $-b_1$ in a short period of time, at time $t_2$. By this, the output level of the differential amplifier 214 turns LOW to enter the operation mode into APPLICATION mode.

In the example as shown in the timing chart of FIG. 32, the given trigger period expires at the time $t_3$, as a result, the input level of the AND gate 217b from the triggerable timer 257 turns LOW. At the same time, the wheel acceleration $a_w$ again drops across the pressure release threshold $-b_1$. The output level of the differential amplifier 214 thus turns HIGH. However, since the input level from the triggerable timer 257 remains LOW, AND condition of the AND gate 217b can not be established. Therefore, the APPLICATION mode is maintained.

Therefore, despite of decreasing of the wheel acceleration across the pressure release threshold $-b_1$, the APPLICATION mode operation is maintained to further increase braking pressure. By this the wheel speed $V_w$ is decelerated within relatively short period to drop across the target wheel speed $V_i$. When the wheel speed $V_w$ is decreased equal to or less than the target wheel speed $V_i$, the output of the AND ate 228 turns HIGH to turn the output levels of the OR gate 218 to HIGH. Therefore, the RELEASE mode operation is performed. By the RELEASE mode operation, the braking pressure is reduced to increase wheel acceleration $a_w$. At the time $t_6$, the wheel acceleration $a_w$ increases across the pressure apply threshold $a_1$. This results in HIGH level output of the differential amplifier 230. In response to turning the output level of the differential amplifier 230 to HIGH, the output level of the AND gate 228 turns LOW. Since, at this time, since the output level of the OR gate 218 is maintained HIGH level by the HIGH level output of the differential amplifier 230, HOLD mode operation is performed. During this HOLD mode operation, wheel acceleration drops across the pressure apply threshold $a_1$ at a time $t_7$.

In response to drop of the wheel acceleration $a_w$ across the pressure apply threshold $a_1$, the output level of the differential amplifier 230 turns LOW. The timer 256 is responsive to the trailing edge of the HIGH level output of the differential amplifier to turn the output level thereof into LOW for a given period of time. Similarly to the initial stage of the braking operation, this results in HIGH level output of the triggerable timer 257 for a given period of time. Therefore, HOLD mode and RELEASE mode operation is enabled during the period while the triggerable timer is maintained at triggered condition, as that shown in the period between times $t_8$ and $t_9$.

In the example of FIG. 33, since lock pressure $P_{LOCK}$ on the slippy road is substantially low, the braking pressure at a time in which the wheel acceleration drops across the pressure release threshold $-b_1$, approaches the lock pressure $P_{LOCK}$.

Figure 34:
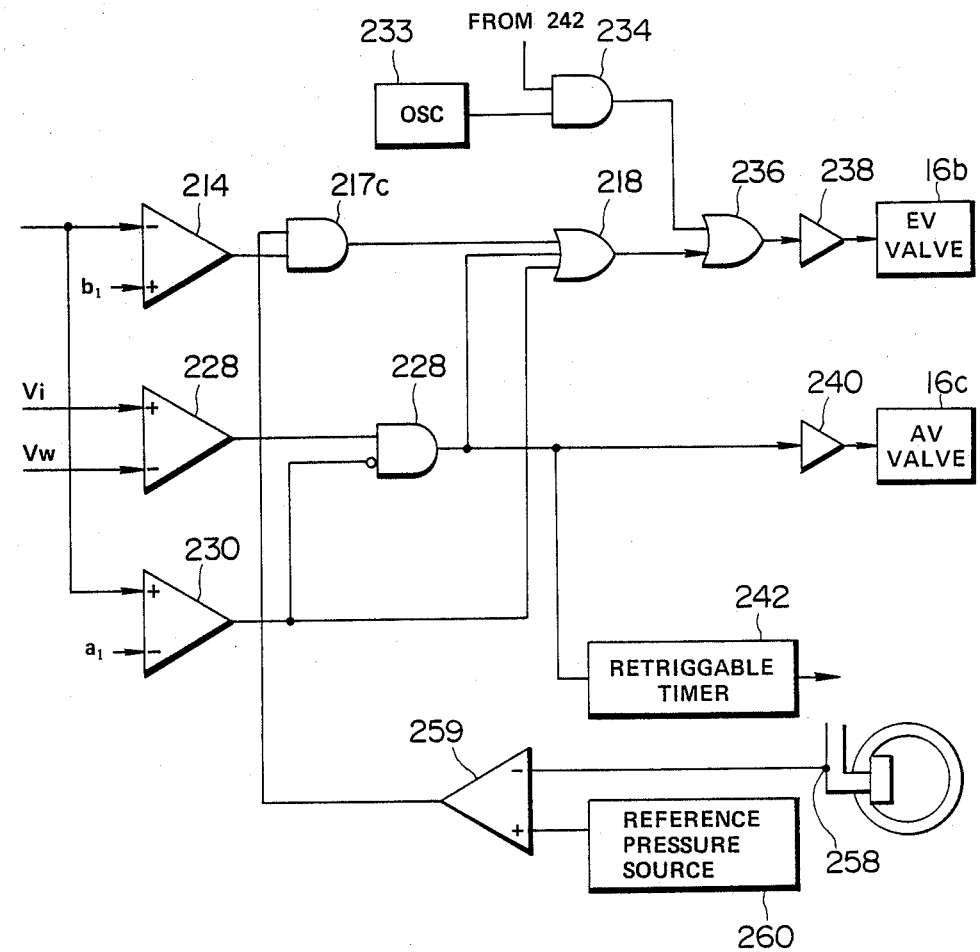
FIG. 34 is a block diagram of the fifth embodiment of a controller unit in the anti-skid brake control system according to the present invention.

FIG. 34 shows the fifth embodiment of the anti-skid brake control system according to the present invention. In this embodiment, a pressure sensor 258 for monitoring pressure of the brake fluid in the hydraulic circuit is employed. A differential amplifier 259 is connected to the pressure sensor 258 at its negative input terminal. The positive input terminal of the differential amplifier 259 is connected to a reference pressure source 260 which produces a reference signal representative of a predetermined reference pressure.

In this embodiment, while the braking pressure is lower than the reference pressure, the HIGH-level output of the differential amplifier 259 is input to an AND gate 217c which is also connected to the output terminal of the differential amplifier 214 at its other input terminal. Therefore, the HOLD mode is enabled only when the braking pressure is higher than the reference pressure. As a result, the braking pressure can be held near the lock pressure $P_{LOCK}$.

Figure 35:
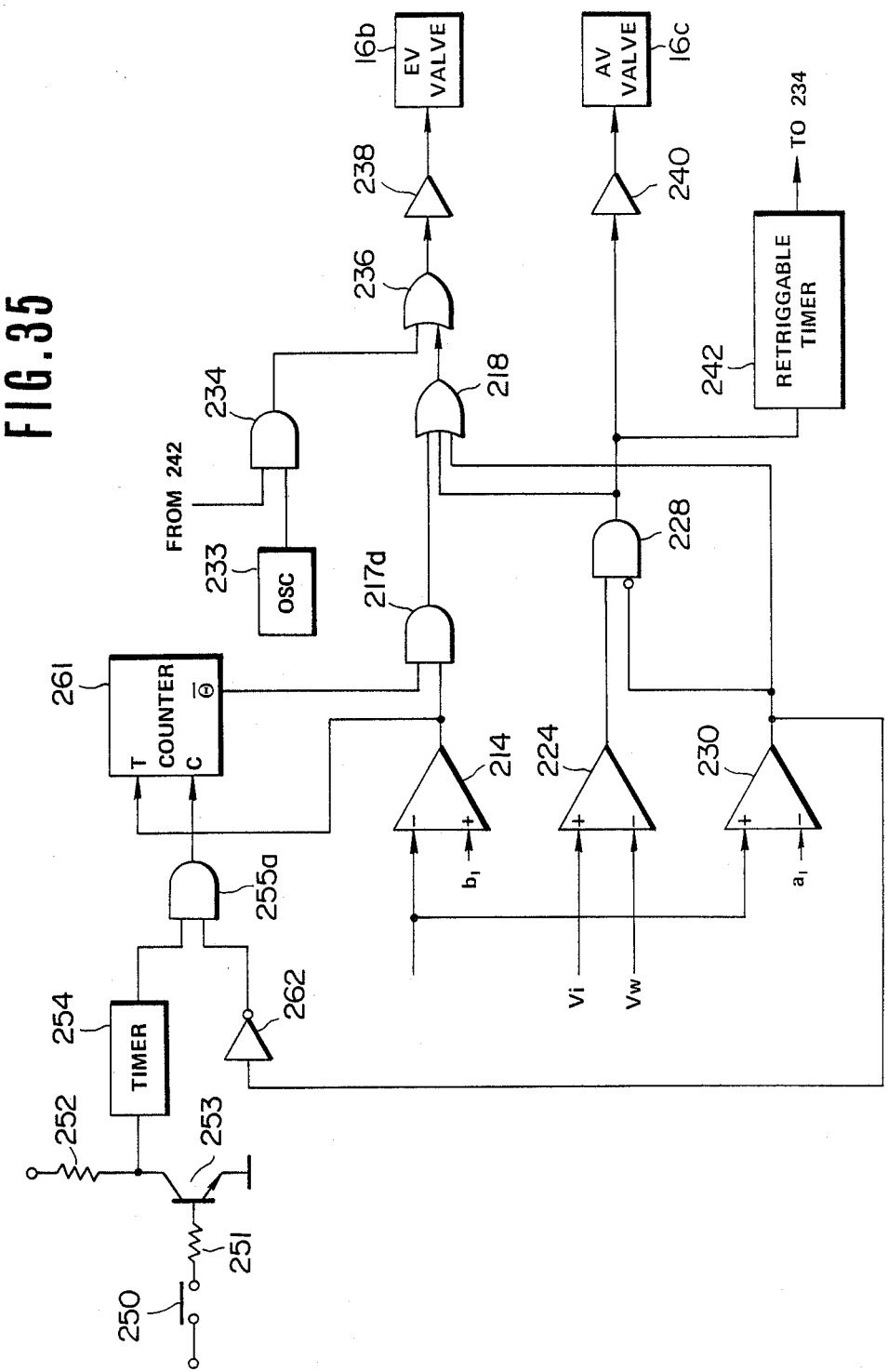
FIG. 35 is a block diagram of the sixth embodiment of a controller unit in the anti-skid brake control system according to the present invention.
Figure 36:
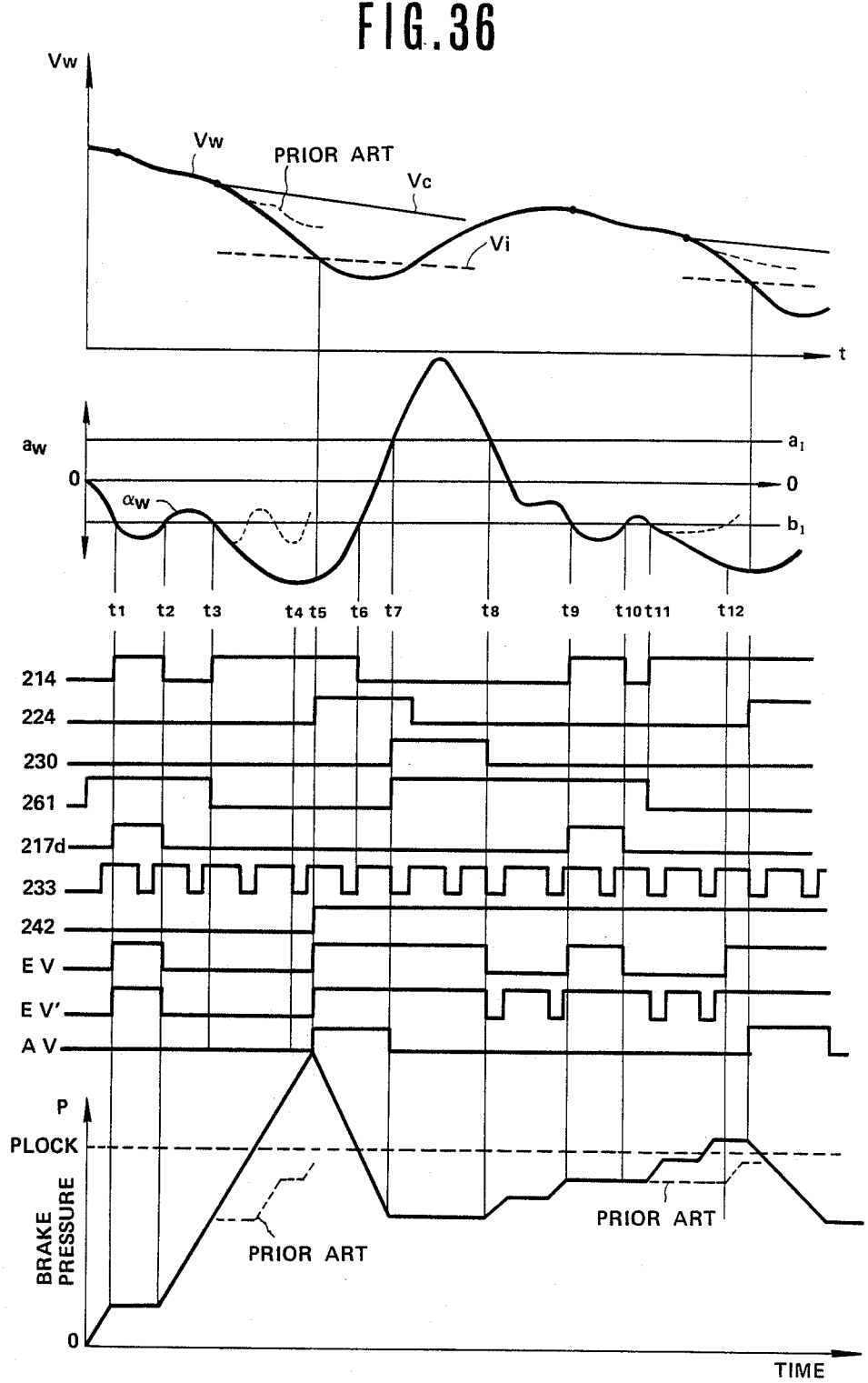
FIG. 36 is timing chart for the sixth embodiment of the anti-skid brake control system according to the invention of FIG. 35.

FIGS. 35 and 36 show the sixth embodiment of the anti-skid brake control system according to the present invention. In this embodiment, the differential amplifier 214 is connected to an AND gate 217d. Also, the differential amplifier 214 is connected to the T-terminal of a counter 261. The counter 261 has a C-terminal connected to an AND gate 255a. One input terminal of the AND gate 255a is connected to the timer 254 and the other input terminal of the AND gate 255a is connected to the differential amplifier 230 via an inverter 262. As in the embodiment of FIGS. 29 and 30, the counter 261 counts the occurrences of HIGH-level output from the differential amplifier 214 by incrementing its counter value by 1 in response to each leading edge in the output signal from the differential amplifier. The counter 261 normally outputs a HIGH-level counter signal which goes LOW when the counter value reaches two. The counter is responsive to a HIGH-level input at its C-terminal to clear its counter value.

With this arrangement, the counter value of the counter 261 is cancelled when the brake switch 250 is turned or when the output of the differential amplifier 230 goes HIGH. On the other hand, when the counter value of the counter reaches two, the output of the counter goes LOW. The output of the counter 261 remains LOW until the counter value is cleared by an HIGH-level input from the AND gate 255a. In summary, after braking starts, the HOLD mode is enabled at the initial stage of each braking pressure increase cycle.

Figure 37:
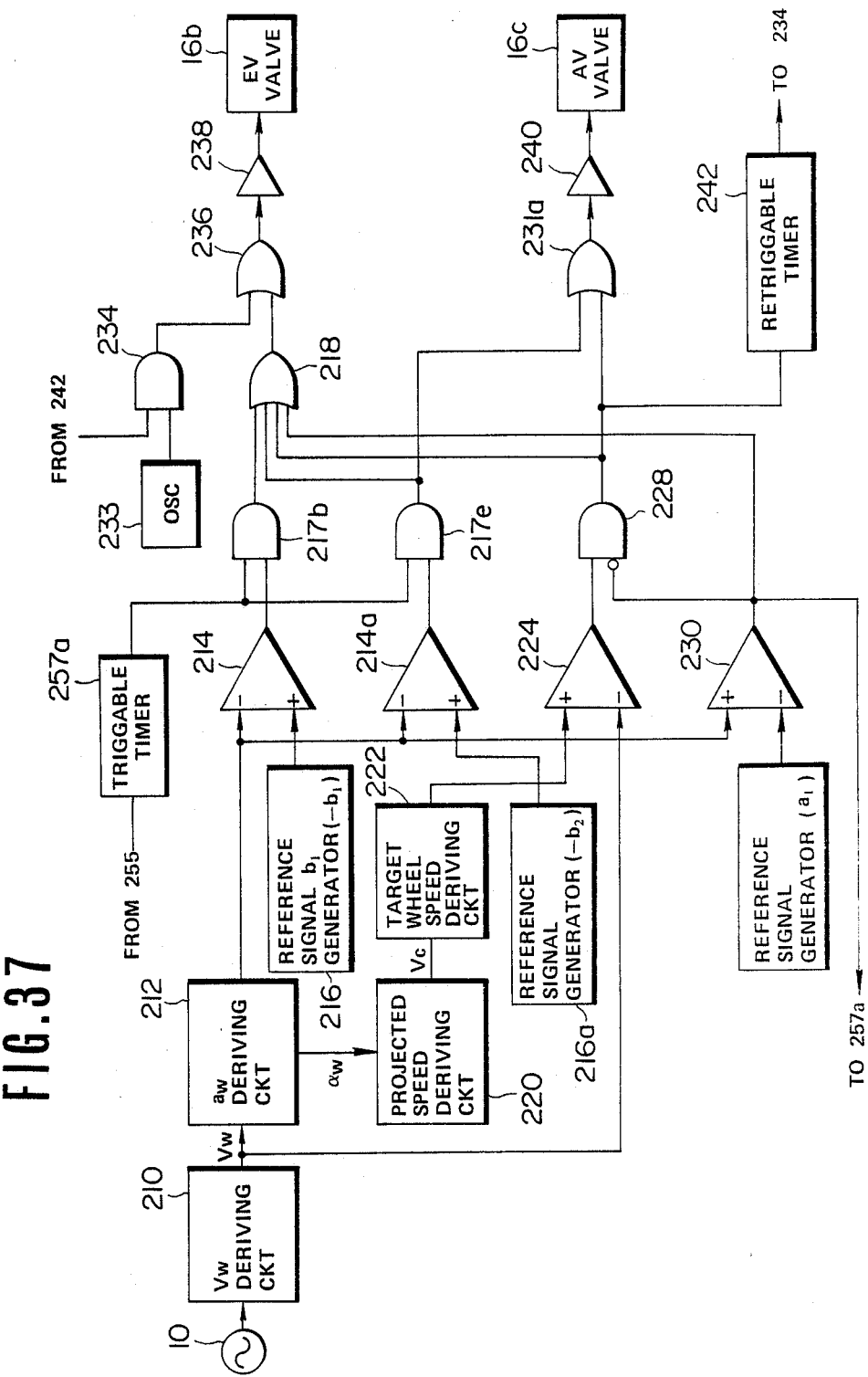
FIG. 37 is a block diagram of the seventh embodiment of a controller unit in the anti-skid brake control system according to the present invention.

FIG. 37 shows the seventh embodiment of the anti-skid brake control system according to the invention. In this embodiment, another differential amplifier 214a is employed. As in the third embodiment, the differential amplifier 214a is connected to the reference signal generator 216a, and to an AND gate 217e. The other input terminal of the AND gate 217e is connected to the trigger timer 257a. The trigger timer 257a operates in the same manner as set out with respect to the fourth embodiment of the invention. As in the third embodiment, the output of the differential amplifier 214a controls selection of HOLD mode and RELEASE mode when the wheel acceleration drops below the threshold value $-b_2$. In the shown embodiment, the AND gate 217e is enabled only while the triggerable timer 257a is triggered.

As set forth above, in accordance with the present invention, the quick braking pressure take-up feature can be achieved without adversely affecting braking behaviour on relatively low-friction roads.

While the specific embodiments have been disclosed in order to facilitate full understanding of the invention, it should be appreciated that the invention should not be understood as being limitted to the shown embodiments, but includes all possible modifications and embodiments which do not depart from the principle of the invention set out in the appended claims.

What is claimed is:

1. An anti-skid brake control system for an automotive brake system comprising:
   a hydraulic brake system including a wheel cylinder for applying braking pressure to a vehicle wheel, and a pressure control valve associated with said wheel cylinder for adjusting fluid pressure in said wheel cylinder, said pressure control valve being operative to increase fluid pressure in said wheel cylinder in a first position thereof, to decrease fluid pressure in said wheel cylinder in a second position thereof, and to hold fluid pressure constant in a third position thereof;
   a wheel speed sensor for detecting rotation speed of the wheel and producing a wheel speed indicative signal having a value indicative of the detected wheel speed; and
   a controller for deriving a wheel acceleration value on the basis of the variation of said wheel speed indicative signal value, detecting a vehicular braking condition on the basis of said wheel acceleration indicative signal value and said wheel speed, selecting an operating mode on the basis of said detected vehicular braking condition from among a first mode for increasing said fluid pressure, which first mode is selected when said vehicular braking condition satisfies a predetermined first condition, a second mode for decreasing said fluid pressure, which second mode is selected when said vehicular braking condition satisfies a predetermined second condition and a third mode for holding said fluid pressure constant, which third mode is selected when said vehicular braking condition satisfies a predetermined third condition, and producing a control signal to control said pressure control valve to one of said first, second and third positions corresponding to the selected mode, said controller being responsive to the vehicular braking condition satisfying said first condition for initiating of said first mode to enable said third mode for a given first period so as to allow selection of said third mode when said vehicular braking condition satisfies said third condition during said first mode and to subsequently disable said third mode operation for a given second period for maintaining said first mode in said second period.

2. The anti-skid brake control system as set forth in claim 1, wherein said controller, in the first cycle of skid control operation, operates in said first mode to increase said fluid pressure linearly during said first cycle of skid control operation and operates in said first mode to increase said fluid pressure in a stepwise fashion in subsequent cycles of skid control operation.

3. The anti-skid brake control system as set forth in claim 2, wherein said controller derives a target wheel speed on the basis of a wheel speed obtained when wheel acceleration decreasing across a predetermined first acceleration threshold, and selects said third mode when derived wheel acceleration decreases below said first acceleration threshold and when said wheel acceleration increases across a predetermined second acceleration threshold, said controller selecting said second mode when detected wheel speed drops below said target wheel speed, and said first mode when wheel acceleration descreases across said second acceleration threshold.

4. The anti-skid brake control system as set forth in claim 3, wherein said controller detects said wheel acceleration decreasing across said first acceleration threshold during said first period for performing said second mode and subsequently detects increasing of wheel acceleration across said first threshold to disable said second mode for said second period and until said wheel speed is decreased across said target wheel speed.

5. The anti-skid brake control system as set forth in claim 4, wherein said controller includes a timer means which is responsive to increasing of wheel acceleration across said first acceleration threshold to disable said third mode for said second period.

6. The anti-skid brake control system as set forth in claim 5, wherein said timer means disables said third mode for a fixed second period of time.

7. The anti-skid brake control system as set forth in claim 3, wherein said controller detects initiation of said first mode by detecting wheel acceleration decreasing acrosss said second acceleration threshold.

8. The anti-skid brake control system as set forth in claim 7, which further comprises a brake switch means for detecting initiation of braking operation and producing a brake switch signal, and said controller is responsive to said brake switch signal for enbling said second mode for said first period and subsequently disabling said second mode for said second period.

9. The anti-skid brake control system as set forth in claim 3, wherein said controller detects wheel acceleration decreasing across a third acceleration threshold having a smaller value than said first acceleration threshold for performing said second mode and detects if said wheel acceleration increases across said third acceleration threshold for performing said third mode.

10. The anti-skid brake control system as set forth in claim 9, wherein said controller detects said wheel acceleration decreasing across said first acceleration threshold during said first period for performing said second mode and subsequently detects increasing of wheel acceleration across said first threshold to disable said second mode for said second period and until said wheel speed is decreased across said target wheel speed.

11. The anti-skid brake control system as set forth in claim 10, wherein said controller includes a timer means which is responsive to increasing of wheel acceleration across said first acceleration threshold to disable said third mode for said second period.

12. The anti-skid brake control system as set forth in claim 11, wherein said timer means disables said third mode for a fixed second period of time.

13. The anti-skid brake control system as set forth in claim 9, wherein said controller detects initiation of said first mode by detecting wheel acceleration decreasing acrosss said second acceleration threshold.

14. The anti-skid brake control system as set forth in claim 13, which further comprises a brake switch means for detecting initiation of braking operation and producing a brake switch signal, and said controller is responsive to said brake switch signal for enbling said second mode for said first period and subsequently disabling said second mode for said second period.

15. The anti-skid brake control system as set forth in claim 3, which further comprises a pressure sensor disposed in said hydraulic brake system for detecting fluid pressure to produce a fluid pressure indicative signal, and said controller is responsive to said fluid pressure indicative signal for enabling said second mode while said fluid pressure indicative signal value is smaller than a predetermined pressure threshold, and disabling said second mode when said fluid pressure indicative signal value increases across said pressure threshold.

16. The anti-skid brake control system as set forth in claim claim 15, which further comprises a brake switch means for detecting initiation of braking operation and producing a brake switch signal, and said controller is responsive to said brake switch signal for enabling said second mode for said first period and subsequently disabling said second mode for said second period.

17. The anti-skid brake control system as set forth in claim 3, wherein said controller includes a counter for counting up occurences of said second mode until the counter value of said counter reaches a predetermined value, and said controller clears said counter value when initiation of said first mode is detected.

18. An anti-skid brake control system for an automotive brake system comprising:
a hydraulic brake system including a wheel cylinder for applying braking pressure to a vehicle wheel, and a pressure control valve associated with said wheel cylinder for adjusting fluid pressure in said wheel cylinder, said pressure control valve being operative to increase fluid pressure in the wheel cylinder in a first position, to decrease fluid pressure in the wheel cylinder in a second position, and to hold fluid pressure constant in a third position;
a wheel speed sensor for detecting rotation speed of the wheel and producing a wheel speed indicative signal having a value representative of detecting wheel speed;
first means for deriving brake control parameters including wheel acceleration on the basis of said wheel speed indicative signal;
second means for selecting an operation mode on the basis of said wheel speed indicative signal value and brake control parameters derived by said first means from among a first mode to increase fluid pressure, a second mode to hold said fluid pressure constant at an increased level, a third mode to decrease said fluid pressure and a fourth mode to hold the fluid pressure constant at a decreased level, and producing a control signal for operating said pressure control valve at one of said first, second and third positions corresponding to said selected mode, said second means alternatively selecting one of said first and second modes until a predetermined condition which is detected in terms of said wheel speed indicative signal value and said brake control parameters, and for thereafter selecting said third mode; and
third means responsive to initiation of each cycle of skid control operation for enabling said second means to select said second mode for a given first period of time and for subsequently disabling said second means from selecting said second mode for maintaining said first mode for a given second period of time.

19. The anti-skid brake control system as set forth in claim 18, wherein said second means selects one of said valve positions in such a manner that:
when wheel acceleration derived by said first means as a brake control parameter decreases below a given first acceleration threshold, said second means selects said second mode;
when a slip rate derived by said first means as a brake control parameter increases beyond a given slippage threshold, said second means selects said third mode;
when the wheel acceleration increases beyond a given second acceleration threshold, said second means selects said fourth mode; and
when the wheel acceleration decreases below said second acceleration threshold, said second means selects said first mode.

20. The anti-skid brake control system as set forth in claim 19, wherein said wheel speed sensor produces a train of pulses separated by intervals representative of the detected wheel rotation speed.

21. The anti-skid brake control system as set forth in claim 20, wherein said first means is associated with a timer means for producing a timer signal, and samples said timer signal value in response to sensor signal pulses, stores values of the sampled timer signal as input timing data and processes said input timing data for deriving wheel speed.

22. The anti-skid brake control system as set forth in claim 18 which further comprises fourth means for detecting a first cycle of skid control operation for performing said first mode to increase said fluid pressure in a linear fashion during said first cycle of skid control operation and for performing said first mode for increasing said fluid pressure in a stepwise fashion in subsequent cycles of skid control operation.

23. The anti-skid brake control system as set forth in claim 22, wherein said second means derives a target wheel speed on the basis of a wheel speed at which a wheel acceleration decreases across a predetermined first acceleration threshold, and selects said third mode when said derived wheel acceleration decreases below said first acceleration threshold and when said wheel acceleration increases across a predetermined second acceleration threshold, selects said second mode when said detected wheel speed drops below said target wheel speed, and selects said first mode when wheel acceleration descreases across said second acceleration threshold.

24. The anti-skid brake control system as set forth in claim 23, wherein said third means detects said wheel acceleration decreasing across said first acceleration threshold during said first period for performing said second mode and subsequently detects increasing of wheel acceleration across said first threshold to disable said second mode for said second period and until said wheel speed decreases across said target wheel speed.

25. The anti-skid brake control system as set forth in claim 24, wherein said third means includes a timer means which is responsive to increasing of wheel acceleration across said first acceleration threshold to disable said third mode for said second period.

26. The anti-skid brake control system as set forth in claim 25, wherein said timer means disables said third mode for a fixed second period of time.

27. The anti-skid brake control system as set forth in claim 23, wherein said third means detects initiation of said first mode by detecting wheel acceleration decreasing acrosss said second acceleration threshold.

28. The anti-skid brake control system as set forth in claim 27, which further comprises a brake switch means for detecting initiation of braking operation and producing a brake switch signal, and said third means is responsive to said brake switch signal for enabling said second mode for said first period and subsequently disabling said second mode for said second period.

29. The anti-skid brake control system as set forth in claim 23, wherein said third means detects wheel acceleration decreasing across a third acceleration threshold having a smaller value than said first acceleration threshold for performing said second mode and detects if said wheel acceleration increases across said third acceleration threshold for performing said third mode.

30. The anti-skid brake control system as set forth in claim 29, wherein said third means detects said wheel acceleration decreasing across said first acceleration threshold during said first period for performing said second mode and subsequently detects increasing of wheel acceleration across said first threshold to disable said second mode for said second period and until said wheel speed decreases across said target wheel speed.

31. The anti-skid brake control system as set forth in claim 30, wherein said third means includes a timer means which is responsive to wheel acceleration increasing across said first acceleration threshold to disable said third mode for said second period.

32. The anti-skid brake control system as set forth in claim 31, wherein said timer means disables said third mode for a fixed second period of time.

33. The anti-skid brake control system as set forth in claim 9, wherein said third means detects initiation of said first mode by detecting wheel acceleration decreasing acrosss said second acceleration threshold.

34. The anti-skid brake control system as set forth in claim 33, which further comprises a brake switch means detective of initiation of a braking operation and producing a brake switch signal, and said third means is responsive to said brake switch signal for enabling said second mode for said first period and subsequently disabling said second mode for said second period.

35. The anti-skid brake control system as set forth in claim 23, which further comprises a pressure sensor disposed in said hydraulic brake system for detecting fluid pressure to produce a fluid pressure indicative signal, and said third means is responsive to said fluid pressure indicative signal for enabling said second mode while said fluid pressure indicative signal value is smaller than a predetermined pressure threshold, and disabling said second mode when said fluid pressure indicative signal value increases across said pressure threshold.

36. The anti-skid brake control system as set forth in claim 35, which further comprises a brake switch means for detecting initiation of a braking operation and producing a brake switch signal, and said third means is responsive to said brake switch signal for enabling said second mode for said first period and subsequently disabling said second mode for said second period.

37. The anti-skid brake control system as set forth in claim 23, wherein said third means includes a counter for counting up occurences of said second mode until the counter value of said counter reaches a predetermined value, and said third means clears said counter value when initiation of said first mode operation is detected.

38. A method for anti-skid control in an automotive brake system comprising the steps of:
   detecting wheel speed and producing a wheel speed indicative signal, the value of which varies proportionally with detected wheel speed;
   deriving a brake control parameter including wheel acceleration on the basis of said wheel speed indicative signal value;
   in a first mode, operating a pressure control valve disposed within a hydraulic brake circuit including a wheel cylinder to increase braking pressure;
   in a second mode, operating said control valve to hold braking pressure at a first constant level when wheel acceleration drops below a first given value;
   in a third mode, operating said control valve to decrease said braking pressure when wheel speed drops below a second given value;
   in a fourth mode, operating said control valve to hold braking pressure at a second constant level when wheel acceleration increases beyond a third given value; and
   detecting initiation of said first mode and enabling said second mode for a given first period of time and subsequently disabling said second mode for a given second period of time.

39. A method for anti-skid control in an automotive brake system comprising the steps of:

detecting wheel speed and producing a wheel speed indicative signal, the value of which varies proportionally with detected wheel speed;

processing said wheel speed indicative signal to derive brake control parameters including wheel acceleration and slip rate relative to an estimated vehicle speed, which estimated vehicle speed is derived on the basis of said detected wheel speed;

in a first operating mode, increasing braking pressure;

in a second operating mode, holding braking pressure at a first constant level when wheel acceleration drops below a first given value;

in a third operating mode, decreasing braking pressure when said slip rate increases beyond a second given value;

in a fourth operating mode, holding braking pressure at a second constant level when wheel acceleration increases beyond a third given value;

increasing braking pressure linearly during a first cycle of skid control operation and increasing braking pressure in a stepwise fashion in subsequent cycles of skid control operation; and enabling said second operating mode for a given first period of time upon detecting initiation of said first operating mode in each skid cycle and subsequently disabling said second operating mode for a given second period of time.

40. An anti-skid brake control system for an automotive brake system comprising:

a hydraulic brake system including a wheel cylinder for applying braking pressure to a vehicle wheel, and a pressure control valve associated with said wheel cylinder for adjusting fluid pressure in said wheel cylinder, said pressure control valve being operative to increase fluid pressure in said wheel cylinder in a first position and to decrease fluid pressure in said wheel cylinder in a second position;

a wheel speed sensor for detecting rotation speed of the wheel and producing a wheel speed indicative signal having a value indicative of the detected wheel speed; and a controller for deriving a wheel acceleration value on the basis of the variation of said wheel speed indicative signal value, detecting a vehicular braking condition on the basis of said wheel speed indicative signal value and said wheel acceleration value, selecting an operating mode on the basis of said detected vehicular braking condition from among a first mode for increasing said fluid pressure, which first mode is selected when said vehicular braking condition satisfies a predetermined first condition, a second mode for decreasing said fluid pressure, which second mode is selected when said vehicular braking condition satisfies a predetermined second condition, and producing a control signal to control said pressure control valve to one of said first and second positions corresponding to the selected operation mode, said controller responsive to initiation of the vehicular braking condition satisfying said first condition for initiating of said first mode to enable said second mode for a given first period of time so as to allow selection of said second mode when said vehicular braking condition satisfies said second condition during said first mode and to subsequently disable said second mode for a given second period of time for maintaining said first mode in said second period of time.

* * * * *